US010942343B2

(12) United States Patent
Toriumi et al.

(10) Patent No.: US 10,942,343 B2
(45) Date of Patent: Mar. 9, 2021

(54) OPTICAL SYSTEM AND IMAGING APPARATUS

(71) Applicants: Yuji Toriumi, Tokyo (JP); Makoto Iikawa, Tokyo (JP); Takaaki Fujiya, Tokyo (JP); Hiroyuki Satoh, Kanagawa (JP)

(72) Inventors: Yuji Toriumi, Tokyo (JP); Makoto Iikawa, Tokyo (JP); Takaaki Fujiya, Tokyo (JP); Hiroyuki Satoh, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/356,543

(22) Filed: Mar. 18, 2019

(65) Prior Publication Data
US 2019/0293913 A1    Sep. 26, 2019

(30) Foreign Application Priority Data
Mar. 20, 2018    (JP) .............................. JP2018-053348

(51) Int. Cl.
*H04N 13/204* (2018.01)
*G02B 13/06* (2006.01)
*H04N 5/232* (2006.01)
*G02B 7/02* (2021.01)

(52) U.S. Cl.
CPC ............. *G02B 13/06* (2013.01); *G02B 7/021* (2013.01); *H04N 5/23238* (2013.01); *H04N 13/204* (2018.05)

(58) Field of Classification Search
CPC .................................................. H04N 13/204

USPC ........................................................ 348/335
See application file for complete search history.

(56) References Cited

U.S. PATENT DOCUMENTS

| | | | |
|---|---|---|---|
| 5,884,110 | A | 3/1999 | Iikawa et al. |
| 5,969,889 | A | 10/1999 | Iikawa et al. |
| 6,118,601 | A | 9/2000 | Iikawa et al. |
| 6,178,295 | B1 | 1/2001 | Nakata et al. |
| 6,236,523 | B1 | 5/2001 | Iikawa et al. |
| 6,269,227 | B1 | 7/2001 | Hamasaki et al. |
| 6,333,825 | B1 | 12/2001 | Hamasaki et al. |
| 2001/0009071 | A1 | 7/2001 | Iikawa et al. |
| 2002/0012539 | A1 | 1/2002 | Sato et al. |
| 2002/0020937 | A1 | 2/2002 | Iikawa et al. |

(Continued)

FOREIGN PATENT DOCUMENTS

JP    2014-056048    3/2014

*Primary Examiner* — Joel W Fosselman
(74) *Attorney, Agent, or Firm* — Xsensus LLP

(57) ABSTRACT

An optical system includes two imaging optical systems disposed symmetrically with each other; two holders to hold the imaging optical systems; and two shaft members including a first shaft member and a second shaft member. The first shaft member is held by the first hole of the one holder, and the second shaft member is held by the second hole of the one holder. The first shaft member is disposed in the second hole of the other holder with a movement of the first shaft member restricted in each direction perpendicular to a direction in which the first holes are opposed to the second holes. The second shaft member is disposed in the first hold of the other holder with the second shaft member movable in only a certain direction within a plane perpendicular to the direction in which the first holes are opposed to the second holes.

11 Claims, 45 Drawing Sheets

(56) References Cited

U.S. PATENT DOCUMENTS

| | | |
|---|---|---|
| 2002/0080049 A1 | 6/2002 | Iikawa et al. |
| 2002/0105731 A1 | 8/2002 | Iikawa et al. |
| 2002/0114087 A1 | 8/2002 | Iikawa et al. |
| 2004/0012862 A1 | 1/2004 | Iikawa |
| 2004/0061958 A1 | 4/2004 | Kobayashi et al. |
| 2004/0090681 A1 | 5/2004 | Iikawa et al. |
| 2004/0090682 A1 | 5/2004 | Iikawa |
| 2004/0136090 A1 | 7/2004 | Iikawa et al. |
| 2004/0136777 A1 | 7/2004 | Iikawa et al. |
| 2005/0072646 A1 | 4/2005 | Hamasaki et al. |
| 2005/0087416 A1 | 4/2005 | Iikawa et al. |
| 2005/0094992 A1 | 5/2005 | Hamasaki et al. |
| 2005/0115358 A1 | 6/2005 | Hamasaki et al. |
| 2006/0104624 A1 | 5/2006 | Nakata et al. |
| 2007/0002468 A1 | 1/2007 | Iikawa et al. |
| 2007/0258155 A1 | 11/2007 | Shimizu et al. |
| 2008/0044175 A1 | 2/2008 | Iikawa |
| 2008/0075454 A1 | 3/2008 | Iikawa |
| 2008/0204878 A1 | 8/2008 | Iikawa et al. |
| 2008/0259472 A1 | 10/2008 | Iikawa |
| 2010/0214679 A1 | 8/2010 | Iikawa et al. |
| 2012/0075720 A1 | 3/2012 | Iikawa et al. |
| 2012/0075731 A1 | 3/2012 | Iikawa et al. |
| 2013/0050405 A1 | 2/2013 | Masuda et al. |
| 2013/0050408 A1 | 2/2013 | Masuda et al. |
| 2013/0057542 A1 | 3/2013 | Takenaka et al. |
| 2013/0063754 A1 | 3/2013 | Saisho et al. |
| 2013/0141541 A1* | 6/2013 | Jung ............... H04N 5/225 348/46 |
| 2013/0235149 A1 | 9/2013 | Tanaka et al. |
| 2013/0242040 A1 | 9/2013 | Masuda et al. |
| 2013/0326419 A1 | 12/2013 | Harada et al. |
| 2014/0036031 A1 | 2/2014 | Tanaka et al. |
| 2014/0071226 A1 | 3/2014 | Satoh et al. |
| 2014/0071227 A1 | 3/2014 | Takenaka et al. |
| 2014/0078247 A1 | 3/2014 | Shohara et al. |
| 2014/0111686 A1 | 4/2014 | Iikawa et al. |
| 2014/0119720 A1 | 5/2014 | Iikawa et al. |
| 2014/0119721 A1 | 5/2014 | Iikawa et al. |
| 2014/0132709 A1 | 5/2014 | Satoh et al. |
| 2014/0152852 A1 | 6/2014 | Ito et al. |
| 2014/0176542 A1 | 6/2014 | Shohara et al. |
| 2015/0015664 A1 | 1/2015 | Masuda et al. |
| 2015/0015766 A1 | 1/2015 | Satoh et al. |
| 2015/0042647 A1 | 2/2015 | Shohara et al. |
| 2015/0062363 A1 | 3/2015 | Takenaka et al. |
| 2015/0192762 A1 | 7/2015 | Satoh et al. |
| 2015/0222816 A1 | 8/2015 | Shohara et al. |
| 2015/0301316 A1 | 10/2015 | Masuda et al. |
| 2016/0006907 A1 | 1/2016 | Masuda et al. |
| 2016/0147045 A1 | 5/2016 | Masuda et al. |
| 2016/0182825 A1 | 6/2016 | Tanaka et al. |
| 2016/0266359 A1 | 9/2016 | Amano et al. |
| 2016/0313541 A1 | 10/2016 | Satoh et al. |
| 2016/0337584 A1 | 11/2016 | Masuda et al. |
| 2016/0353020 A1 | 12/2016 | Satoh |
| 2017/0116704 A1 | 4/2017 | Takenaka et al. |
| 2017/0270381 A1 | 9/2017 | Itoh et al. |
| 2017/0310895 A1 | 10/2017 | Masuda et al. |
| 2017/0315336 A1 | 11/2017 | Masuda et al. |
| 2018/0024333 A1 | 1/2018 | Satoh et al. |
| 2018/0213152 A1 | 7/2018 | Masuda et al. |

\* cited by examiner

FIG. 24A
FIG. 24B
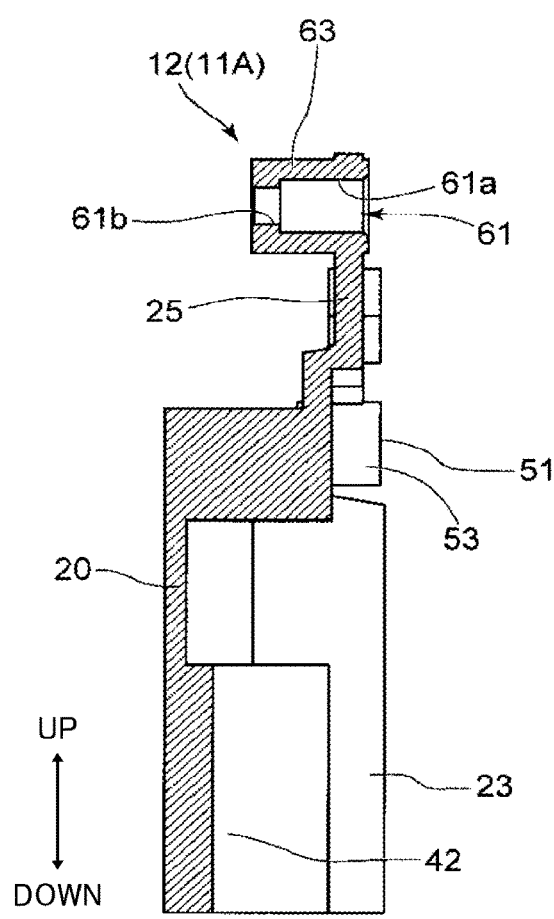
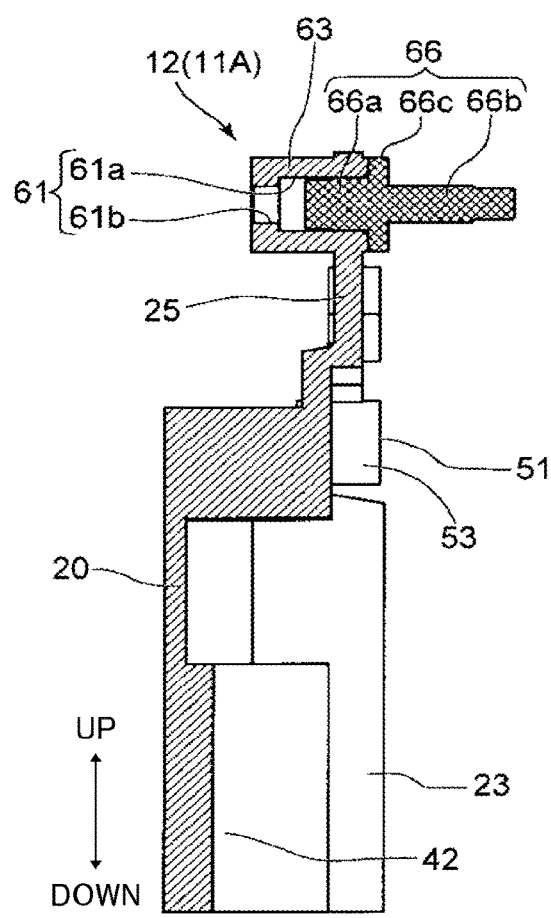

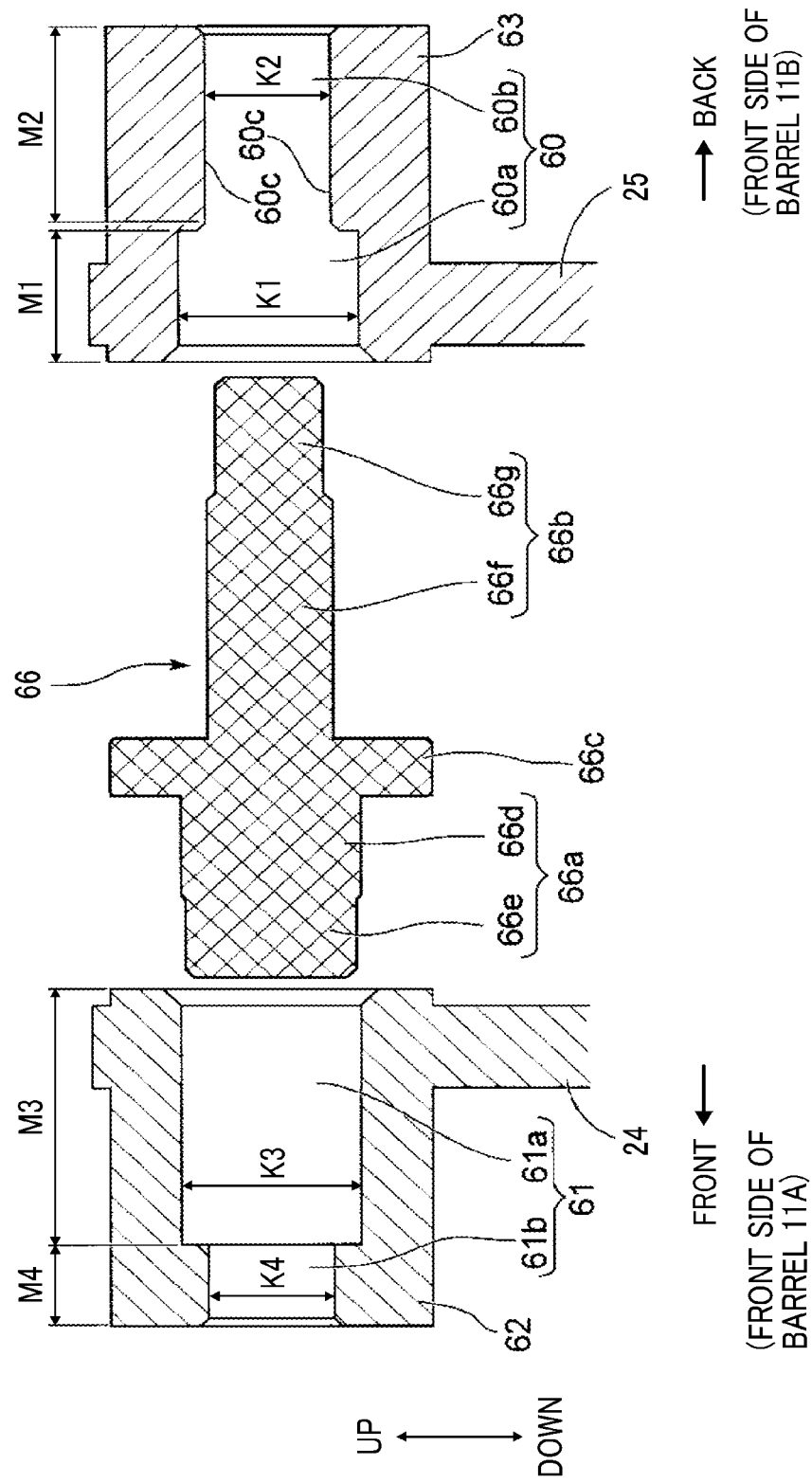

← FRONT SIDE OF BARREL 11A AND 11B

BACK SIDE OF BARREL 11A AND 11B →

← FRONT SIDE OF BARREL 11A AND 11B

BACK SIDE OF BARREL 11A AND 11B →

← FRONT SIDE OF
BARREL 11A AND 11B

BACK SIDE OF
BARREL 11A AND 11B →

← FRONT SIDE OF
BARREL 11A AND 11B

BACK SIDE OF
BARREL 11A AND 11B →

OPTICAL SYSTEM AND IMAGING APPARATUS

CROSS-REFERENCE TO RELATED APPLICATION

This patent application is based on and claims priority pursuant to 35 U.S.C. § 119(a) to Japanese Patent Application No. 2018-053348, filed on Mar. 20, 2018, in the Japan Patent Office, the entire disclosure of which is hereby incorporated by reference herein.

BACKGROUND

Technical Field

Embodiments of the present disclosure relate to an optical system and an imaging apparatus incorporating the optical system.

Background Art

Spherical imaging systems are known that generate an image within a solid angle of 4π steradian by combining images captured by two image sensors. Such spherical imaging systems include two imaging optical systems having the same configuration in which a wide-angle lens with a wide angle of view of 180 degrees or more and an image sensor that captures an image formed by the wide-angle lens are arranged.

Such an imaging system equipped with a plurality of optical systems as described above has the following difficulties when mounted on an imaging apparatus. First, when a plurality of optical systems is incorporated into a single lens barrel, the lens barrel tends to be of a complicated structure and be difficult to manufacture. Further, it is also difficult to incorporate optical elements constituting the optical system into the lens barrel. Further, when a plurality of optical systems is incorporated into the lens barrels each having a different structure before combining the lens barrels, such lens barrels each having a different structure and peripheral components need to be preliminarily prepared, which adversely increases the number of kinds of components, time and costs to manufacture the components. By contrast, when a plurality of optical systems is incorporated into each of the lens barrels having the same structure before mounting the lens barrels onto a base, the number of components increases and results in higher cost. What is worse is that an additional component needs to be disposed between the lens barrels, which is disadvantageous from the viewpoint of the assembly accuracy between lens barrels.

When a plurality of optical systems is combined to constitute an optical system, there are demands for proper orientations and relative positions of the optical systems to be easily set and also for sufficient strength to be obtained so as to prevent displacement of the positioned optical systems.

SUMMARY

In one aspect of this disclosure, there is provided an improved optical system including two imaging optical systems disposed symmetrically with each other; two holders including one holder to hold one imaging optical system, and other holder to hold the other one imaging optical system; and two shaft members including a first shaft member and a second shaft member. The two shaft members are disposed between the two holders. Each holder has a first hole and a second hole. The two holders are disposed such that first holes are opposed to second holes. The first shaft member is held by the first hole of the one holder, and the second shaft member is held by the second hole of the one holder. The first shaft member is disposed in the second hole of the other holder with a movement of the first shaft member restricted in each direction perpendicular to a direction in which the first holes are opposed to the second holes. The second shaft member is disposed in the first hold of the other holder with the second shaft member movable in only a certain direction within a plane perpendicular to the direction in which the first holes are opposed to the second holes.

In another aspect of this disclosure there is provided an improved imaging apparatus including the above-described optical system and two image sensors to form images captured by the two imaging optical systems, so as to combine the formed images to generate one image.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 24A is a cross-sectional view of the base frame without a shaft member mounted, taken along line XXIV-XXIV in FIGS. 15 and 16.

FIG. 24B is a cross-sectional view of a base frame with the shaft member mounted, taken along line XXIV-XXIV in FIGS. 15 and 16.

FIGS. 26A and 26B are cross-sectional views of a positioning mechanism on a sub-reference side.

Figure 1:
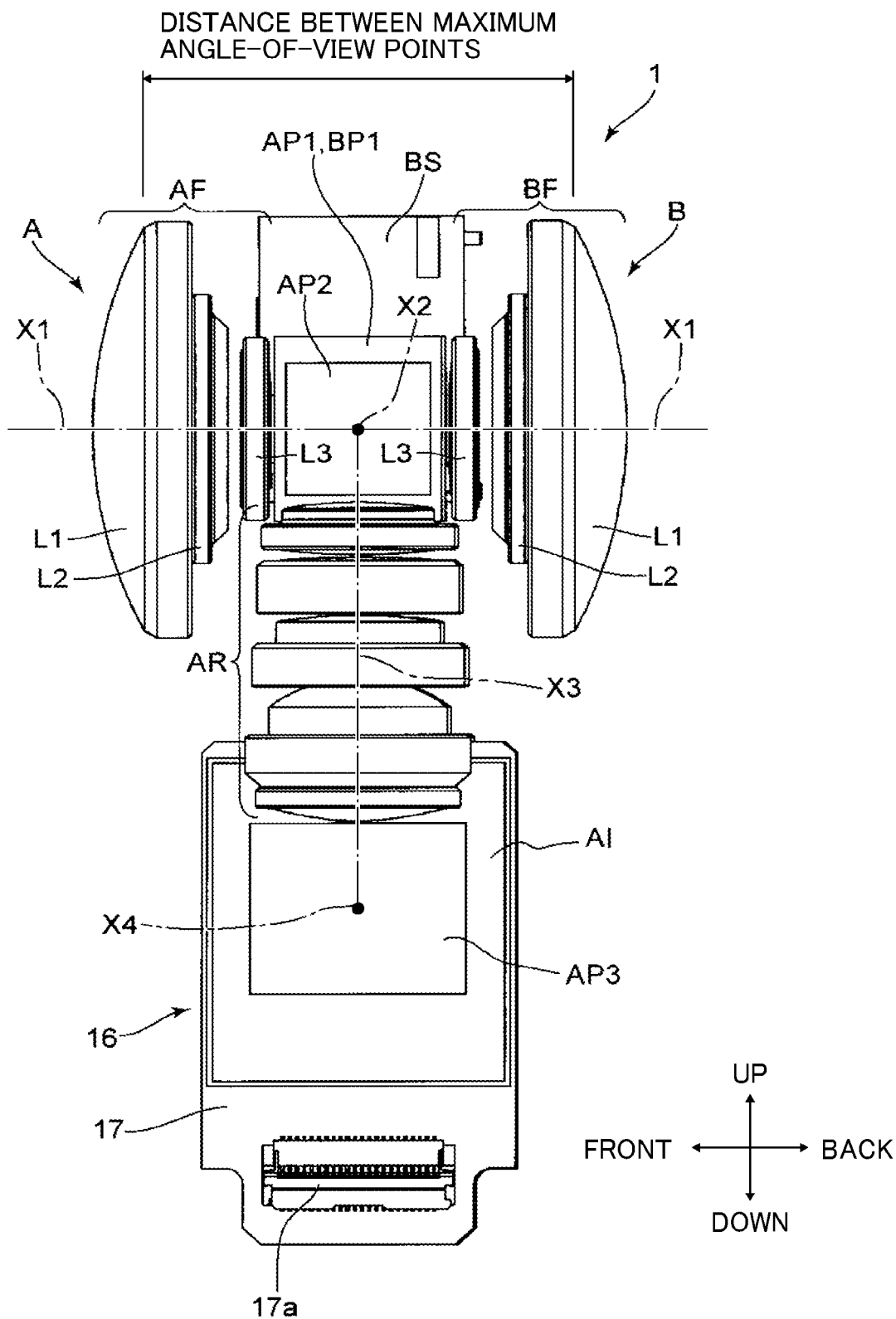
FIG. 1 is a left-side view of an imaging system that constitutes an imaging apparatus according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Figure 2:
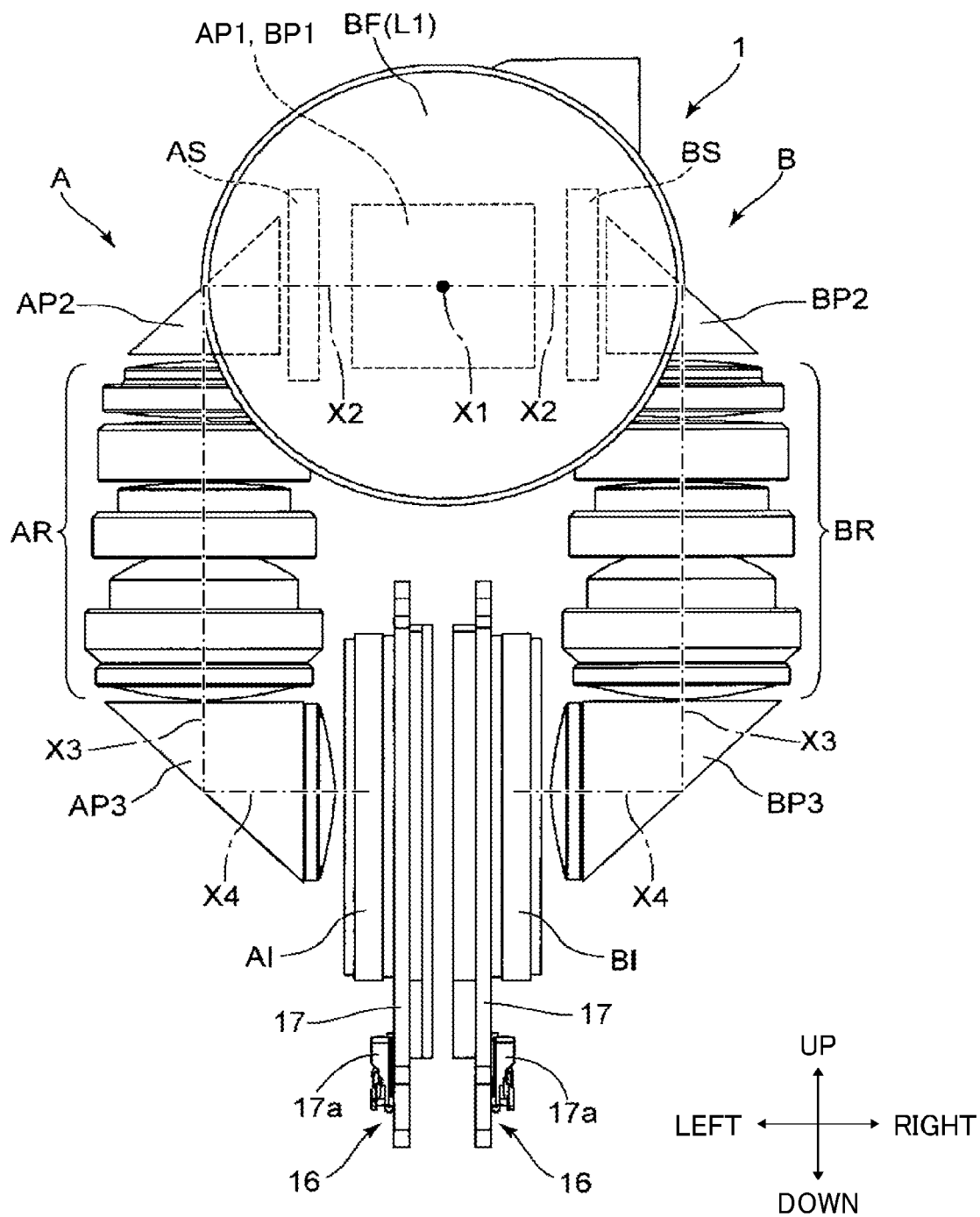
FIG. 2 is a rear view of the imaging system in FIG. 1.
Figure 3:
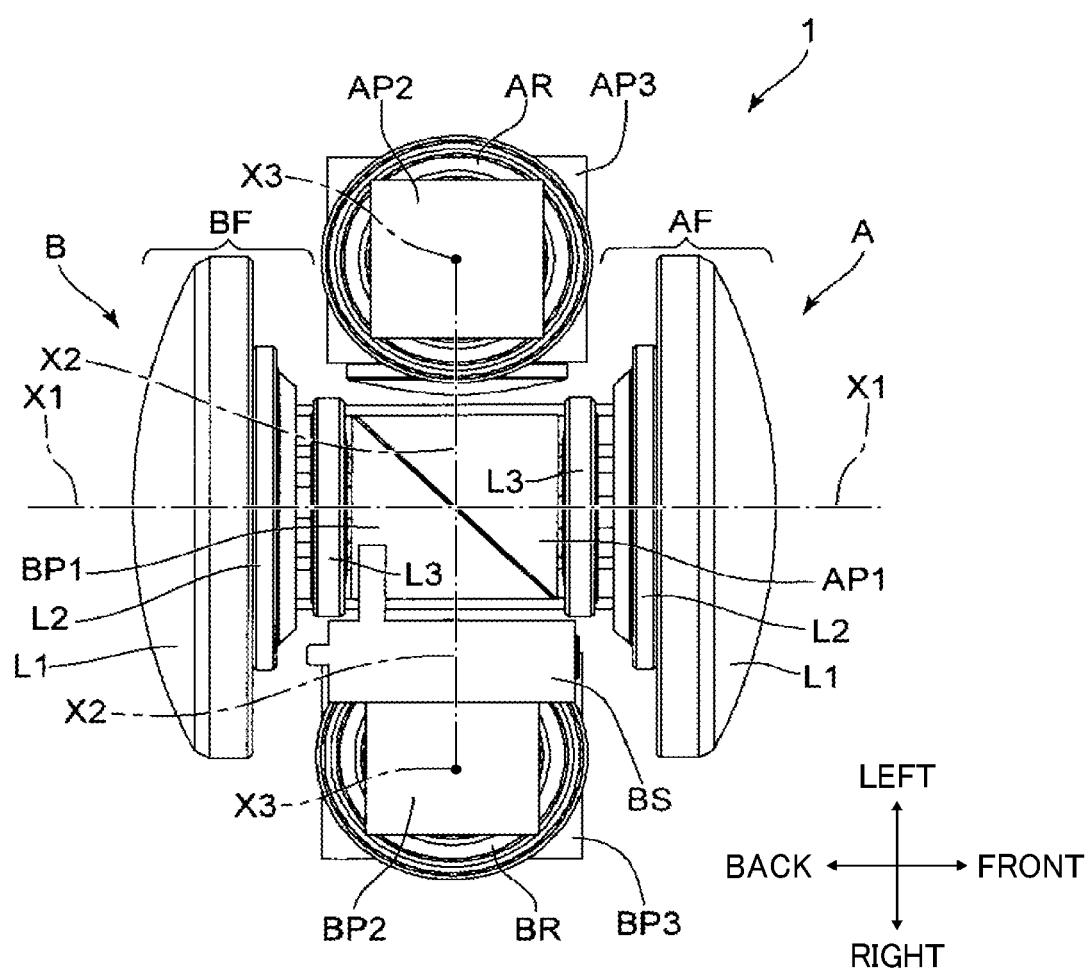
FIG. 3 is a top view of the imaging system in FIG. 1.
Figure 4:
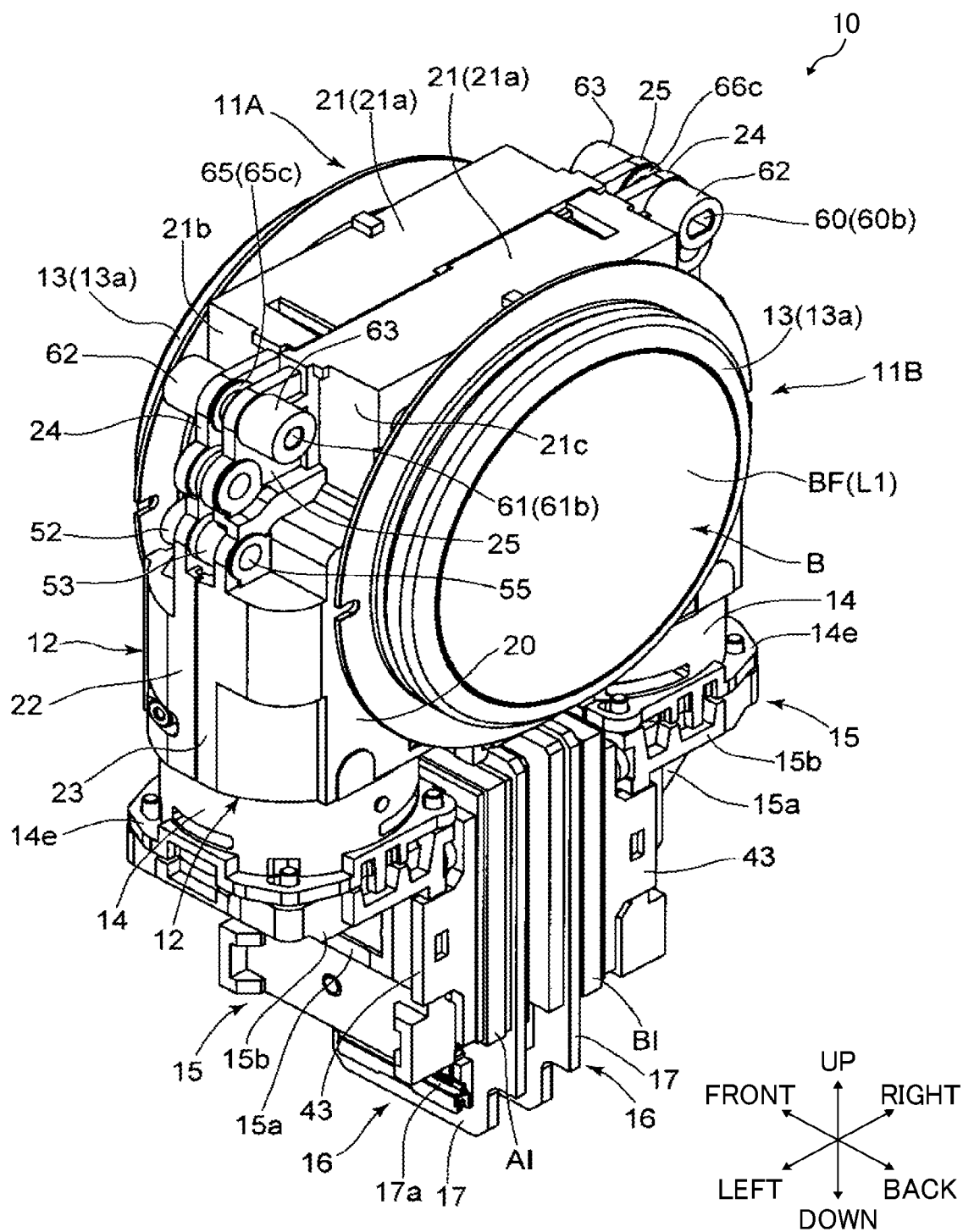
FIG. 4 is a perspective view of a composite barrel including an imaging system.

An optical system and an imaging apparatus according to embodiments of the present disclosure are described with reference to the drawings. The imaging apparatus according to the embodiments of the present disclosure includes a composite lens barrel 10 (FIGS. 4 to 7) incorporating an imaging system 1 (an optical system in FIGS. 1 to 3), and is configured by attaching, for example, an exterior member to the composite lens barrel 10. The composite lens barrel 10 is formed by symmetrically combining a lens barrel 11A and a lens barrel 11B each has the same structure. First, the outline of the imaging system 1 is briefly described, and then the composite lens barrel 10 is described. As illustrated in FIG. 3, front-to-back direction is parallel to the optical axis of the front lens of the optical axis between the first lens and the third lens of a front group AF or BF. Right-to-left directions is vertical orthogonal to the front-to-back direction. As illustrated in FIG. 2, the up-to-down directions is parallel to a virtual line between the top and the bottom of a casing 10.

The imaging system 1 includes two wide-angle lens systems (imaging optical systems) A and B arranged symmetrical to each other and two image sensors AI and BI each to form an image captured by the corresponding wide-angle lens A/B. Each set of the two wide-angle lens systems A and B and the image sensors AI and BI may have the same specification. Each of the wide-angle lens systems A and B has an angle of view greater than 180 degrees. The imaging system 1 may be configured as a spherical imaging system that combines two images formed by the image sensors AI and BI to obtain an image with a solid angle of 47c steradian.

The wide-angle lens system A includes a negative front group AF, a first prism AP1, a variable aperture stop AS, a second prism AP2, a positive rear group AR, and a third prism AP3, which are arranged in that order from the object side to the image side. The wide-angle lens system B includes a negative front group BF, a first prism BP1, a variable aperture stop BS, a second prism BP2, a positive rear group BR, and a third prism BP3, which are arranged in that order from the object side to the image side. The front group AF/BF is capable of capturing light rays with wide angles of view of 180 degrees or more, and the rear group AR/BR is capable of correcting aberrations of an image formed by the lens system A/B. The variable aperture stop AS is illustrated in FIG. 2.

The front group AF diverges light rays of an object that have entered the front group AF from the front side (the front group AF side as illustrated in FIG. 1) while causing the diverging light rays to travel backward (to the front group BF side as illustrated in FIG. 1). The first prism AP1 reflects the light rays traveling from the front group AF to the left by 90 degrees. The variable aperture stop AS adjusts the amount (amount of light) of transmission of the light reflected by the first prism APT The second prism AP2 reflects the light, whose amount has been adjusted by the variable aperture stop AS, downward by 90 degrees. The rear group AR converges the light rays reflected by the second prism AP2 while causing the converging light rays to travel downward. The third prism AP3 reflects the light rays traveling from the rear group AR to the right by 90 degrees, and the reflected light rays forms an image on an imaging plane of the image sensor AI. Each of the front group AF and the rear group AR includes a plurality of lenses.

The front lens group BF diverges light from an object that has entered the front group BF from the back side (the front group BF side as illustrated in FIG. 1) while causing the diverging light to travel forward (to the front group AF side as illustrated in FIG. 1). The first prism BP1 reflects the light traveling from the front group BF to the right (as illustrated in FIG. 2) by 90 degrees. The second prism BP2 reflects the light whose amount has been adjusted by the variable aperture stop BS, downward by 90 degrees. The rear group BR converges the light reflected by the second prism BP2 while causing the converging light rays to travel downward. The third prism BP3 reflects the light traveling from the rear group BR to the right by 90 degrees, and the reflected light forms an image on an imaging plane of the image sensor BI. Each of the negative front group BF and the positive rear group BR includes a plurality of lenses.

The slanted surface of the first prism AP1 and the slanted surface of the first prism BP1 are in close contact with each other so that the first prism AP1 and the first prism BP1 face directions opposite to each other. In the wide-angle lens system A, the imaging plane of the image sensor AI faces the left. In the wide-angle lens system B, the imaging plane of the image sensor BI faces the right. The back faces (the opposite plane of each imaging plane) of image sensors AI and BI face in opposite directions.

In each of the wide angle lens system A and the wide angle lens system B, the optical axes of the front groups AF and BF are defined as the optical axis X1 (optical axis of incident light). The optical axis of the optical path from the reflecting surface of the first prism AP1/BP1 to the reflecting surface of the second prism AP2/BP2 is defined as the optical axis X2. The optical axes of the rear groups AR and BR are defined as the optical axis X3. The optical axis of the optical path from the reflecting surface of the third prism AP3/BP3 to the image sensor AI/BI is defined as the optical axis X4. The wide-angle lens system A and the wide-angle lens system B are arranged such that the optical axes X1 are coaxially positioned and oriented in the front-to-back direction. Further, the front group AF and the front group BF are arranged to be symmetrical about a predetermined plane (a virtual plane between opposed lenses (the front lenses AF and BF of the wide-angle lens systems A and B)) perpendicular to the optical axis X1 along the front-to-back direction.

The optical axes X2, X3 and X4 of the wide-angle lens system A and the optical axes X2, X3, and X4 of the wide-angle lens system B are located within the plane between opposed lenses. More specifically, the optical axis X2 of the wide-angle lens system A and the optical axis X2 of the wide-angle lens system B are coaxially positioned and oriented in the right-to-left direction. Further, the optical axis X4 of the wide-angle lens system A and the optical axis X4 are coaxially positioned and oriented in the right-to-left direction. Further, the optical axis X3 of the rear group AR and the optical axis X3 of the rear group BR are spaced apart in the right-to-left direction in parallel to each other.

As described above, by bending the optical path in different directions multiple times within the plane between opposed lenses of the wide-angle lens systems A and B, a long optical path length of the wide-angle lens systems A and B can be obtained. Further, such a configuration can reduce the distance (the distance between maximum angle-of-view points) between the positions at which the light rays forming a maximum angle of view enter the lenses closest to the object side (the first lenses L1 of the front groups AF and BF) in the wide-angle lens systems A and B. The distance between maximum angle-of-view points is illustrated in FIG. 1. As a result, the image sensors AI and BI can be increased in size and the imaging system 1 can be reduced in size. Further, the disparity that corresponds to an overlapping area of two images to be joined by calibration is reduced, thus obtaining high-quality images.

The composite lens barrel 10 is configured by combining a lens barrel 11A supporting the wide-angle lens system A and the image sensor AI, and the lens barrel 11B supporting the wide-angle lens system B and the image sensor BI. The lens barrel 11A and the lens barrel 11B have the same shape (structure) and are symmetrical along the front-to-back direction to be combinable. With reference to the figures following FIG. 4, the lens barrels 11A and 11B are described in detail. Identical constituent elements of the lens barrel 11A and the lens barrel 11B are denoted by the same reference numerals. In each of the lens barrels 11A and 11B, the object side is the front side, and the opposite side of the object side is the back side of the front-to-back direction along the optical axis X1 (of the imaging system 1). The front (object side) of the lens barrel 11A faces the front side and the back of the lens barrel 11A faces the back side of the front-to-back direction of the imaging system 1. The front (object side) of the lens barrel 11B faces the back side and the back of the lens barrel 11B faces the front side of the front-to-back direction of the imaging system 1.

Each of the lens barrel 11A and the lens barrel 11B according to the embodiments of the present disclosure is an imaging unit that includes an image-forming optical system (wide-angle lens system A/B) and image sensor (AI/BI) and is capable of independently capturing an image of an object. In each of the lens barrels 11A and 11B, the image-forming optical system (wide-angle lens system A/B) and the members (for example, a base frame 12, a front group frame 13 (an adhesive fixing member), a rear group frame 14, a third prism frame 15 to be described below) directly or indirectly supporting (holding) the image-forming optical system constitute the optical system.

Each of the lens barrels 11A and 11B has a base frame 12, a front group frame 13, a rear group frame 14, a third prism frame 15, and an image sensor unit 16. Each of the base frame 12, the front group frame 13, the rear group frame 14, and the third prism frame 15 is formed as a molded product made of, for example, plastic.

In the lens barrel 11A, the base frame 12 supports the first prism AP1, the variable aperture stop AS, and the second prism AP2. The front group frame 13 holds the front group AF. The rear group frame 14 holds the rear group AR. The third prism frame 15 holds the third prism AP3. The image sensor unit 16 is formed by combining, for example, the image sensor AI and the substrate 17.

In the lens barrel 11B, the base frame 12 supports the first prism BP1, the variable aperture stop BS, and the second prism BP2. The front group frame 13 holds the front group BF. The rear group frame 14 holds the rear group BR. The third prism frame 15 holds the third prism BP3. The image sensor unit 16 is formed by combining, for example, the image sensor BI and the substrate 17.

As illustrated in FIGS. 15 to 19, the base frame 12 includes a front wall 20, an upper wall 21 positioned at the upper portion of the front wall 20, and side walls 22 and 23 respectively positioned at the left and right edges of the front wall 20. The corner wall 24 is provided near the boundary of the upper wall 21 and the side wall 22 and the corner wall 25 is provided near the boundary of the upper wall 21 and the side wall 23.

Figure 15:
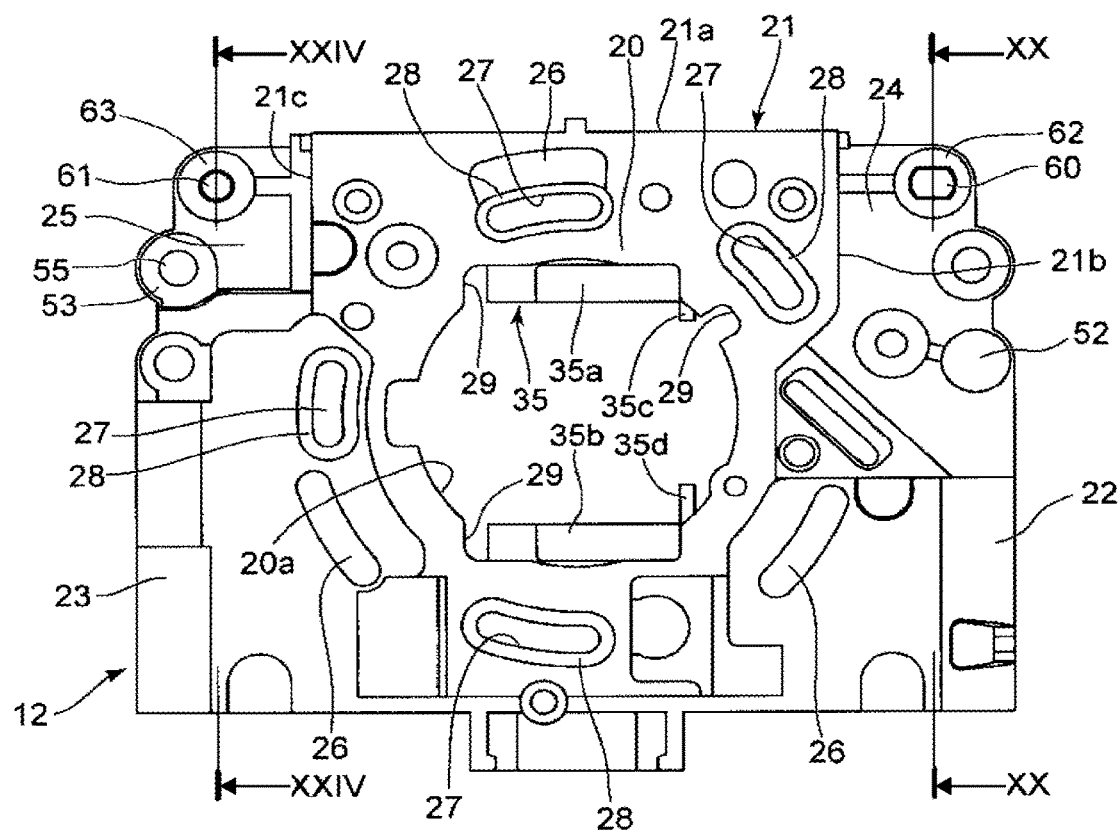
FIG. 15 is a front view of a base frame constituting one of the two separate lens barrels in FIG. 9.
Figure 15:
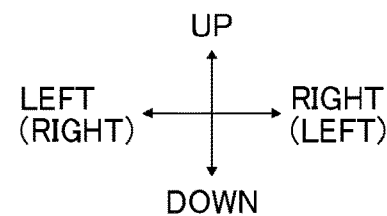

The front wall 20 has a front opening 20a penetrating the front wall 20 in the front-to-back direction and substantially faces an object. The optical axis X1 passes through substantially the center of the front opening 20a. As illustrated in FIG. 15, the front wall 20 further has a plurality of front group frame contacts 26 (three in the present embodiment) positioned around the front opening 20a on the front side of the front wall 20. Each of the front group frame contacts 26 is a protrusion provided with a plane perpendicular to the optical axis X1, protruding forward in the front-to-back direction.

The front wall 20 further has a plurality of bonding holes 27 (four in the present embodiment) around the front opening 20a. Each of the bonding holes 27 is an elongated hole whose long direction is oriented in the circumferential direction around the optical axis X1, penetrating the front wall 20 in the front-to-back direction. A joint face 28 facing forward is formed around each of the bonding holes 27. A plurality of bonding recessed portions is formed on the outer edge of the front opening 20a.

Figure 30:
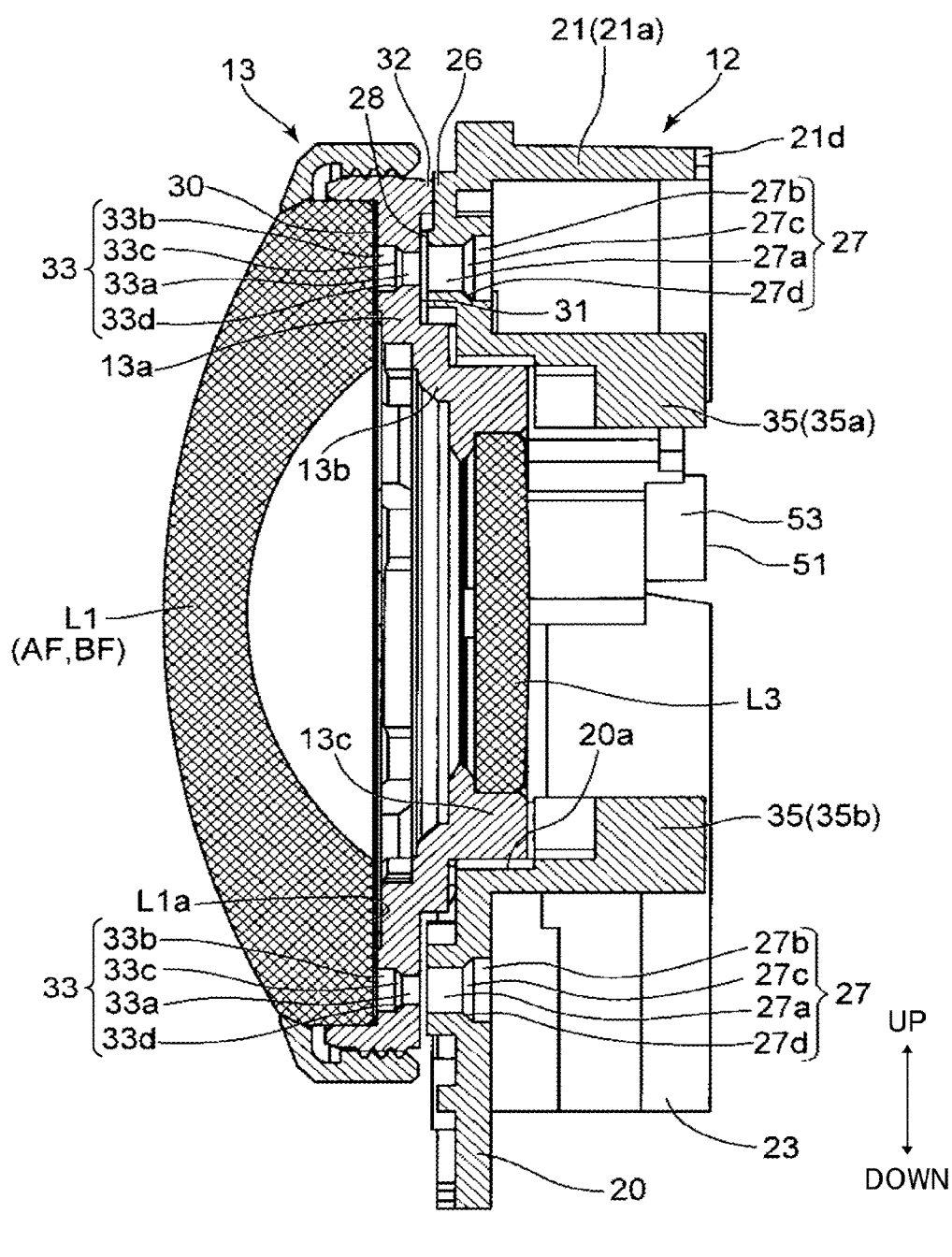
FIG. 30 is a cross-sectional view of the lens barrels taken along line XXX-XXX in FIG. 29.
Figure 31:
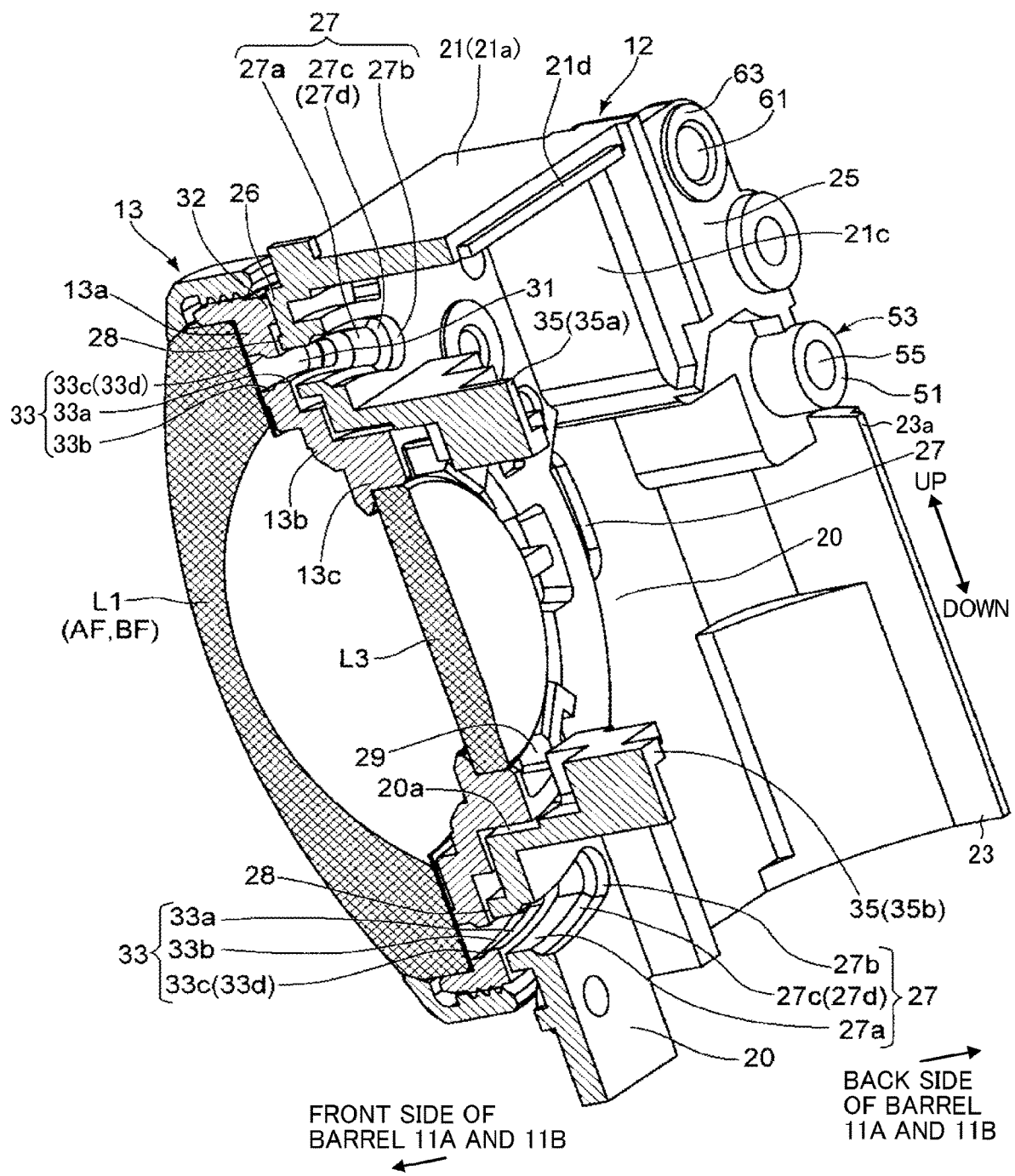
FIG. 31 is a perspective view of the base frame and the front group frame taken along line XXX-XXX in FIG. 29.

As illustrated in FIGS. 1 and 3, each of the front group AF and the front group BF includes a first lens L1, a second lens L3, and a third lens L3. As illustrated in FIGS. 30 and 31, the front group frame 13 includes an annular first lens holder 13a that supports (holds) the first lens L1, an annular second lens holder 13b that holds the second lens L2, and an annular third lens holder 13c that holds the third lens L3.

As illustrated in FIGS. 30 and 31, the first lens L1 held by the first lens holder 13a of the front group frame 13 is a negative meniscus lens having a convex surface facing the object side. An annular plane L1a is formed on the periphery of a concave surface, which outputs light, of the first lens L1 and is perpendicular to the optical axis X1. The first lens holder 13a has an annular lens supporting surface 30 on the front side, to support the plane L1a. The lens supporting surface 30 includes, on the back, a joint face 31 facing the front face (including the joint face 28) of the front wall 20 of the base frame 12 and a plurality of contacts 32 (three in the present embodiment) positioned around the periphery of the joint face 31. Each of the contacts 32 is a protrusion provided with a plane perpendicular to the optical axis X1, protruding backward from the joint face 31 in the front-to-back direction. Each of the contacts 32 is positioned to face the front group frame contact 26 of the base frame 12.

A plurality of bonding holes 33 (four in the present embodiment) is further formed in the first lens holder 13a of the front group frame 13. Each of the bonding holes 33 is an elongated hole whose long direction is oriented in the circumferential direction around the optical axis X1, penetrating the first lens holder 3a in the front-to-back direction. The lens supporting surface 30 side of the bonding holes 33 is covered with the plane L1a of the first lens L1, and the joint face 31 side of the bonding holes 33 is open.

Figure 32:
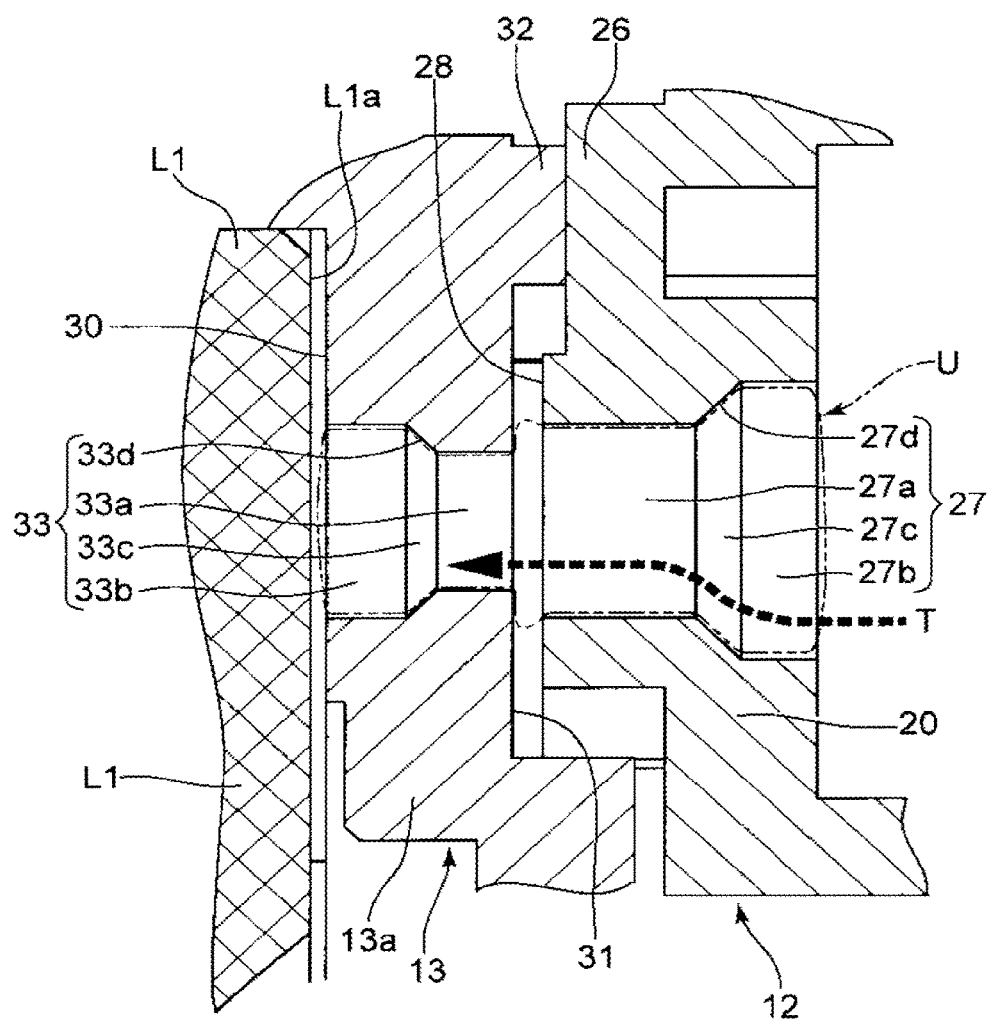
FIG. 32 is an enlarged cross-sectional view of an adhesive structure of a part of FIG. 30.

As illustrated in FIGS. 30 to 32, each contact 32 of the front group frame 13 comes into contact with each front group frame contact 26 of the base frame 12 so that the front group frame 13 is positioned relative to the base frame 12 in the front-to-back direction. The second lens holder 13b and the third lens holder 13c have a smaller diameter than the first lens holder 13a does and are configured to enter the front opening 20a. In such a state, there is space in the radial direction about the optical axis X1 between the front opening 20a and the second and third lens holders 13b and 13c, which enables the position of the front group frame 13 to be adjustable (optical adjustment) relative to the base frame 12 along the direction perpendicular to the optical axis X1. After positional adjustment, the front group frame 13 is bonded by adhesive to the base frame 12. The following describes an adhesive structure.

Figure 29:
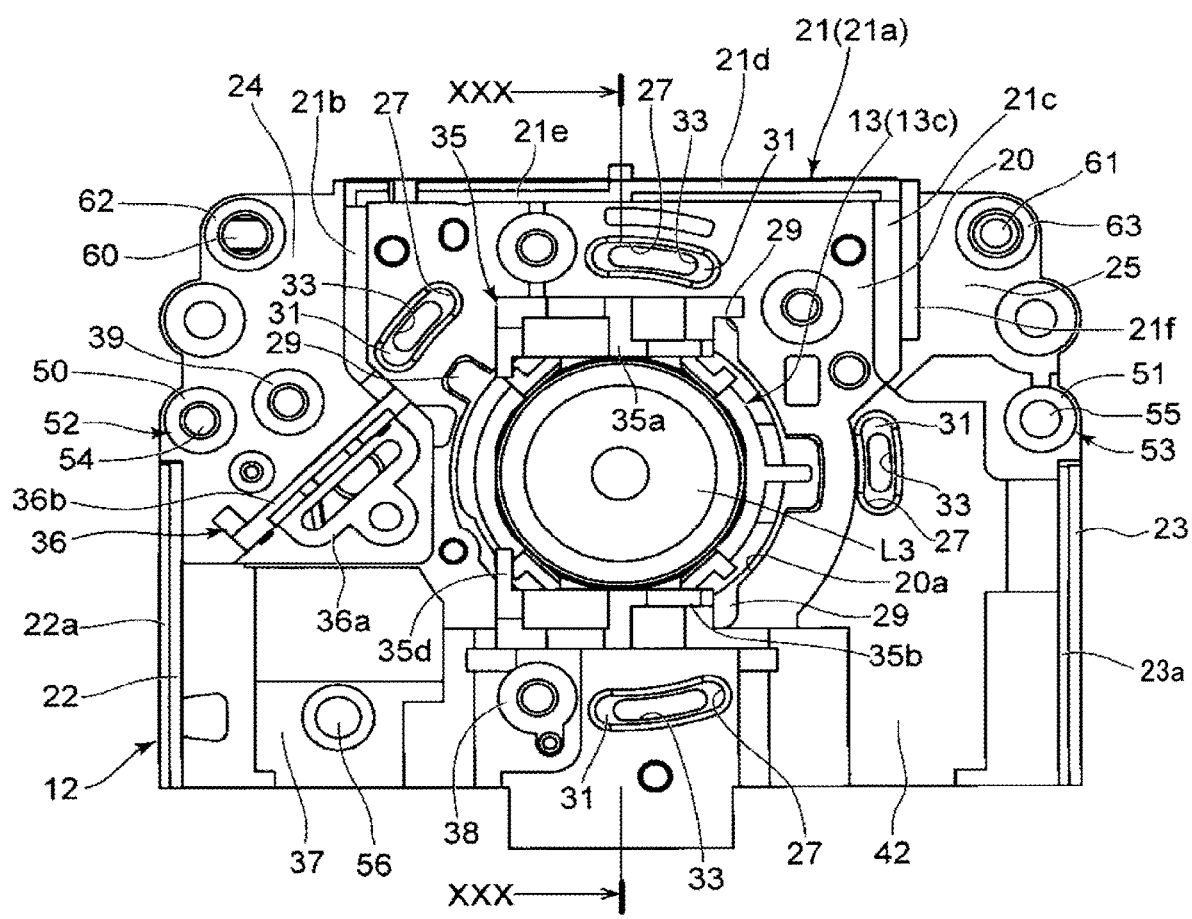
FIG. 29 is a rear view of the base frame with a front rear frame mounted.
Figure 29:
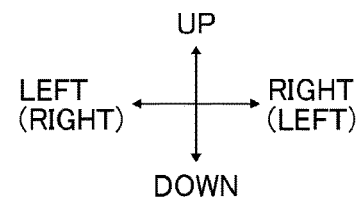

As illustrated in FIG. 29, when the contact 32 of the front group frame 13 is in contact with the front group frame contact 26 of the base frame 12 and viewed from the back side of the front group frame 13, four bonding holes 27 and bonding holes 33 are communicated with each other. Further, the back surface of the third lens holder 13c of the front group frame 13 is exposed through the bonding recessed portion 29. The bonding holes 27, the bonding holes 33, and the bonding recessed portions 29 are filled with adhesive, and the adhesive is cured. Thus, the front group frame 13 is fixed to the base frame 12. For example, when the front group frame 13 is positioned after the positional adjustment, the bonding recessed portion 29 is filled with an ultraviolet curing adhesive that is then irradiated with ultraviolet rays to temporarily fix the front group frame 13 thereto. Subsequently, the bonding holes 27 and the bonding holes 33 are filled with adhesive having a strong adhesive force, and the final fixation is performed.

The sectional structure in the vicinity of the bonding hole 27 and the bonding hole 33 is enlarged and illustrated in FIG. 32. The bonding hole 27 has a narrow portion (first portion) 27a, a wide portion (second portion) 27b, and a width-gradual change portion (third portion) 27c. The first portion 27a opens toward the front side (the joint face 28 side). The second portion 27b opens toward the back side. The third portion 27c is disposed between the first portion 27a and the second portion 27b. The second portion 27b has longer lengths in the radial direction and circumferential direction with the optical axis X1 as the center than the first portion 27a does. That is, the second portion 27b has a larger cross-sectional area than the first portion 27a does. The third portion 27c has lengths in the radial direction and circumferential direction that gradually increase in a direction from the first portion 27a to the second portion 27b. That is, the third portion 27c has a cross-sectional area that gradually increase in a direction from the first portion 27a to the second portion 27b. With such a configuration, when the bonding hole 27 is viewed in cross section along the direction of the optical axis X1 as illustrated in FIG. 32, the inner surfaces of the first portion 27a and the second portion 27b are parallel to the optical axis X1, whereas the third portion 27c has an inner surface that forms an adhesive fitting face 27d of a tapered shape whose width increases toward the back side.

The bonding hole 33 includes a narrow portion (first portion) 33a, a wide portion (second portion) 33b, and a width-gradual change portion (third portion) 33c. The first portion 33a opens toward the back side (the joint face 31 side). The second portion 33b opens toward the front side (the lens supporting surface 30 side). The third portion 33c is disposed between the first portion 33a and the second portion 33b. The second portion 33b has longer lengths in the radial direction and circumferential direction with the optical axis X1 as the center than the first portion 33a does. That is, the second portion 33b has a larger cross-sectional area than the first portion 33a does. In the width gradually changing portion 33c, the width in the radial direction and the length in the circumferential direction gradually increase (the sectional area increases) gradually from the narrow portion 33a to the wide portion 33b. In such a configuration, when the bonding hole 33 is viewed in cross-section along the direction of the optical axis X1 as illustrated in FIG. 32, the inner surfaces of the first portion 33a and the second portion 33b are parallel to the optical axis X1, whereas the third portion 33c has an inner surface that forms an adhesive fitting face 33d of a tapered shape whose width increases toward the front side.

Each bonding hole 27 is larger than a corresponding bonding hole 33 (communicable along the front-to-back direction). When the bonding hole 27 is viewed from the back side, the joint face 31 of the front group frame 13 is visually recognized around the bonding hole 33 (see FIG. 29). More specifically, the first portion 27a of the bonding hole 27 has the same width in the radial direction (the width in the vertical direction in FIG. 32) around the optical axis X1, as that of the second portion 33b of the bonding hole 33. The first portion 33a has the smallest width, and the second width 27b has the largest width among the portions of the bonding hole 27 and the bonding hole 33. Further, each bonding hole 27 is longer in the circumferential direction around the optical axis X1 than each corresponding bonding hole 33 (see FIG. 29). With such a difference in size between the bonding hole 27 and the bonding hole 33, the bonding hole 33 of the front group frame 13 is communicable with the bonding hole 27 of the base frame 12 without being blocked when the position of the front group frame 13 is adjusted relative to the base frame 12 within a predetermined range. Accordingly, adhesive can be smoothly injected (applied) from the bonding hole 27 side to the bonding hole 33 side. Further, in the configuration that bonds the bonding hole 27 and the bonding hole 33 (the bonding target is the bonding hole 27 and the bonding hole 33), even if the amount of adjustment is greater than a predetermined value and a part of the first portion 33a exceeds the range of the first portion 27a, the adhesive can be applied from the bonding hole 27 side to the bonding hole 33. With such a configuration, the amount of adjustment is more flexible than a configuration that inserts a projection into a hole to bond the projection and the hole does. As illustrated in FIG. 32, with the contact 32 in contact with the front frame contact 26, there is a slight gap between the joint face 28 and the joint face 31 along the front-to-back direction. The bonding hole 27 and the bonding hole 33 are communicated with the gap.

As indicated by arrow Tin FIG. 32, the adhesive injected from the second portion 27b side of the bonding hole 27 flows to the bonding hole 33 through the third portion 27c and the first portion 27a. A thin sheet is sandwiched between the lens supporting surface 30 and the plane L1a of the first lens L1. This sheet prevents the adhesive from leaking from the bonding hole 33 so that the bonding hole 33 and the bonding hole 27 are filled with the adhesive. Depending on the viscosity of the adhesive, a part of the adhesive spreads to the gap between the joint face 28 and the joint face 31. The adhesive filling in the bonding hole 33 and the bonding hole 27 is hardened to a solid state from the fluid state as time lapses or with application of energy (for example, heating), so that the base frame 12 and the front group frame 13 are fixed to each other. The adhesive U injected into the bonding hole 27 and bonding hole 33 and cured is virtually indicated by a two-dot chain line in FIG. 32.

The adhesive U is injected into both the bonding hole 27 and the bonding hole 33, which provides a strong fixing force. With such a strong fixing force, when a load is applied in the radial direction around the optical axis X1 or in the circumferential direction around the optical axis X1, relative movement between the base frame 12 and the front group frame 13 can be reliably prevented.

Further, when a load is applied in the front-to-back direction so as to separate the joint face 28 of the base frame 12 from the joint face 31 of the front group frame 13, the cured adhesive U fit into both the bonding hole 27 and bonding hole 33 prevents the separation of the joint face 28 of the base frame 12 from the joint face 31 of the front group frame 13. More specifically, the bonding hole 27 and the bonding hole 33 are formed such that the opening widths of the joint face 28 side and the joint face 31 side of the bonding hole 27 and the bonding hole 33 (the widths of the first portion 27a and the first portion 33a) facing each other are small. Further, a cross-sectional area is substantially formed such that the tip portions of two wedges facing in opposite directions are joined. Accordingly, the adhesive U injected in the bonding hole 27 and the bonding hole 33 also has the same shape as that of the cross-sectional area.

In such a configuration, when a load is applied to the front group frame 13 in a direction away from the base frame 12 (to the front side), a load in the same direction acts on the cured adhesive U through the adhesive fitting face 33d. Accordingly, the adhesive U acts like a wedge against the adhesive fitting face 27d that faces the opposite direction (the back side) of the direction in which the adhesive fitting face 33d faces. This action prevents the front group frame 13 from separating from the base frame 12. Same as in the case of the opposite direction, when a load is applied to the base frame 12 in a direction away from the front group frame 13 (to the back side), a load in the same direction acts on the cured adhesive U through the adhesive fitting face 27d. Accordingly, the adhesive U acts like a wedge against the adhesive fitting face 33d that faces the opposite direction (the front side) of the direction in which the adhesive fitting face 27d faces. This action prevents the front group frame 13 from separating from the base frame 12.

The adhesive structure according to an embodiment of the present disclosure exhibits the wedge effect using the adhesive U, the adhesive fitting face 27d, and the adhesive fitting face 33d of the bonding hole 27 and the bonding hole 33 that are tilted in opposite directions along the front-to-back direction. Hence, such a configuration increases the strength of adhesion between the base frame 12 and the front group frame 13 as compared to a configuration that relies on the adhesive U fixed to the first portions 27a and 33a and the second portions 27b and 33b whose inner surfaces extend along the front-to-back direction. With such a configuration that provides a superior adhesive strength between each bonding hole 27 and each corresponding bonding hole 33, the number of bonding locations and a bonding area can be reduced so as to provide the fixation of the components. Thus, the lens barrel 1A and the lens barrel 11B are disposed compactly and a latitude for designing the lens barrels is increased. Particularly in the composite lens barrel 10 according to the embodiments of the present disclosure, the space of the front group frame 13 is reduced more successfully and fixed with adhesive more firmly as the first prisms AP1 and BP1 and the second prisms AP2 and BP2 are densely packed onto the back side of the base frame 12 to be described later.

Figure 33:
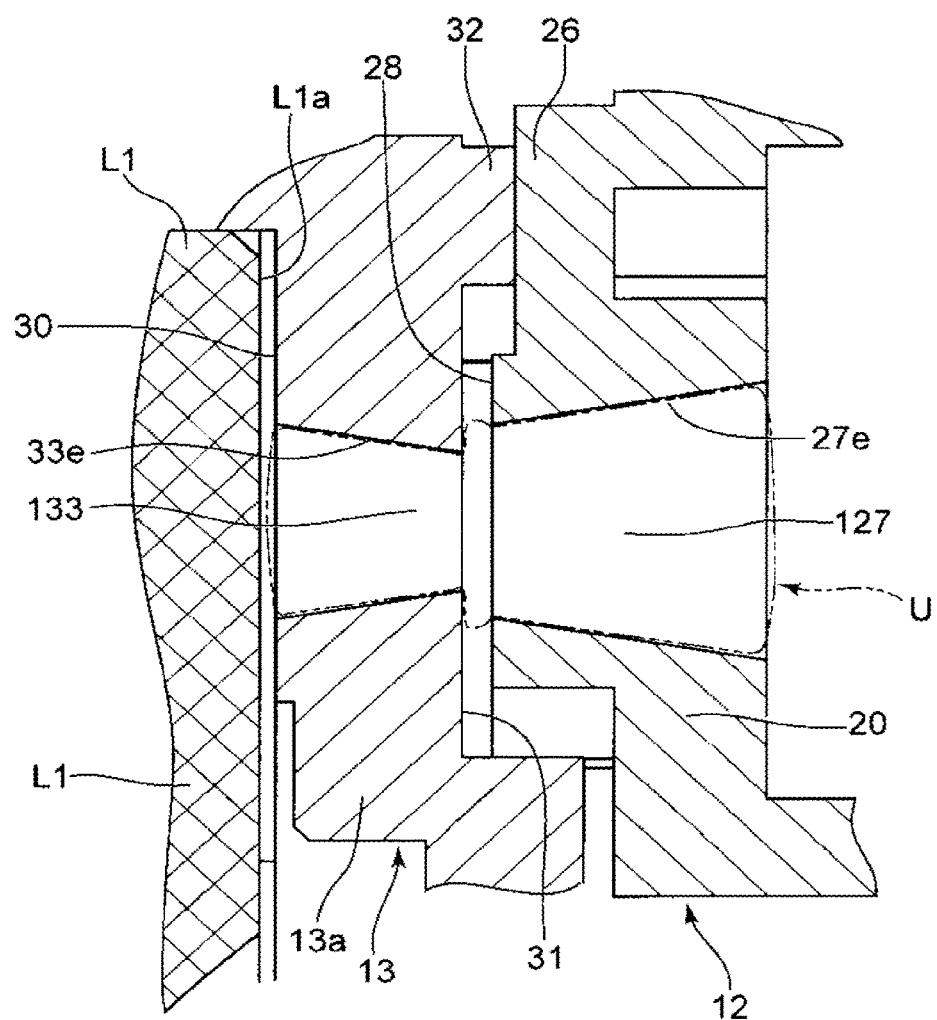
FIG. 33 is an illustration of a variation of the adhesive structure in FIG. 32.
Figure 34:
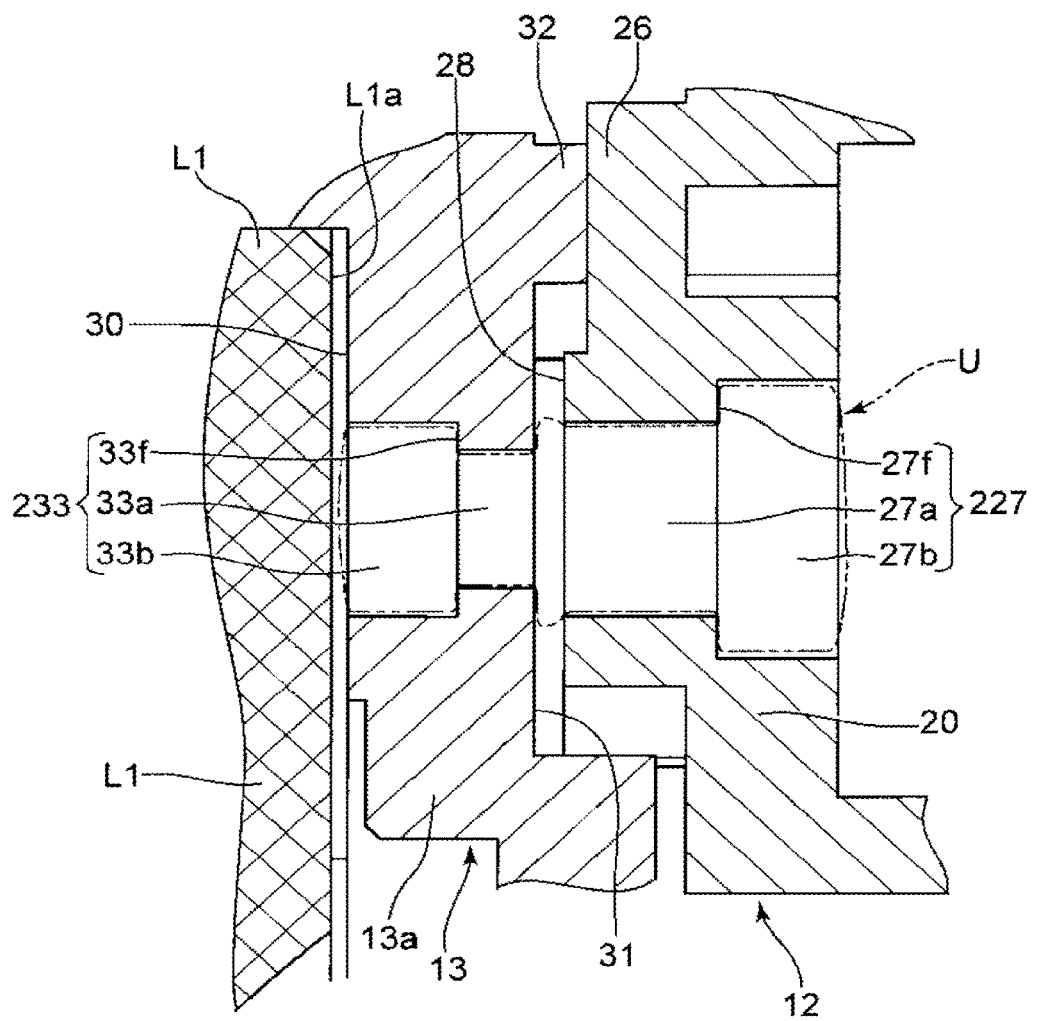
FIG. 34 is a cross-sectional view of another variation of the adhesive structure in FIG. 32.

The adhesive structure used for bonding the base frame 12 and the front group frame 13 is not limited to the above-described structure. FIGS. 33 and 34 are illustrations of variations of the adhesive structure. FIG. 33 is an illustration of a configuration in which the bonding hole 127 of the base frame 12 and the bonding hole 133 of the front group frame 13 have the adhesive fitting face 27e and the adhesive fitting face 33e of tapered shapes as a whole whose widths decrease in directions to the joint face 28 and the joint face 31, respectively. FIG. 34 is an illustration of a configuration in which the bonding hole 227 of the base frame 12 and the bonding hole 233 of the front group frame 13 has a plane adhesive fitting face 27f and a plane adhesive fitting face 33f perpendicular to the optical axis X1, respectively, instead of the above-described adhesive fitting face 27d and adhesive fitting face 33d. In these configurations of FIGS. 33 and 34, the adhesive fitting face 27e and the adhesive fitting face 33e face in opposite directions and form a pair of fitting faces to fit the adhesive U, and the adhesive fitting face 27f and the adhesive fitting face 33f face in opposite directions and form a pair of fitting faces to fit the adhesive U. Accordingly, these configurations exhibit the same advantageous effect as that of the above-described configuration.

Alternatively, a combination of the bonding hole 27 (FIG. 32), the bonding hole 127 (FIG. 33), or the bonding hole 227 (FIG. 34), which is disposed on the base frame 12 side, and the bonding hole 33 (FIG. 32), the bonding hole 133 (FIG. 33), or the bonding hole 233 (FIG. 34), which are disposed on the front group frame 13 side, may be changed as appropriate so as to obtain a pair of fitting faces that form an asymmetrical shape in the front-to-back direction.

Any of the bonding holes 27, 127, and 227 of the base frame 12 and the bonding holes 33, 133, and 233 of the front group frame 13 has a shape easily manufactured by a mold that releases in the front-rear direction. Accordingly, the base frame 12 and the front group frame 13 can be easily obtained without an increase in manufacturing cost.

The following further describes the configuration of the base frame 12. As illustrated in FIGS. 16 to 19, the upper wall 21 extends from the upper edge of the front wall to the back side of the composite lens barrel 10, and has a top portion 21a (top portions of the lens barrels 11A and 11B and a pair of side portions 21b and 21c that extend from right and left edges of the top portion 21a to the down side of the composite lens barrel 10. The upper wall 21 forms a U shape defined by the top portion 21a in the upper side and the side portions 21b and 21c in the right and left sides of the upper wall 21 in which the down side is open.

The side wall 23 and the side wall 22 are disposed below the upper wall 21 and extend from the right and left side edges to the back side of the composite lens barrel 10, respectively. Each of the area that ranges from the front wall 20 to the side wall 22 and the area that ranges from the front wall 20 to the side wall 23 forms a curve shape that outlines the rear group frame 14 to be described later.

Each of the corner wall 24 and the corner wall 25 faces opposite directions in substantially the front-to-back direction, and is displaced to the back side relative to the front wall 20. The corner wall 24 projects laterally from the side portion 21b of the upper wall 21, and the lower end of the corner wall 24 is connected to the upper portion of the side wall 22. The corner wall 25 projects laterally from the side portion 21c of the upper wall 21, and the lower end of the corner wall 25 is connected to the upper portion of the side wall 23. The corner wall 24 and the corner wall 25 are connected to a plurality of walls that extend in different directions, which increases the supporting strength so as to prevent deformation of the corner walls 24 and 25.

The base frame 12 further includes a first prism holder 35 (reflective optical element holder) and a second prism holder 36 (reflective optical element holder) on the back surface of the front wall 20. The first prism holder 35 serves to hold the first prism AP1 or the first prism BP1 on the back of the front opening 20a. The second prism holder 36 serves to hold the second prism AP2 or the second prism BP2.

The first prism holder 35 has an upper wall 35a on the upper edge side of the front opening 20a and a lower wall 35b on the lower edge side of the front opening 20a. On one end of the upper wall 35a in the right-to-left direction, a vertical wall 35c is formed to project downward. On the other end of the lower wall 35b in the right-to-left direction, a vertical wall 35d is formed to project upward.

The first prisms AP1 and BP1 are disposed between the upper wall 35a, the lower wall 35b, the vertical wall 35c, and the vertical wall 35d. There is a clearance between each of the walls 35a, 35b, 35c, 35d and the first prism AP1/BP1, and the first prism AP1/BP1 is positioned using the positioning tool before bonding the first prism AP1/BP1 to the first prism holder 35 with adhesive.

As described above, in the composite lens barrel 10 completely assembled, the slanted surfaces of the first prism AP1 and the first prism BP1 are in close contact with each other, facing opposite directions. With such an arrangement, the first prism holder 35 is formed to leave uncovered the back sides of the slanted surfaces of the first prism AP1 and the first prism BP1 so that the back sides of the slanted surfaces of the first prism AP1 and the first prism BP1 are exposed to the outside of the composite lens barrel 10.

The second prism holder 36 is disposed below the side portion 21b of the upper wall 21 and the corner wall 24, and includes a support seat 36a facing the back side of the composite lens barrel 10 and a support wall 36b that projects from the support seat 36a to the back side of the composite lens barrel 10. The side surfaces of the second prism AP2 and BP2 contact the support seat 36a. The slanted surfaces of the second prism AP2 and BP2 contact the support wall 36b. The second prisms AP2 and BP2 are positioned in the direction of slant using the positioning tool. Then, the positioned second prisms AP2 and BP2 are bonded (fixed) to the second prism holder 36 with adhesive.

Figure 9:
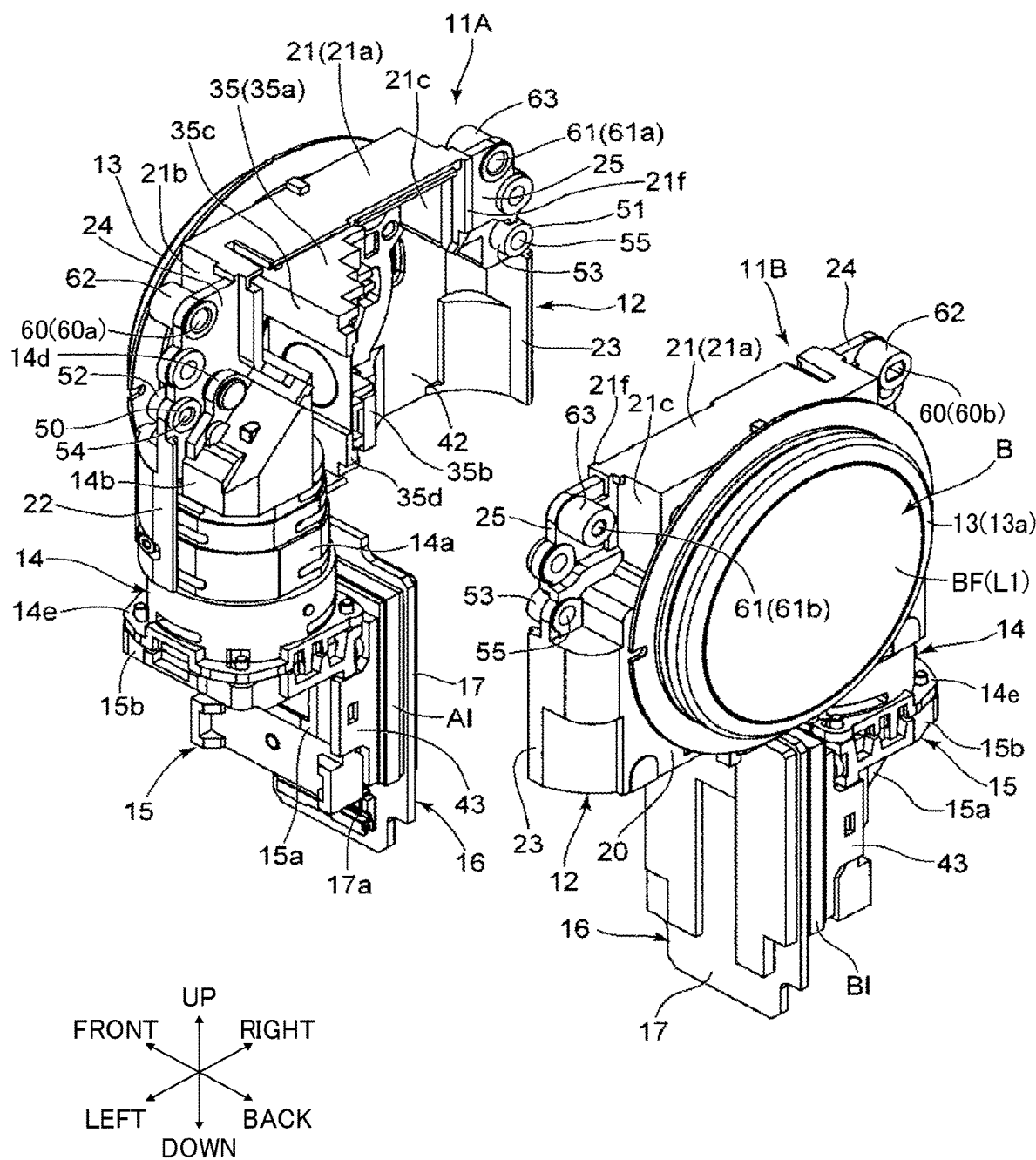
FIG. 9 is a perspective view of two separate lens barrels that constitute the composite lens barrel in FIG. 4.
Figure 13:
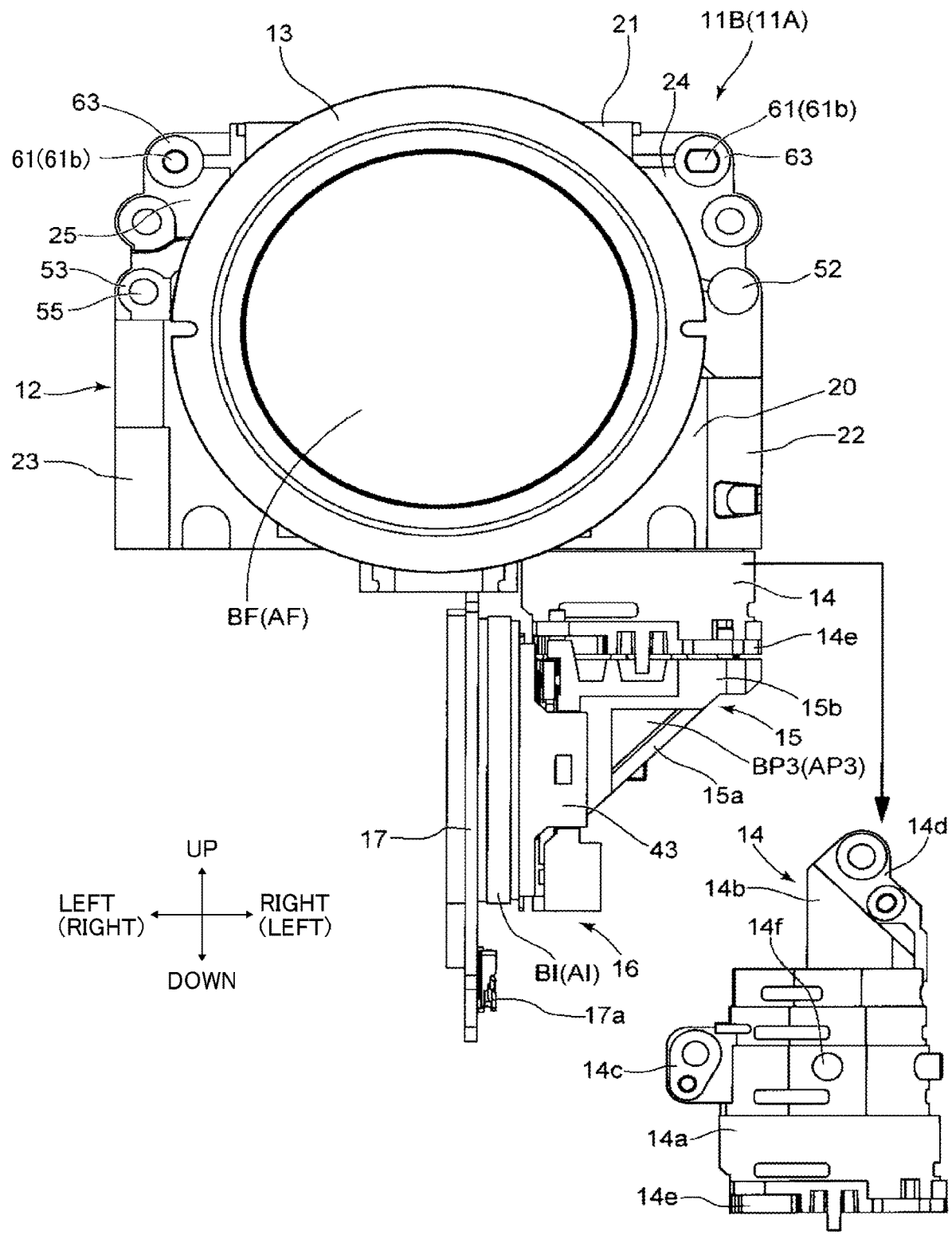
FIG. 13 is a front view of one of the two separate lens barrels in FIG. 9.
Figure 14:
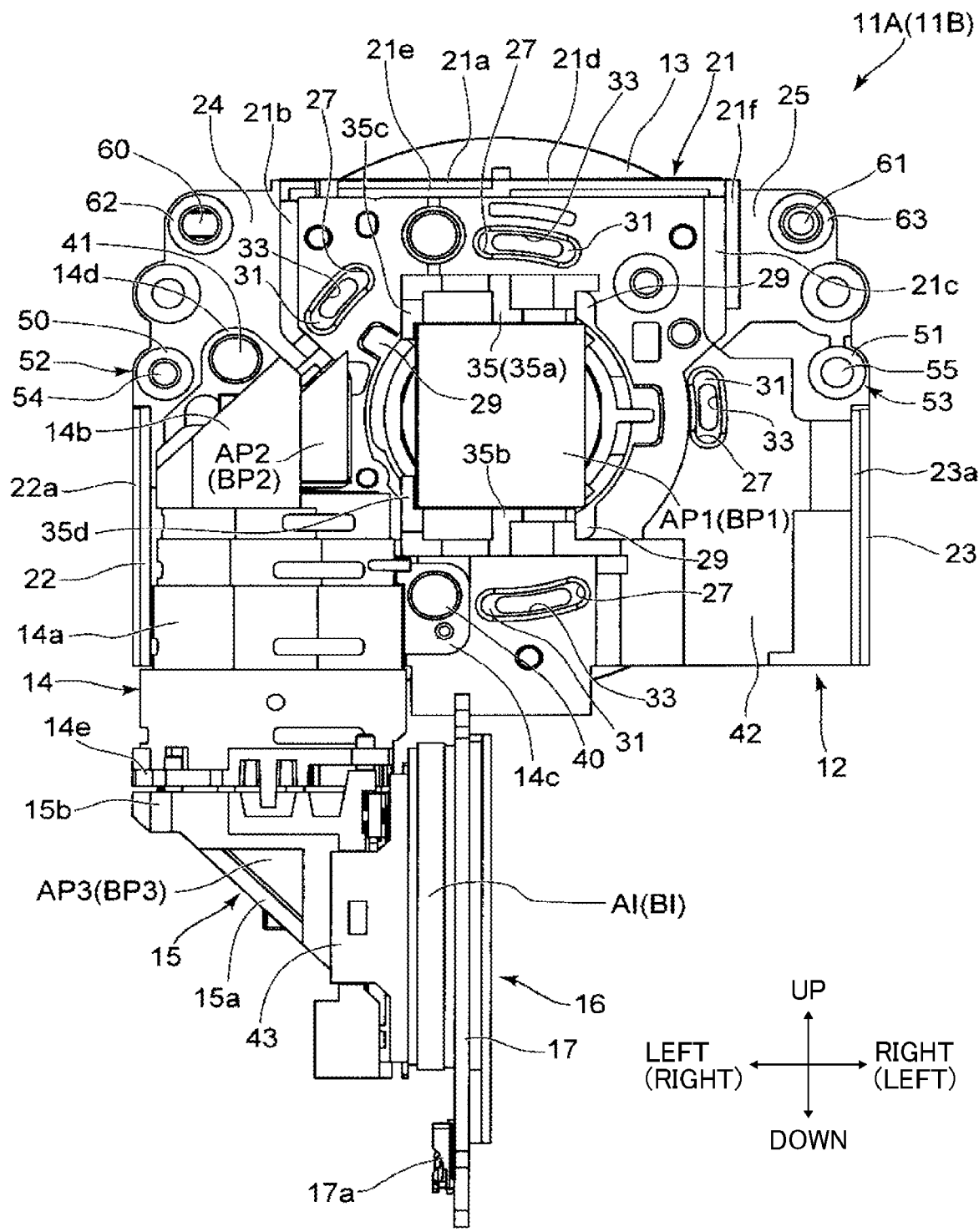
FIG. 14 is a rear view of one of the two separate lens barrels in FIG. 9.

FIG. 13 is an illustration of the rear group frame 14 alone without the base frame 12 attached to. As illustrated in FIGS. 9, 13, and 14, the rear group frame 14 has a cylindrical portion 14a having a substantially cylindrical shape with the optical axis X3 extending in the vertical direction as the center. Further, a plurality of lenses constituting the rear group AR or BR is fixedly held within the cylindrical portion 14a. The rear group frame 14 further includes a prism cover 14b on the upper portion of the cylindrical portion 14a. A support tab 14c projects laterally from the cylindrical portion 14a, and a support tab 14d projects upward from the prism cover 14b. A joining flange 14e is formed at the lower end of the cylindrical portion 14a.

As illustrated in FIGS. 16 to 19, on the back side of the base frame 12, a rear group frame holder 37 (lens positioner) is formed below the corner wall 24 and the second prism holder 36. The rear group frame holder 37 is a concave portion surrounded by the front wall and the side wall 22 and has a shape that enables substantially half (portion positioned on the front side) of the cylindrical portion 14a of the rear group frame 14 to be accommodated within the rear group frame holder 37. The prism cover 14b covers a part of the second prisms AP2 and BP2 held by the second prism holder 36 of the base frame 12 with the cylindrical portion 14a accommodated in the rear group frame holder 37.

A support seat 38 (the lens positioner) is formed on the side of the rear group frame holder 37 (below the lower wall 35b of the first prism holder 35), and a support seat 39 (the lens positioner) is formed above the second prism holder 36. Each of the support seat 38 and the support seat 39 has an annular plane perpendicular to the optical axis X1, and a screw hole is formed in the center of the annular plane. With the cylindrical portion 14a of the rear group frame 14 accommodated in the rear group frame holder 37, the support tab 14c contacts the support seat 38, and the support tab 14d contacts the support seat 39. Through-holes are formed respectively in the support tab 14c and the support tab 14d. The fixing screw 40 is screwed into the screw hole of the support seat 38 through the through-hole of the support tab 14c, and the fixing screw 41 is screwed into the screw hole of the support seat 39 through the through-hole of the support tab 14d. By tightening the fixing screw 40 and the fixing screw 41, the rear group frame 14 is fixed to the base frame 12 with the position of the rear group frame 14 determined (see FIG. 14).

On the back side of the base frame 12, a rear group frame accommodating section 42 (a lens accommodating section) is formed below the corner wall 25. The rear group frame accommodating section 42 is a recessed portion surrounded by the front wall 20 and the side wall 23 and has a shape that enables substantially half (portion positioned on the back side) of the cylindrical portion 14a of the rear group frame 14 to be accommodated within the rear group frame accommodating section 42. Prior to combining the lens barrel 11A and the lens barrel 11B, the rear group frame accommodating section 42 is an empty space (see FIGS. 9 and 14). When the lens barrel 11A and the lens barrel 11B are combined, the rear group frame holder 37 of one base frame 12 and the rear group frame accommodating section 42 of the other base frame 12 face each other in the front-to-back direction, so as to form space to accommodate the cylindrical 14a of the rear group frame 14 inside the combination of the lens barrel 11A and the lens barrel 11B.

The third prism frame 15 includes a prism support wall 15a that supports the slanted surfaces and side surfaces of the third prisms AP3 and BP3. Each of the third prisms AP3 and BP3 is bonded (fixed) to the third prism frame 15 with adhesive. On the upper portion of the third prism frame 15, a joining flange 15b is provided. The joining flange 15b can be fitted into the joining flange 14e of the rear group frame 14 from below. With the joining flange 15b fitted to the joining flange 14e, the third prism frame 15 is positioned and fixed to the rear group frame 14 with adhesive.

The image sensor unit 16 is provided with a pair of fitting pieces 43 at the edge in the front-to-back direction. The pair of fitting pieces 43 are fitted into the recesses formed in the prism support wall 15a of the third prism frame 15, which positions the image sensor unit 16 relative to the third prism frame 15. The image sensor unit 16 is fixed to the third prism frame 15 with adhesion. With such a state, the imaging planes of the imaging sensors AI and BI face in a direction perpendicular to the optical axis X4. Further, the imaging plane of the image sensor AI faces the exit surface of the third prism AP3, and the imaging plane of the image sensor BI faces the exit surface of the prism BP3.

The image sensor unit 16 includes a substrate 17 having image sensors AI and BI on one side. The substrate 17 is substantially rectangular. With the image sensor unit 16 bonded to the third prism frame 15, the long direction of the substrate 17 is along the up-and-down directions, and the lateral direction of the substrate 17 is along the front-to-back direction of the imaging apparatus 80. Further, the direction of thickness of the substrate 17 is along right-to-left direction. In the vicinity of the lower end of the substrate 17, a connector 17a to be connected to the control circuit of the imaging apparatus 80 is disposed. The connector 17a is disposed on the side of the substrate 17 on which the image sensors AI and BI are provided.

By combining the above-described constituent elements, each of the lens barrel 11A and the lens barrel 11B is completely assembled. FIGS. 9 to 12 are illustrations of the lens barrel 11A and the lens barrel 11B, which are separated from each other. FIGS. 13 and 14 are illustrations of one of the lens barrel 11A and the lens barrel 11B. As can be seen from these drawings, the lens barrel 11A and the lens barrel 11B have the same structures.

Figure 10:
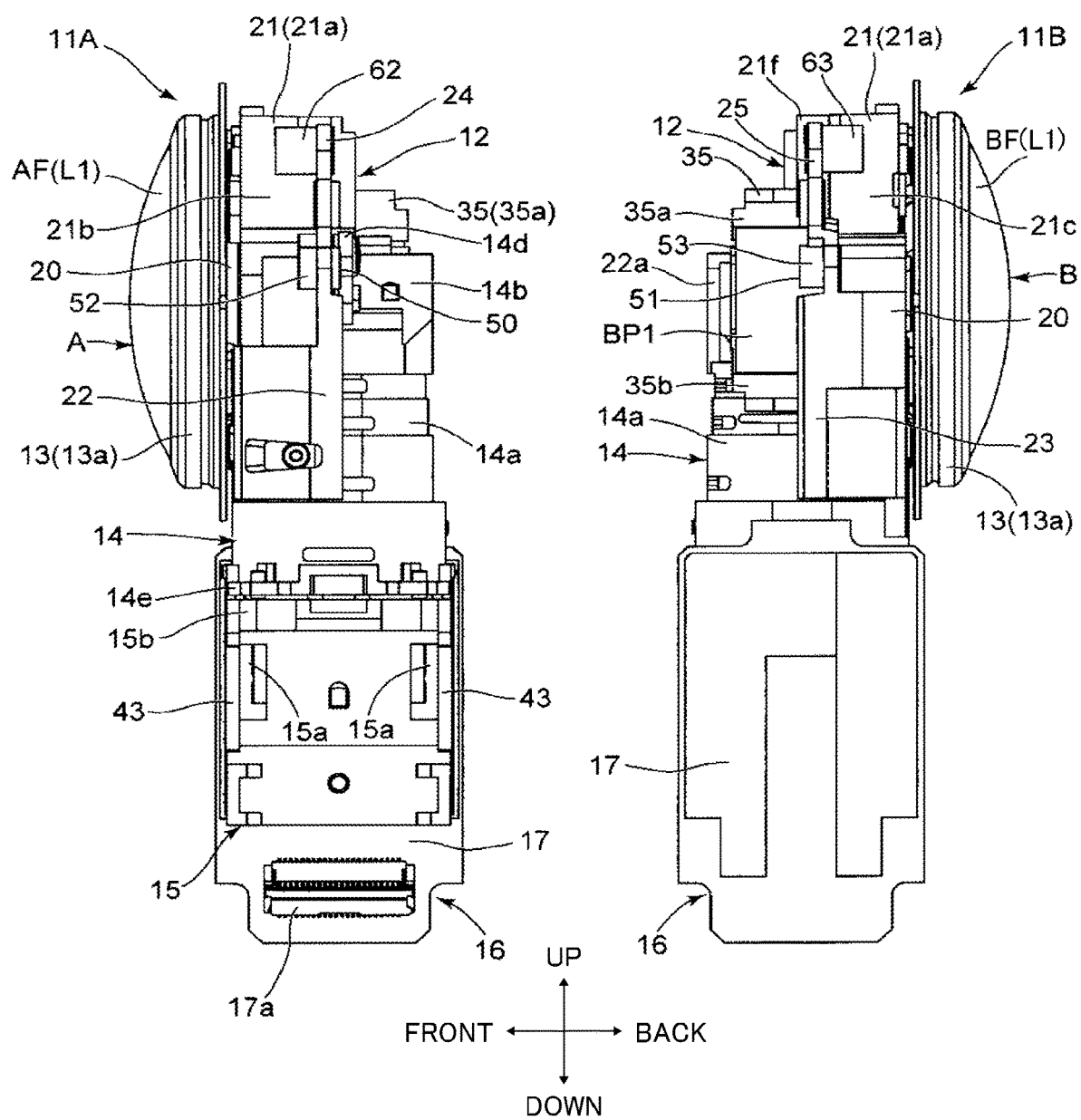
FIG. 10 is a left-side view of the two separate lens barrels in FIG. 9.

As illustrated in FIG. 10, each of the lens barrel 11A and the lens barrel 11B has a size in the front-to-back direction accommodated within the width in the lateral direction (the front-to-back direction) of the substrate 17, except for a portion where each of the front groups AF and BF and a part of the front group frame 13 are exposed to the outside of the imaging apparatus 80. Each of the wide-angle lens system A and B is configured to be a folded optical system in which the optical path is bent multiple times using a plurality of prisms (the light is reflected (redirected) by a prism multiples times (a plurality of prisms are disposed to reflect the light multiple times)) within a plane (plane between the lenses closest to the object side in the wide-angle lens systems A and B) perpendicular to the optical axis X1. This configuration enables the lens barrel 11A and the lens barrel 11B to be thin in the front-to-back direction.

The lens barrel 11A and the lens barrel 11B having the same structure are combined to be together and opposed to each other along the front-to-back direction (see FIGS. 9 and 12), which provides the composite lens barrel 10 in a complete state as illustrated in FIGS. 4 to 8. As illustrated in FIGS. 9 to 12, the lens barrel 11A and the lens barrel 11B have a structure in which the protrusions and recesses of the lens barrel 11A and the lens barrel 11B are combined by bringing the lens barrels 11A and 11B together. This configuration enables the lens barrel 11A and the lens barrel 11B to be coupled to each other compactly.

Figure 5:
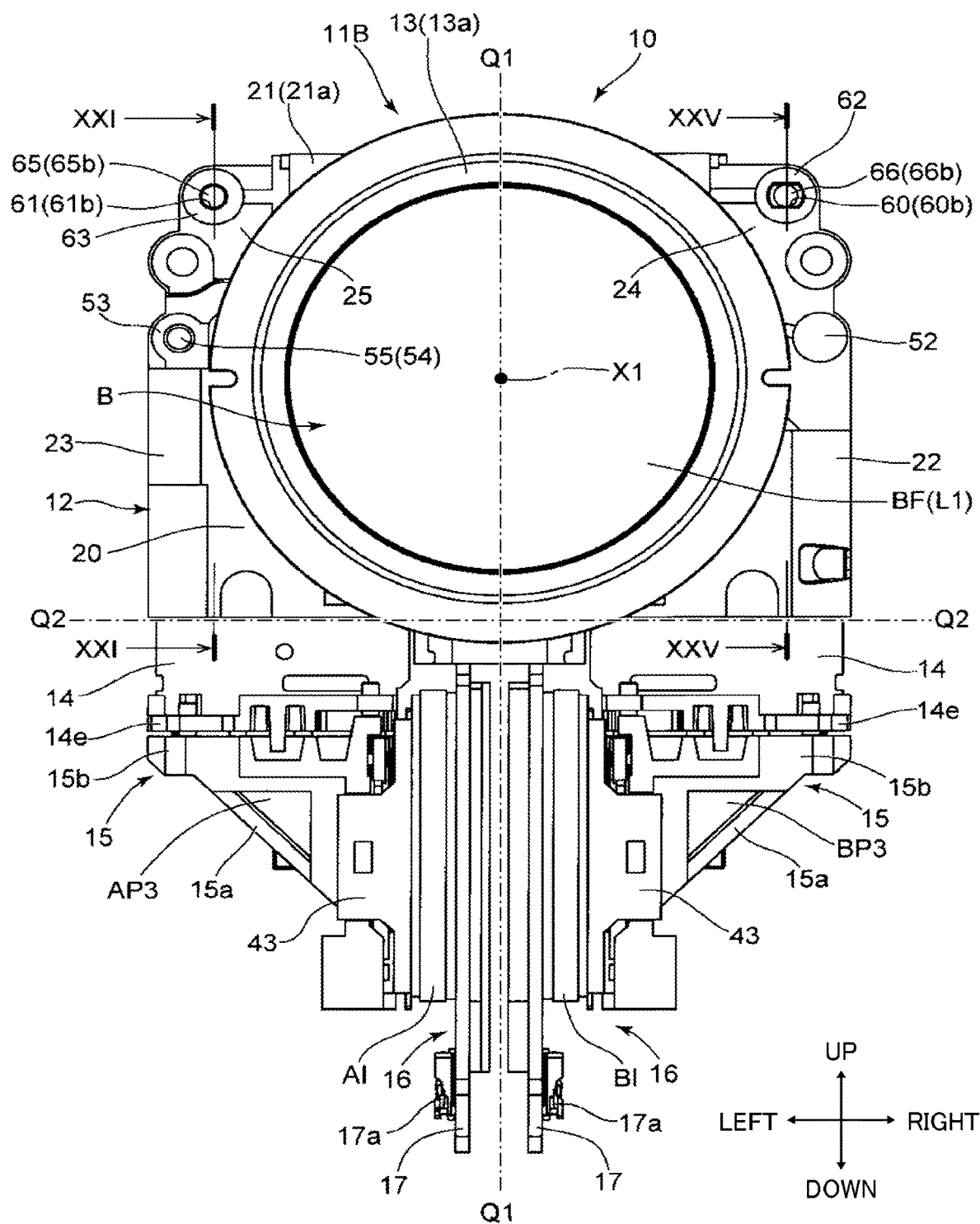
FIG. 5 is a rear view of the composite lens barrel in FIG. 4.
Figure 6:
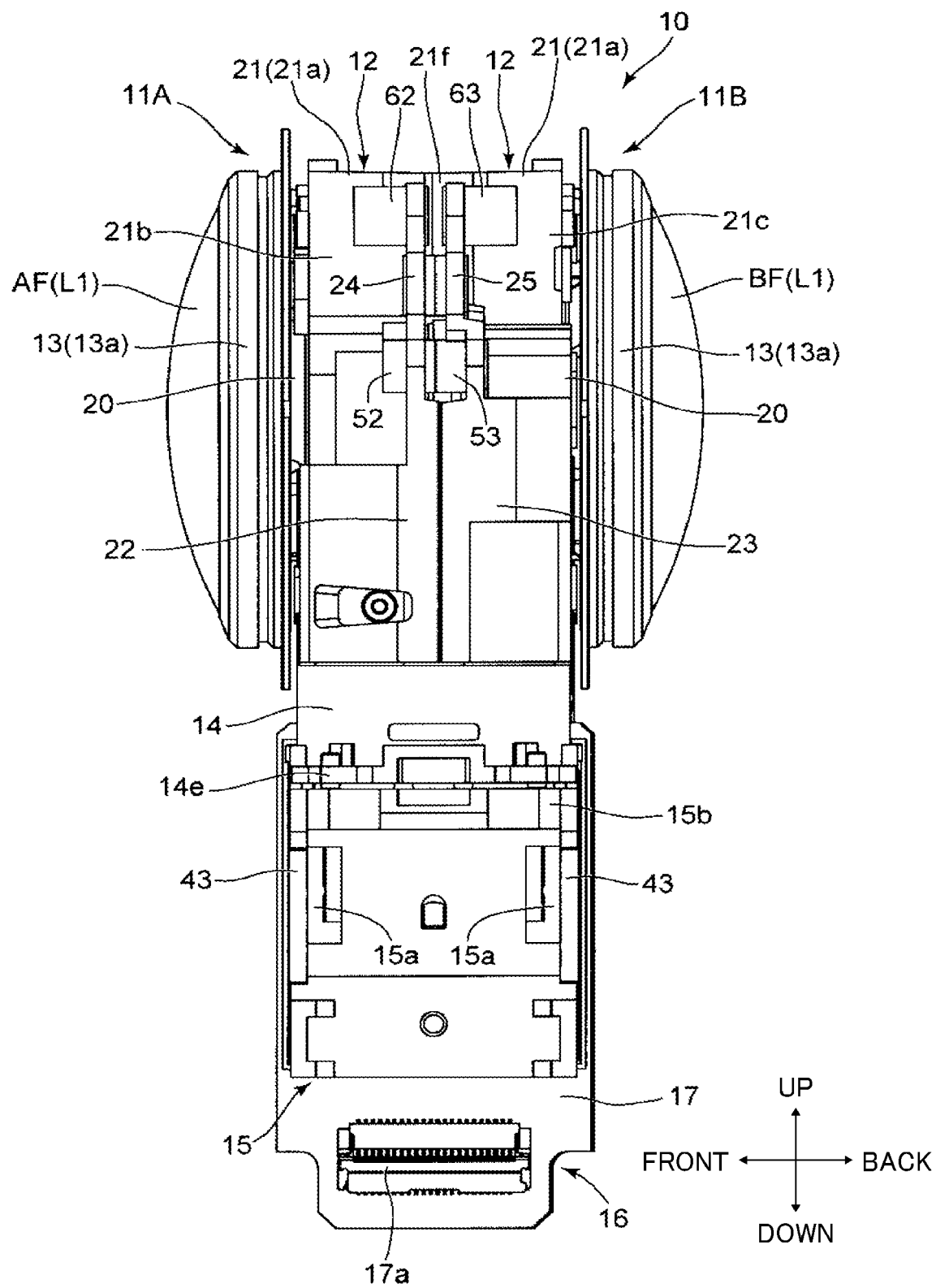
FIG. 6 is a left-side view of the composite lens barrel in FIG. 4.
Figure 11:
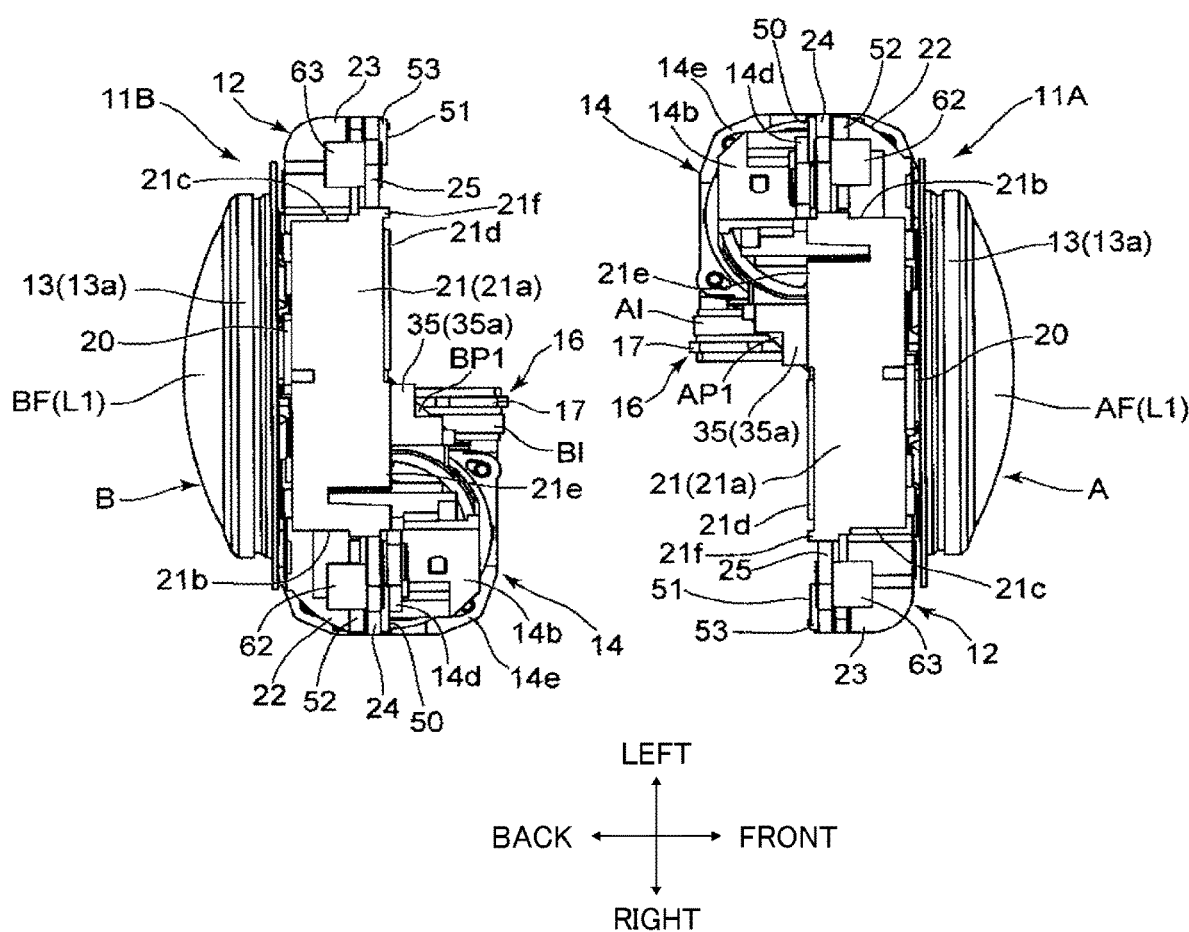
FIG. 11 is a top view of the two separate lens barrels in FIG. 9.
Figure 12:
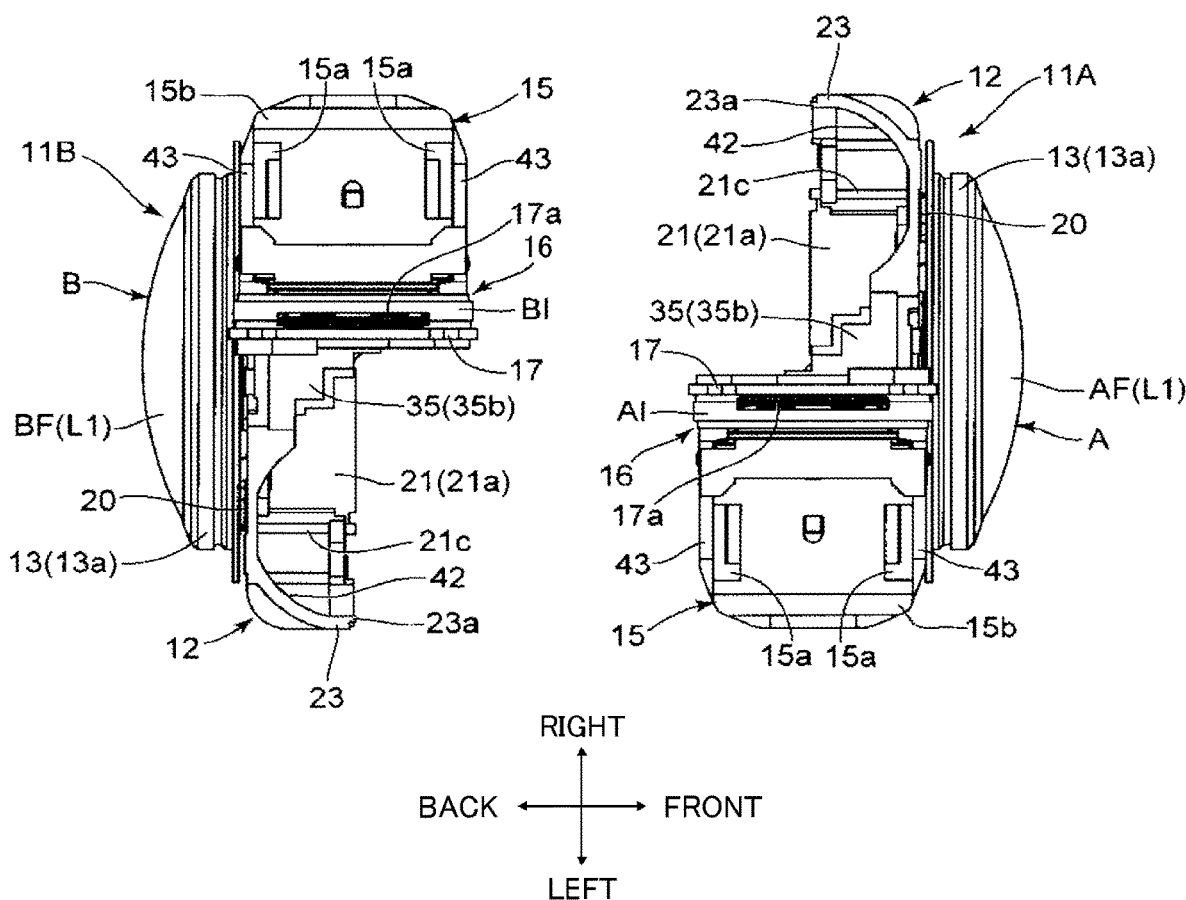
FIG. 12 is a bottom view of the two separate lens barrels in FIG. 9.

In FIG. 5, a virtual plane Q1 and a virtual plane Q2 are indicated. The virtual plane Q1 includes the optical axis X1 and extends along the up-to-down direction. The virtual plane Q2 is perpendicular to the virtual plane Q1 and passes through the lower end of the base frame 12. In the lens barrel 11A, the optical path from the second prism AP2 to the image sensor AI after being bent by the first prism AP1 passes through the left area of the virtual plane Q1. In the lens barrel 11B, the optical path from the second prism BP2 to the image sensor BI after being bent by the first prism BP1 passes through the right area of the virtual plane Q1. As illustrated in FIGS. 11 and 12, on the left side of the virtual plane Q1, the constituent elements of the lens barrel 11A project beyond the base frame 12 to the back side of the imaging apparatus 80, whereas the constituent elements of the lens barrel 11B does not project beyond the base frame 12 to the front side of the imaging apparatus 80. Similarly, on the right side of the virtual plane Q1, the constituent elements of the lens barrel 11B project beyond the base frame 12 to the front side of the imaging apparatus 80, whereas the constituent elements of the lens barrel 11A do not project beyond the base frame 12 to the back side of the imaging apparatus 80. Thus, when the lens barrel 11A and the lens barrel 11B are combined, the rear group frames 14, the third prism frames 15, and the image sensor units 16 on the lens barrel 11A side and the lens barrel 11B side are arranged side by side symmetrically without interfering with each other.

Further, in the wide-angle lens systems A and B, light beams from the object, which have been reflected by the first prisms AP1 and BP1 to the left and right, respectively, are reflected by the third prisms AP3 and BP3 to travel in a direction to the virtual plane Q1 and reach the image sensors AI and BI, respectively. For this reason, the image sensor unit 16 on the lens barrel 11A side is close to the image sensor unit 16 on the lens barrel 11B side along right-to-left direction. Particularly, the substrate 17 on the lens barrel 11A side is close to the substrate 17 on the lens barrel 11B side across the virtual plane Q1. In the central portion of each of the lens barrels 11A and 11B along right-to-left direction, the first prism AP1/BP1 is disposed above the virtual plane Q2, and the two image sensor units 16 are arranged with the back surfaces opposed to each other below the virtual plane Q2. The substrates 17 on the lens barrel 11A side and the lens barrel 11B side has a planar shape substantially parallel to the virtual plane Q1. Further, there is a clearance between the substrates 17 on the lens barrel 11A side and the lens barrel 11B side in the right-to-left direction. Such a configuration prevents these substrates 17 from interfering with each other when the lens barrel 11A is brought close to the lens barrel 11B.

Since the first prism AP1 and the first prism BP1 are arranged such that the slanted surfaces of the first prism AP1 and the first prism BP1 are in close contact with each other, the thickness of the composite lens barrel 10 in the front-to-back direction that is substantially occupied by the two prisms AP1 and BP1 merely corresponds to the space for one prism although the two prisms AP1 and BP1 are arranged side by side in the front-to-back direction (see FIG. 3). Further, the image sensor unit 16 of the lens barrel 11A and the image sensor unit 16 of the lens barrel 11B are substantially at the same position in the front-to-back direction and are arranged side by side in the right-to-left direction. Accordingly, with a space in the front-to-back direction of the composite lens barrel 10 sufficient to accommodate the width of one substrate 17 in the lateral direction, the two image sensor units 16 are able to be accommodated below the first prisms AP1 and BP1 in the composite lens barrel 10. With such a configuration, the thickness of the composite lens barrel 10 in the front-to-back direction can be reduced for the central portion of the composite lens barrel 10 in the right-to-left direction in which the constituent elements (the first prisms AP1 and BP1 and the image sensor units 16) of the lens barrels 11A and 11B overlap and for the vicinity of the ends of the composite lens barrel 10 in the right-to-left direction in each of which the constituent elements (the rear group frame 14 and the third prism frame 15) of one of the lens barrels 11A and 11B are disposed.

As described above, the constituent elements of the lens barrels 11A and the lens barrel 11B are disposed compactly in the composite lens barrel 10 in the front-to-back direction, the right-to-left direction, and the up-to-down direction. Thus, a compact structure is provided while including two lens barrels 11A and 11B.

As described above, the lens barrel 11A and the lens barrel 11B are disposed symmetrically along the front-to-back direction and brought together along the front-to-back direction so as to be combined with each other. Note that the lens barrel 11A and the lens barrel 11B are combined with a stable relative position such that the optical systems (the wide-angle lens systems A and B) of the lens barrels 11A and 11B face in the proper directions. Specifically, the lens barrel 11A and the lens barrel 11B are positioned in the front-front-to-back direction along the optical axis X1 and positioned in a direction along the plane perpendicular to the optical axis X1 (the up-to-down and right-to-left directions). Further, in order to make the imaging system 1 including the two optical systems (wide-angle lens systems A and B) work, after combining the lens barrel 11A and the lens barrel 11B (more specifically, after calibration of the imaging system 1 including the wide-angle lens systems A and B), a high bonding strength is needed to prevent a change in the relative positions between the lens barrels 11A and the lens barrel 11B due to, for example, external force.

A description is given of the structure that positions the lens barrel 11A and the lens barrel 11B in the front-to-back direction. On the base frame 12, a contact surface 50 is disposed on the back surface of the corner wall 24, and a contact surface 51 is disposed on the back surface of the corner wall 25. The contact surface 50 is formed as an end surface of a cylindrical boss 52 projecting forward and backward beyond the corner wall 24, and the contact surface 51 is formed as an end surface of a cylindrical boss 53 projecting forward and backward beyond the corner wall 25. Both the contact surface 50 and the contact surface 51 are annular planes perpendicular to the optical axis X1 and have a symmetrical shape in the front-to-back direction.

In the interior of the boss 52, a screw hole 54 whose long axis line is oriented in the front-to-back direction is formed. The screw hole 54 is open at the end on the back side at the contact surface 50, and the opposite front end is closed. Inside the boss 53, screw insertion holes 55 penetrating in the front-to-back direction are formed.

FIGS. 9 to 12 are illustrations of the lens barrel 11A and the lens barrel 11B with the contact surface 50 and the contact surface 51 of the lens barrel 11A facing the contact surface 51 and the contact surface 50 of the lens barrel 11B, respectively. When the lens barrel 11A and the lens barrel 11B are brought together in the front-to-back direction with this relative position, the contacts surface 50 of the lens barrels 11A and 11B come into contact (abut) with and the contacts surface 51 of the lens barrels 11A and 11B, respectively, which determines the relative positions of the lens barrels 11A and 11B in the front-to-back direction. With such a contact state, the positional accuracy of the lens barrel 11A and lens barrel 11B of the composite lens barrel 10 in the front-to-back direction is controlled.

A screw is used to fix the lens barrel 11A to the lens barrel 11B. Specifically, a fixing screw is inserted into the screw insertion hole 55 of the lens barrel 11A from the front and screwed into the screw hole 54 of the lens barrel 11B. Further, a fixing screw is inserted into the screw hole 54 of the lens barrel 11B and screwed into the screw insertion hole 55 of the lens barrel 11B. By tightening the fixing screws, the lens barrel 11A and the lens barrel 11B are fixed to each other.

The base frame 12 of each of the lens barrels 11A and 11B holds (supports) a plurality of prisms (the first prism AP1, the first prism BP1, the second prism AP2, and the second prism BP2). Further, the front group frame 13 and the rear group frame 14 are attached to the base frame 12. That is, all the optical elements are supported by the base frame 12 as a support reference. Accordingly, as the assembly accuracy of the base frame 12 exerts a particularly great influence on the optical performance, the base frame 12 is provided with the contact surfaces 50 and 51 that serve as a relative position reference in the front-to-back direction of each of the lens barrels 11A and 11B.

The contact surface 50 and the contact surface 51 are disposed at the right and left ends of the base frame 12 along the right-to-left direction. The maximum distance between the contact surface 50 and the contact surface 51 in the right-to-left direction are provided under the dimensional restriction of the base frame 12. With an increase in the distance between the contact surface 50 and the contact surface 51 serving as a position reference, the two base frames 12 effectively are prevented from being tilted, and thus the accuracy of positioning of the lens barrels 11A and 11B is increased. As illustrated in FIG. 14, the contact surface 50 is disposed in a space on the back of the slanted surfaces of the second prisms AP2 and BP2. That is, the space is efficiently utilized. The contact surface 50 is disposed above the rear group frame holder 37 that holds the rear group frame 14. The contact surface 51 is disposed above the rear group frame accommodating section 42 that covers the rear group frame 14 from the back side. With such an arrangement, the contact surfaces 50 and 51 are disposed so as not to overlap with the positions of the rear groups AR and BR, the first prisms AP1 and BP1, and the second prisms AP2 and BP2, which are held by the respective base frames 12 on the back side. Further, the contact surface 50 and the contact surface 51 are disposed with a wide distance between the contact surface 50 and the contact surface 51.

The corner wall 24 includes the contact surface 50, and the corner wall 25 includes the contact surface 51. The corner wall 24 and the corner wall 25 are connected to the plurality of walls facing different directions in the vicinity of the upper wall 21 and the side walls 22 and 23. Accordingly, the corner wall 24 and the corner wall 25 have a planar shape and still high rigidity. That is, the contact surface 50 and the contact surface 51 have a high surface accuracy, which prevents the corner walls 24 and 25 from being distorted and allows for highly accurate of positioning when the contact surface 50 contacts the contact surface 51.

Further, as illustrated in FIG. 5, the boss 52 having the contact surface 50 and the boss 53 having the contact surface 51 are disposed substantially symmetrically relative to the optical axis X1 along the right-to-left direction. Such an arrangement provides a positioning accuracy equal in the front-to-back direction on the right and left sides of the optical axis X1, and is particularly advantageous in obtaining the positional accuracy of front groups AF and BF and the first prisms AP1 and BP1. Further, since the contact surfaces 50 and 51 provides high positioning accuracy and stability, the lens barrel 11A and the lens barrel 11B are combined without interfering with each other.

For example, when the lens barrel 11A is combined with the lens barrel 11B, the cylindrical portion 14a of the rear group frame 14 of a corresponding lens barrel 11A/11B comes into the rear group frame accommodating section 42 on the back side of each base frame 12, so that the cylindrical portion 14a (the rear group AR/BR) is positioned between the rear group frame holder 37 and the rear group frame accommodating section 42, which are opposed to each other. At this time, the rear group frame 14 (the rear group frame 14 on the lens barrel 11A side) that holds the rear group AR is covered from the back side (rear side) by the rear group frame accommodating section 42 provided on the base frame 12 of the lens barrel 11B. However, the rear group frame accommodating section 42 on the lens barrel 11B side is not in contact with the rear group frame 14 on the lens barrel 11A side because there is a clearance therebetween in the front-to-back direction. Accordingly, the rear group frame 14 of the lens barrel 11A side is maintained (held) at a proper position within the rear group frame holder 37 on the base frame of the lens barrel 11A. Similarly, the rear group frame 14 (the rear group frame 14 on the lens barrel 11B side) that holds the rear group BR is covered from the back side (front side) by the rear group frame accommodating section 42 provided on the base frame 12 of the lens barrel 11A. However, the rear group frame accommodating section 42 on the lens barrel 11A side is not in contact with the rear group frame 14 on the lens barrel 11B side because there is a clearance therebetween in the front-to-back direction. Accordingly, the rear group frame 14 of the lens barrel 11B side is maintained (held) at a proper position within the rear group frame holder 37 on the base frame of the lens barrel 11B. In that manner, the base frames 12 are stably positioned with a high degree of accuracy using the contact surfaces 50 and 51, and thus each rear group frame 14 can be accommodated at a proper position of the rear group frame accommodating section 42 of each base frame 12 without any interference.

Each of the contact surface 50 and the contact surface 51 is a plane perpendicular to the optical axis X1, and has a symmetrical shape along the front-to-back direction. With such a configuration, when the lens barrel 11A is brought into contact with the lens barrel 11B along the optical axis X1 in the front-to-back direction so as to cause the contact surface 50 to contact the contact surface 51, no excess force is generated and a reliable and accurate positioning is made along the front-to-back direction.

The boss 52 having the contact surface 50 and the boss 53 having the contact surface 51 are both easily formed by a mold that separates in the front-to-back direction. Thus, the base frame 12 can be easily manufactured without an increase in cost.

When the lens barrel 11A is fixed to the lens barrel 11B with the contact surfaces 50 and 51 contact each other, the upper walls 21, the side walls 22, and the side walls 23 of the base frames 12 are combined to form the outer wall of the composite lens barrel 10 that continuous in the front-to-back direction. More specifically, on the upper surface of the composite lens barrel 10, the edge portions of the upper walls 21 (top portion 21a) of the lens barrel 11A and the lens barrel 11B are in contact with each other. On the left side surface of the composite lens barrel 10, the edge portion of the side wall 22 of the lens barrel 11A is in contact with the edge portion of the side wall 23 of the lens barrel 11B. On the right side surface of the composite lens barrel 10, the edge portion of the side wall 23 of the lens barrel 11A is in contact with the edge portion of the side wall 22 of the lens barrel 11B. These edge portions are opposed to each other with a slight clearance therebetween when the contact surfaces 50 and 51 contact each other, which exerts no influence on the positioning accuracy in the front-to-back direction by the contact surface 50 contacting the contact surface 51. A light shielding structure (a light shield: a rib 21d, a rib 21e, a rib 22a, a rib 23a) that prevents undesirable external light from entering the composite lens barrel 10 even with a clearance therebetween is provided at each edge portion of the upper wall 21, the side wall 22, and the side wall 23.

Figure 7:
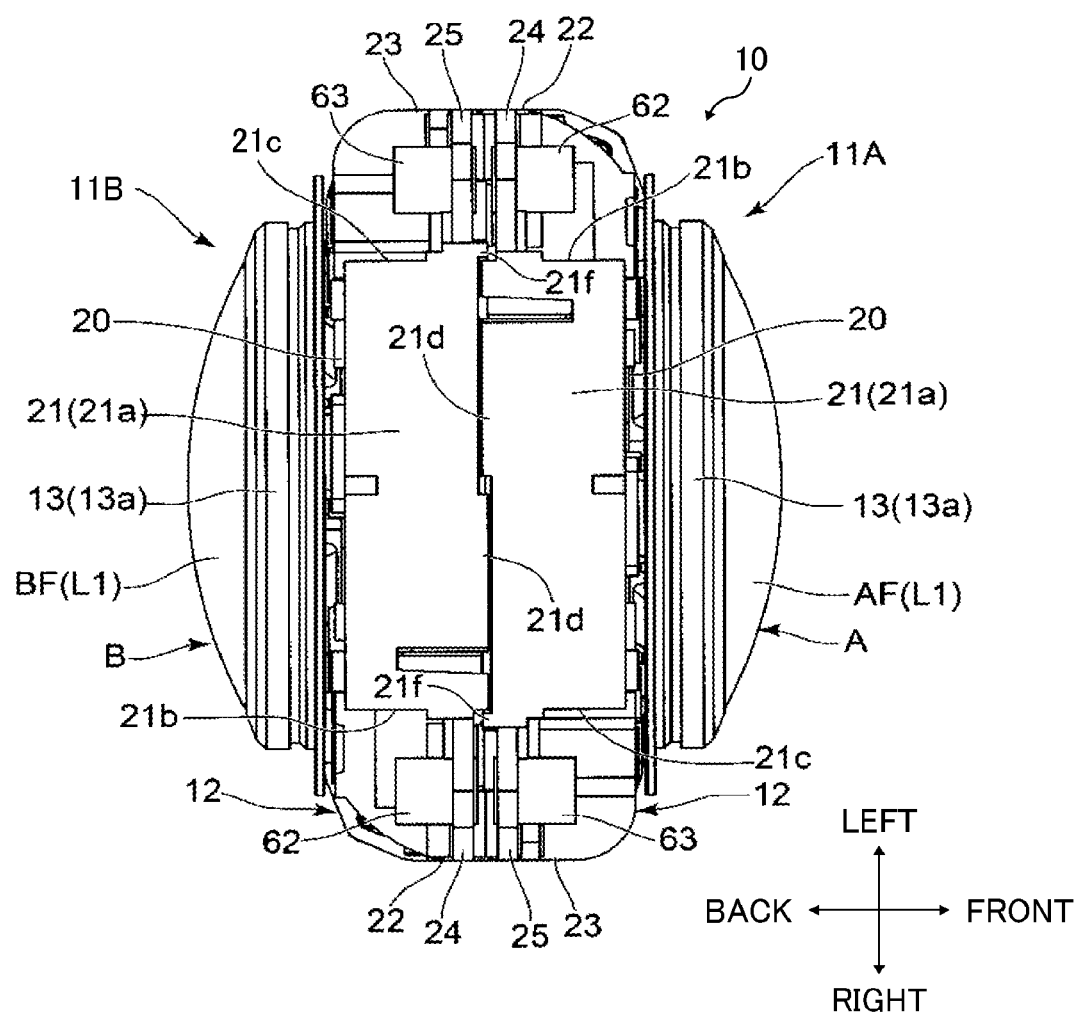
FIG. 7 is a top view of the composite lens barrel in FIG. 4.
Figure 8:
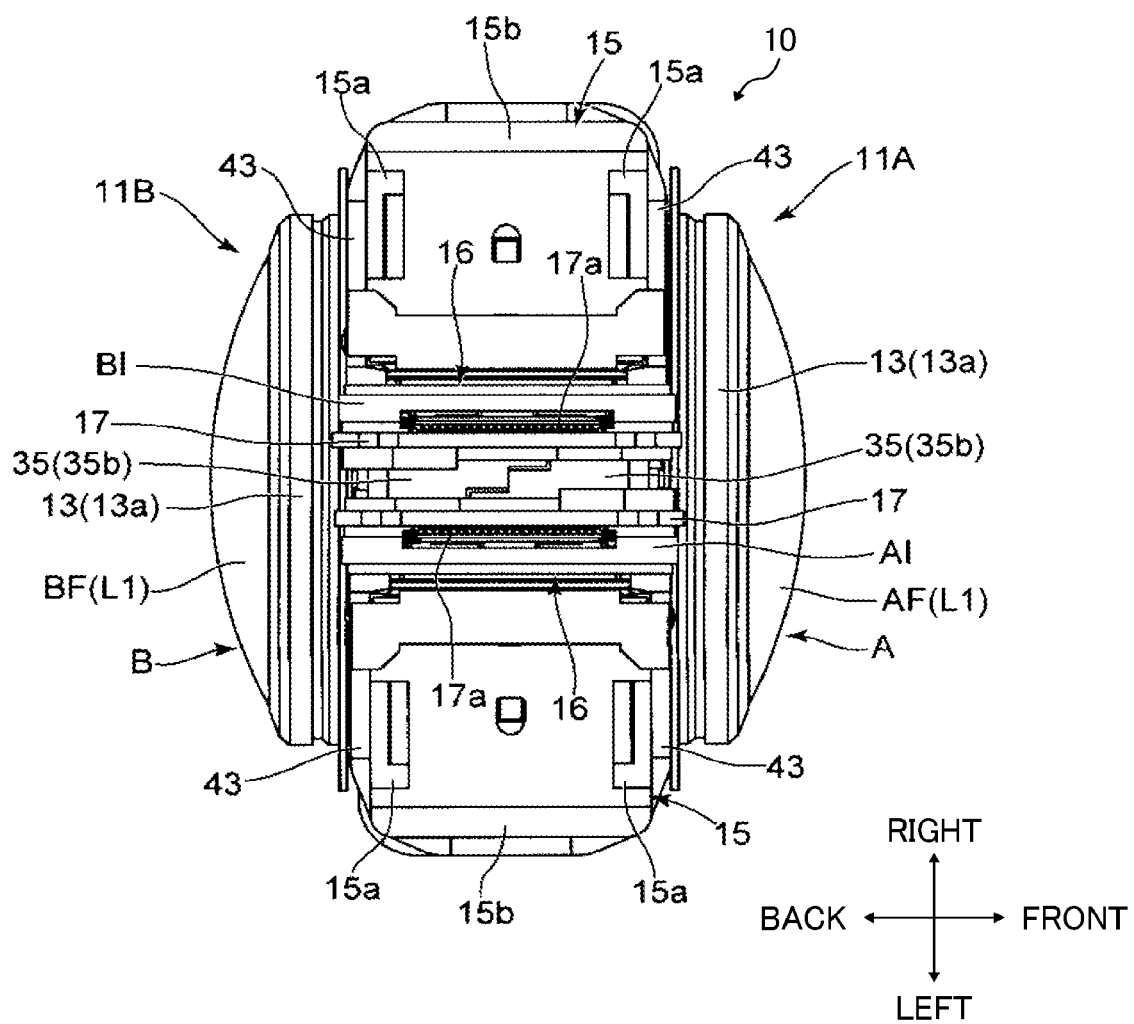
FIG. 8 is a bottom view of the composite lens barrel in FIG. 4.
Figure 16:
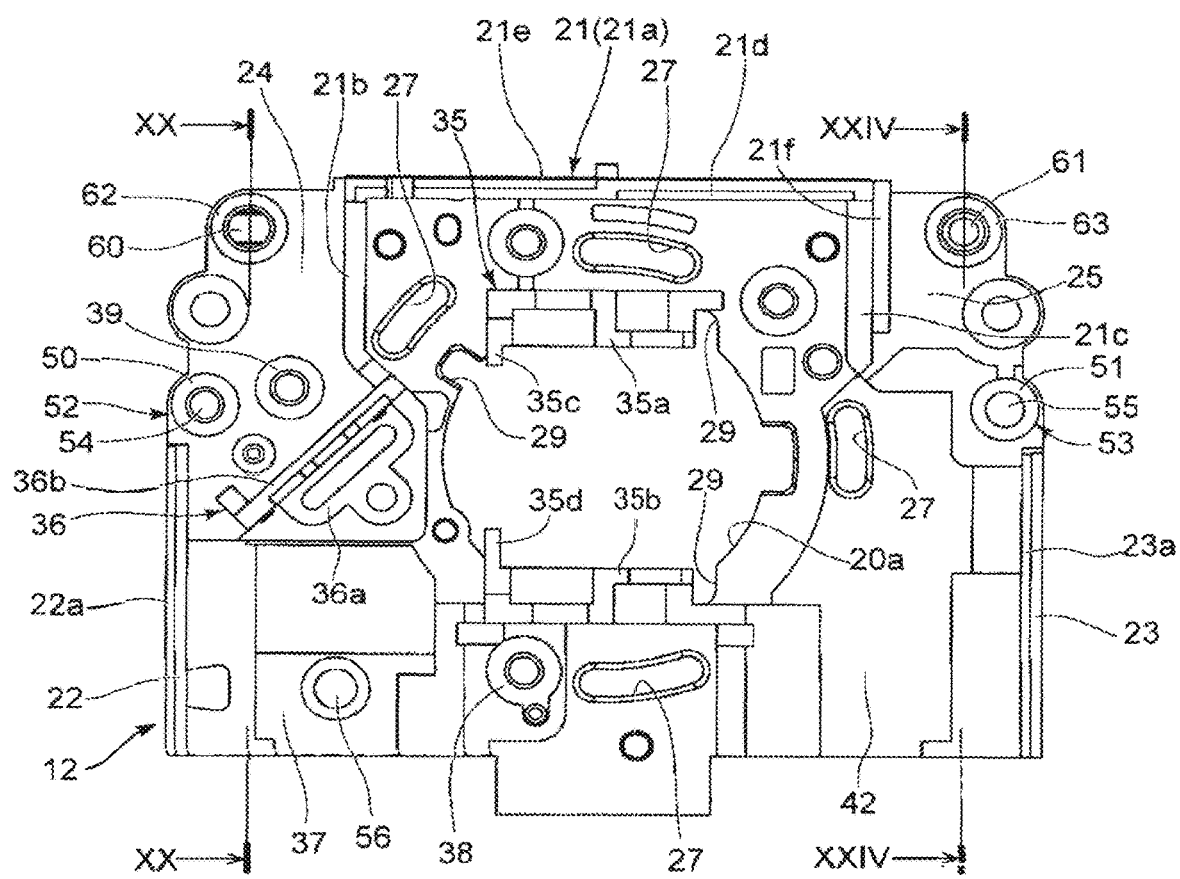
FIG. 16 is a rear view of the base frame.
Figure 16:
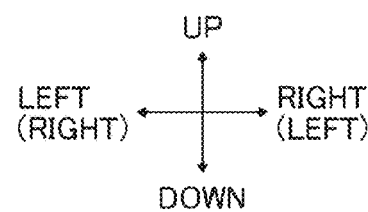
Figure 17:
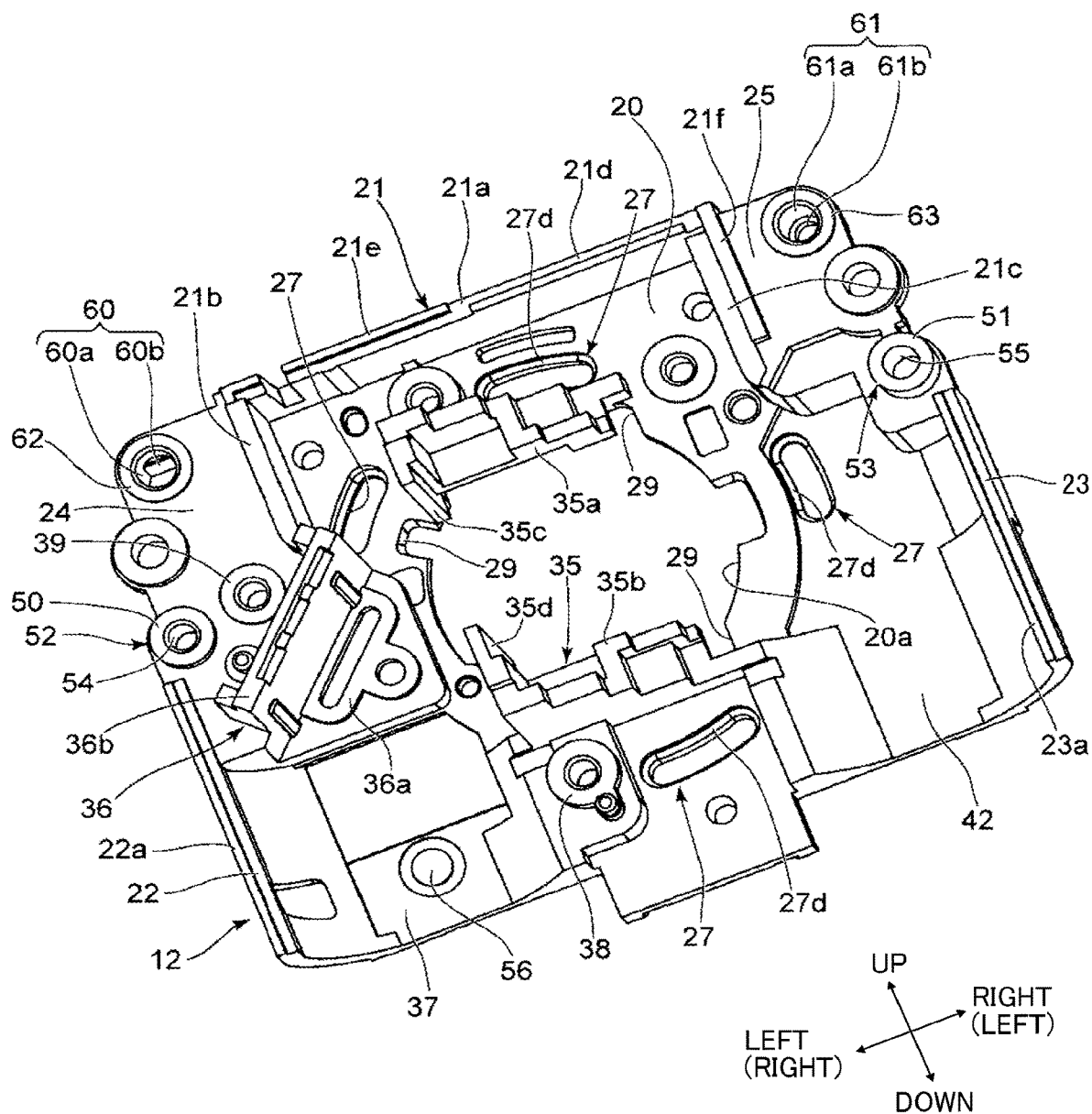
FIG. 17 is a perspective view of the base frame as viewed from the back side.
Figure 18:
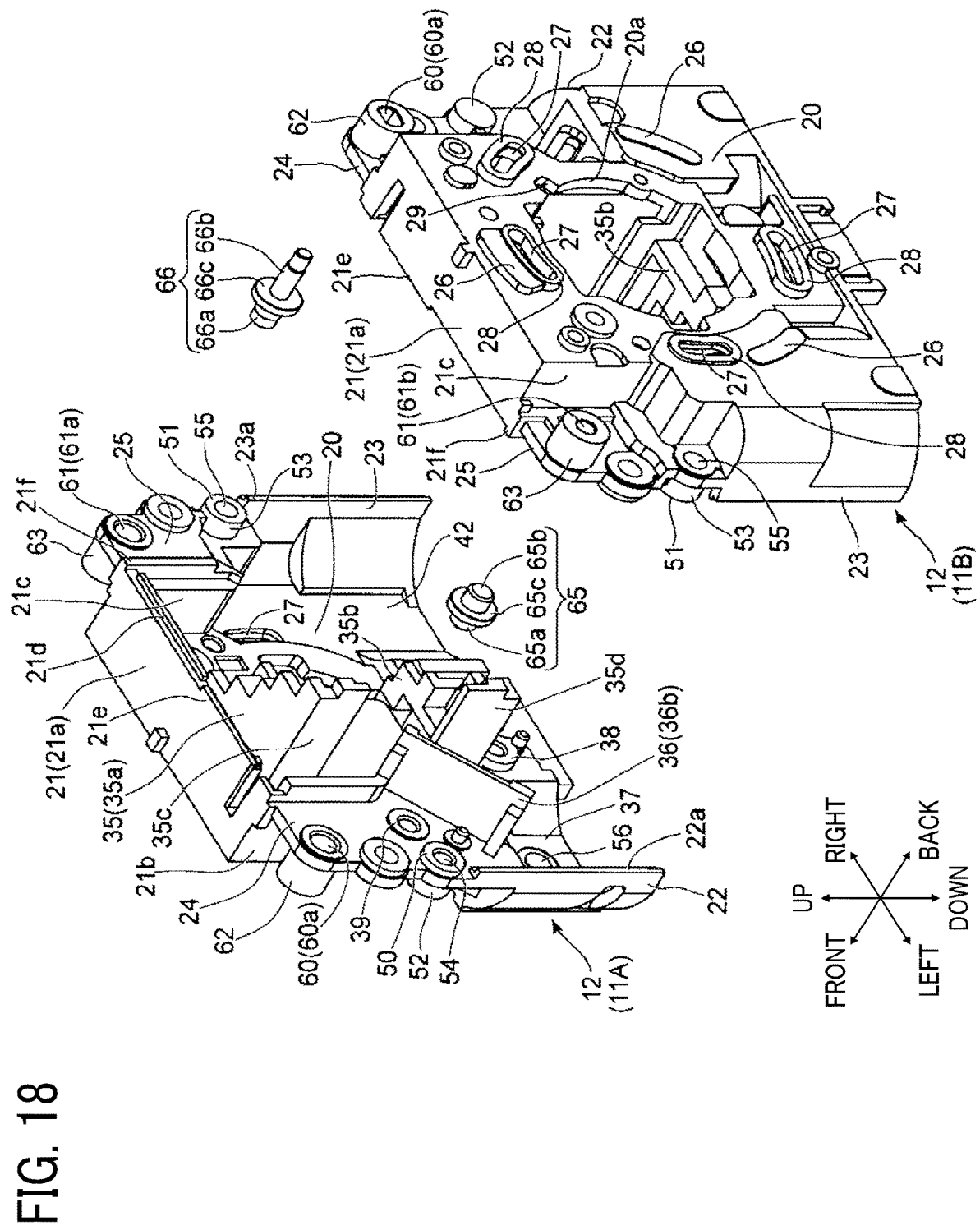
FIG. 18 is a perspective view of separate base frames of the two lens barrels.

Specifically, as illustrated in FIGS. 16 and 17, the ribs 21d and 21e are disposed at the end of the top portion 21a. The ribs 21d and 21e of the lens barrel 11A and the ribs 21d and 21e of the lens barrel 11B have relative positions to overlap with each other along the up-to-down direction when the lens barrel 11A and the lens barrel 11B are combined. The ribs 22a and 23a are disposed at the ends of the side walls 22 and the side walls 23 of the lens barrel 11A and the lens barrel 11B, and have relative positions to overlap with each other along right-to-left direction when the lens barrel 11A and the lens barrel 11B are combined. With such an overlap, external light is blocked. As illustrated in FIGS. 7, 11, and 17, a rib 21f is disposed on the side portion 21c and projects backward from the top portion 21a. When the lens barrel 11A and the lens barrel 11B are combined, the rib 21f overlaps with a part of the side portion 21b of the corresponding lens barrel in the right-to-left direction (see FIG. 7). With such a configuration in which the rib 21f overlaps with the side portion 21b, external light is blocked.

As described above, the relative positions of the lens barrel 11A and the lens barrel 11B in the front-to-back direction are determined by the contact surface 50 contacting the contact surface 51. Further, a predetermined clearance is provided along the front-to-back direction between the lens barrel 11A and the lens barrel 11B in an area except the areas of the contact surface 50 and the contact surface 51.

Each of the upper wall 35a and the lower wall 35b of the first prism holder 35 is formed such that the edge facing the back side has a stepwise shape formed by continuous sets of a plane perpendicular to the optical axis X1 and a plane parallel to the optical axis X1. When the lens barrel 11A and the lens barrel 11B are combined, the stepped edge of the upper wall 35a of one of the lens barrel 11A and the lens barrel 11B is opposed to the stepped edge of the lower wall 35b of the other lens barrel 11A or 11B in the front-to-back direction with a slight clearance. When an excessive load (an excessive load in a direction in which the lens barrel 11A and the lens barrel 11B are brought together) is applied to the lens barrel 11A and the lens barrel 11B in the front-to-back direction, the edge of the upper wall 35a (the lower wall 35b) of the lens barrel 11A comes into contact with the edge of the upper wall 35a (the lower wall 35b) of the lens barrel 11B, which receives the load. That is, the opposing portions of the upper wall 35a and the lower wall 35b are used as an auxiliary contact surface to distribute the load between the lens barrel 11A and the lens barrel 11B, which strengthens the composite lens barrel 10 as a whole. Since the edges of the upper wall 35a and the lower wall 35b, i.e., the planes perpendicular to the optical axis X1 are opposed to each other, unnecessary component forces are not generated when the planes are brought into contact, so that the loads are reliably received by the planes. Particularly, the position at which the first prism holder 35 is provided is around the intermediate position between the contact surface 50 and the contact surface 51 which are significantly separated right-to-left direction, and a position at which the first prisms AP1 and BP1 are held having a significant influence on the optical performance. By receiving the load with the front and back load with the first prism holders 35 as an auxiliary tool, the strength of the composite lens barrel 10 as a whole is increased and the optical performance is obtained.

As described above, when the lens barrel 11A and the lens barrel 11B are combined, the cylindrical portion 14a of the rear group frame 14 fits in the space between the rear group frame holder 37 and the rear group frame accommodating section 42, which are opposed to each other in the front-to-back direction. On the back side of the base frame 12, a rear group frame opposing part 56 is formed in the rear group frame holder 37 (see FIGS. 16 to 19). The rear group frame opposing part 56 is a plane perpendicular to the optical axis X1. As illustrated in FIG. 13, the rear group frame 14 has an opposing convex portion 14f on the front side facing the rear group frame holder 37 of the base frame 12. The opposing convex portion 14f is provided at a position facing the rear group frame opposing part 56 of the base frame 12 with the rear group frame 14 attached to the base frame 12. In view of design, the opposing convex portion 14f is configured to contact the rear group frame opposing part 56. If there is a tolerance error that separates the opposing convex portion 14f from the rear group frame opposing part 56, a flexible member is inserted between the base frame 12 and the rear group frame 14 to give a biasing force to the rear group frame 14 so as to come into contact with the rear group frame opposing part, which provides a stable contact action. Specifically, when the opposing convex portion 14f of the rear group frame 14 is separated from the rear group frame opposing part 56 on the lens barrel 11A side, a flexible member is disposed on the inner surface of the rear group frame accommodating section 42 of the base frame 12 on the lens barrel 11B side. Accordingly, the rear group frame 14 on the lens barrel 11A is pressed forward to make the opposing convex portion 14f contact the rear group frame opposing part 56. In such a manner, the position of the rear group frame 14 is controlled with high accuracy in each of the lens barrels 11A and 11B. Note that the positioning of the rear group frame 14 does not hamper the positioning of the lens barrels 11A and 11B using the contact surfaces 50 and 51.

A description is given of a configuration that determines the positions of the lens barrel 11A and the lens barrel 11B in a direction perpendicular to the optical axis X1. In this configuration, the base frame 12 on the lens barrel 11A side is a supporting holder (which is referred to simply as a holder) as a positioning reference, and the base frame 12 on the lens barrel 11B is a supported lens barrel to be positioned. The base frame 12 of each of the lens barrel 11A and lens barrel 11B has a first hole 60 and a second hole 61. A first hole 60 is formed inside a cylindrical boss 62 projecting forward and backward beyond the corner wall 24, and a second hole 61 is formed inside a cylindrical boss 63 projecting forward and backward beyond the corner wall 25. The boss 62 is positioned above the boss 52 having the contact surface 50, and the boss 63 is positioned above the boss 53 having the contact surface 51. Both the first hole 60 and the second hole 61 are through-holes penetrating the base frame 12 in the front-to-back direction. The first hole 60 and the second hole 61 are provided at substantially symmetrical positions (substantially equidistant from the virtual plane Q1 in the right-right-to-left direction) with respect to the virtual plane Q1 (FIG. 5) including the optical axis X1 and extending in the up-to-down direction.

The first hole 60 has a circular hole 60a and an elongated hole 60b which are communicable with each other in the front-to-back direction. The circular hole 60a is positioned on the back surface of the base frame 12, and the elongated hole 60b is positioned on the front surface of the base frame 12. The circular hole 60a is a circular hole having a cylindrical inner peripheral surface around an axis oriented in the front-to-back direction. The elongated hole 60b is an elongated hole having a long direction along the right-to-left direction (the radial direction of the circular hole 60a) perpendicular to the front-to-back direction (the axial direction of the first hole 60), and has a pair of parallel planes 60c opposed to each other up-to-down direction inside. Each plane 60c is a plane parallel to the optical axes X1, X2, and X4 and perpendicular to the optical axis X3. The pair of planes 60c are formed at positions vertically symmetrical about the axis of the circular hole 60a. As illustrated in FIGS. 22A, 22B, 26A, and 26B, the vertical dimension K2 (the distance between the pair of planes 60c) of the elongated hole 60b is smaller than the inner diameter K1 of the circular hole 60a. Further, the length M2 of the elongated hole 60b in the front-to-back direction is longer than the length M1 of the circular hole 60a in the front-to-back direction.

The second hole 61 has a circular hole 61a and a small diameter hole 61b which are communicable with each other in the front-to-back direction. The circular hole 61a is positioned on the back surface of the base frame 12, and the small diameter hole 61b is positioned on the front surface of the base frame 12. Each of the circular hole 61a and the small diameter hole 61b is a circular hole having a cylindrical inner peripheral surface around an axis oriented in the front-to-back direction. The circular hole 61a and the small diameter hole 61b have different inner diameters. As illustrated in FIGS. 22A, 22B, 26A, and 26B, the inner diameter K4 of the small diameter hole 61b is smaller than the inner diameter K3 of the circular hole 61a The length M3 of the circular hole 61a in the front-to-back direction is longer than the length M4 of the elongated hole 60b in the front-to-back direction.

In the first hole 60 and the second hole 61, the inner diameter K1 of the circular hole 60a is substantially equal to the inner diameter K3 of the circular hole 61a, and the vertical width K2 of the elongated hole 60b is substantially equal to the inner diameter K4 of the small diameter hole 61b. Regarding the length in the front-to-back direction is, the length M 3 of the circular hole 61a is longer than the length M2 of the elongated hole 60b. The length M2 of the elongated hole 60b is longer than the length M1 of the circular hole 60a. The length M1 of the circular hole 60a is longer than the length M4 of the small diameter hole 61b.

The entire length of the first hole 60 in the front-to-back direction is substantially the same as the entire length of the second hole 61 in the front-to-back direction. The first hole 60 has a tapered shape between the circular hole 60a and the elongated hole 60b whose width gradually decreases in a direction from the circular hole 60a to the elongated hole 60b. The entire length of the first hole 60 includes the length of the tapered portion.

Shaft member 65 (a first shaft member) and the shaft member 66 (a second shaft member) are inserted into the first hole 60 and the second hole 61 of the base frame 12, respectively in each of the lens barrels 11A and 11B. The shaft member 65 and the shaft member 66 are made of metal. FIGS. 22A, 22B, 26A, and 26B are enlarged views of the shaft member 65 and the shaft member 66, respectively.

The shaft member 65 has a shaft portion 65a (a first insertion section) and a shaft (a second insertion section) 65b aligned in the front-to-back direction, and a flange 65c (one restriction part) between the shaft portion 65a and the shaft portion 65b. The shaft portion 65a and the shaft portion 65b have cylindrical outer surfaces around the same axial line oriented in the front-to-back direction, and the outer diameters of the shaft portion 65a and the shaft portion 65b are substantially equal. The flange 65c has a larger diameter than the outer diameter of the shaft portion 65a and the shaft portion 65b does, and is an annular portion projecting from the outer surface of the shaft portion 65a and the shaft portion 65b.

The lengths of the shaft portion 65a and the shaft portion 65b in the front-to-back direction are equal to each other, and are slightly shorter than the length M1 of the circular hole 60 a in the first hole 60. The shaft portion 65a and the shaft portion 65b are symmetrical in the axial direction (the outer diameters and the lengths are the same) with respect to the flange 65c. Accordingly, if the shaft member 65 is inverted back and forth so that the shaft portion 65a faces the back side and the shaft portion 65b faces the front side, the same structure is obtained.

The outer diameter of the shaft portion 65a and the shaft portion 65b is substantially equal to the inner diameter K1 of the circular hole 60a and the inner diameter K3 of the circular hole 61a. More specifically, the outer diameter of the shaft portion 65a and the shaft portion 65b is slightly larger than the inner diameters K1 and K3, and both the shaft portion 65a and the shaft portion 65b are inserted into the circular hole 60a and the circular hole 61a with a light press-in force.

The shaft member 66 includes a large diameter shaft 66a (a first shaft) and a small diameter shaft 66b (a second shaft) arranged in the front-to-back direction, and a flange 66c (the other restricting part) between the large diameter shaft 66a and the small diameter shaft 66b. The large diameter shaft 66a and the small diameter shaft 66b have cylindrical outer surfaces around the same axial line oriented in the front-to-back direction. The outer diameter of the large diameter shaft 66a is larger than the outer diameter of the small diameter shaft 66b. In addition, the length of the large diameter shaft 66a in the front-to-back direction is larger than the small diameter shaft 66b does.

The large diameter shaft 66a further includes a base end section 66d close to the flange 66c and a tip section 66e far from the flange 66c. The base end section 66d has a larger outer diameter than the tip section 66e does. The entire length of the large diameter shaft 66a (the sum of the lengths of the base end sections 66d and the tip section 66e) in the front-to-back direction is longer than the total length of the length M1 of the circular hole 60a and the length M4 of the small diameter hole 61b, and shorter than the total length of the length M2 of the elongated hole 60b and the length M3 of the circular hole 61a. In addition, the length of the base end section 66d in the front-to-back direction is longer than the length of the tip section 66e.

The small diameter shaft 66b further includes a base end section 66f close to the flange 66c and a tip section 66g far from the flange 66c. The base end section 66f has a larger outer diameter than the tip section 66g does. The entire length of the small diameter shaft 66b (the sum of the lengths of the base end sections 66f and the tip section 66g) in the front-to-back direction is slightly longer than the total length of the circular hole 60a, and is also slightly longer than the total length of the circular hole 61a. In addition, the length of the base end section 66f in the front-to-back direction is longer than the length of the tip section 66g. The length of the base end sections 66f is longer than each of the length M1 of the circular hole 60a, the length M2 of the elongated hole 60b, and the length M4 of the small diameter hole 61b. The length of the base end sections 66f is slightly shorter than the length M3 of the circular hole 61a. The length of the tip section 66 g is slightly larger than the length M4 of the small diameter hole 61b and slightly smaller than the length M1 of the circular hole 60a.

The outer diameter of the large diameter shaft 66a is substantially equal to the inner diameter K1 of the circular hole 60a and the inner diameter K3 of the circular hole 61a. More specifically, the outer diameter of the base end section 66d of the large diameter shaft 66a is slightly larger than the inner diameters K1 and K3, and the outer diameter of the tip section 66e is slightly smaller than the inner diameters K1 and K3. Accordingly, the large diameter shaft 66a is inserted into the circular hole 60a or the circular hole 61a with the base end section 66d lightly press-fit.

The outer diameter of the small diameter shaft 66b is substantially equal to the vertical width K2 of the elongated hole 60b and the inner diameter K4 of the small diameter hole 61b. More specifically, the outer diameter of the base end section 66f of the small diameter shaft 66b is slightly larger than the vertical width K2 and the inner diameter K4, and the outer diameter of the tip section 66g is slightly smaller than the vertical width K2 and the inner diameter K4. Accordingly, the small diameter shaft 66b is inserted into the elongated hole 60b or the small diameter hole 61b with the base end section 66f lightly press-fit. However, actually, the insertion of the base end section 66f into the small diameter hole 61b is restricted by the flange 66c (see FIG. 28).

In the drawings of the present embodiments, cases in which the position of the lens barrel 11B is adjusted with reference to the lens barrel 11A are illustrated. That is, cases in which the lens barrel 11A is a reference supporting lens barrel and the lens barrel 11B is a supported lens barrel to be positioned are described.

Figure 20A:
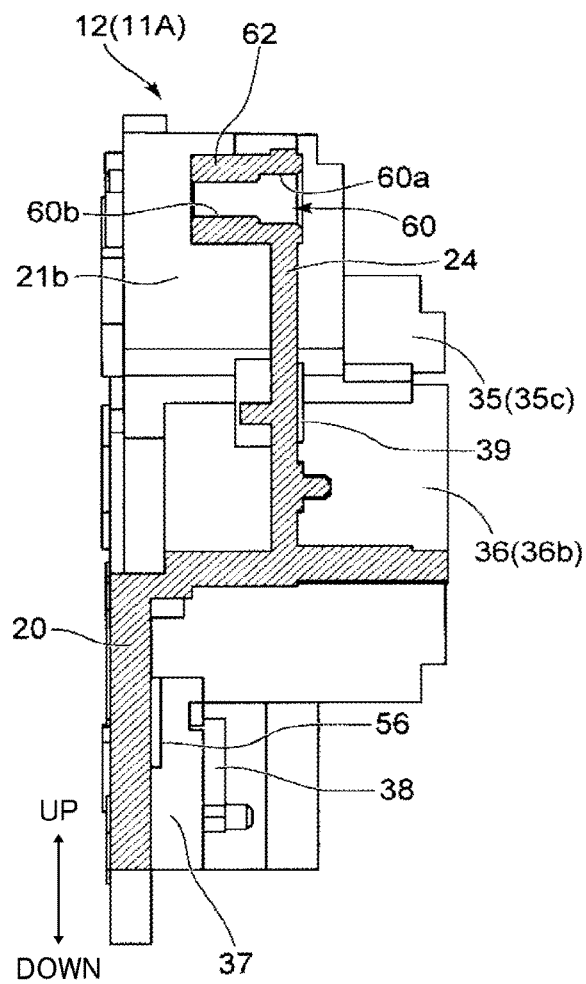
FIG. 20A is a cross-sectional view of the base frame without a shaft member mounted, taken along line XX-XX in FIGS. 15 and 16.
Figure 20B:
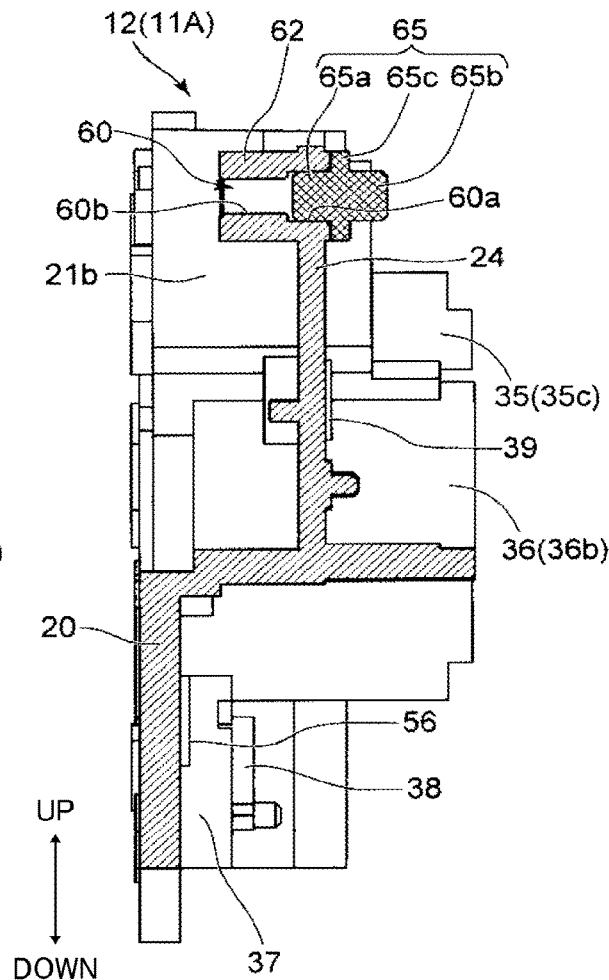
FIG. 20B is a cross-sectional view of the base frame with a shaft member mounted, taken along line XX-XX in FIGS. 15 and 16.

First, as illustrated in FIGS. 20A and 20B, the shaft portion 65a of the shaft member 65 is inserted into the first hole 60 on the lens barrel 11A side from the back side. The insertion of the shaft member 65 is restricted at a position at which the flange 65c contact the end face on the back side of the boss 62. Since the length of the shaft portion 65a is smaller than the length M1 of the circular hole 60a, the shaft portion 65a is inserted to the circular hole 60a without reaching the position of the elongated hole 60b (see FIGS. 22A and 22B). Since the outer diameter of the shaft portion 65a is slightly larger than the inner diameter K1 of the circular hole 60a, the shaft portion 65a is lightly press-fit by the circular hole 60a, and the shaft member 65 is stably mounted onto the base frame 12 on the lens barrel 11A side without rattling.

Further, as illustrated in FIGS. 24A and 24B, the large diameter shaft 66a of the shaft member 66 is inserted into the second hole 61 on the lens barrel 11A side from the back side. The insertion of the shaft member 66 is restricted at a position where the flange 66c comes into contact with the end face on the back side of the boss 63. Since the length of the large diameter shaft 66a is smaller than the length M3 of the circular hole 61a, the large diameter shaft 66a is inserted to the circular hole 61a without reaching the position of the small diameter hole 61b (see FIGS. 26A and 26B). Since the outer diameter of the base end section 66d is slightly larger than the inner diameter K3 of the circular hole 61a, the large diameter shaft 66a is lightly press-fit by the circular hole 61a, and the shaft member 66 is stably mounted onto the base frame 12 on the lens barrel 11A side without rattling.

Since the outer diameter of the tip section 66e of the large diameter shaft 66a is slightly smaller than the inner diameter K3 of the circular hole 61a, the large diameter shaft 66a is smoothly inserted into the circular hole 61a without being press-fit at the initial stage of insertion. In other words, the large diameter shaft 66a is configured to be press-fit at the final stage of insertion at which a stable support is needed, which facilitates improves insertion.

Figure 19:
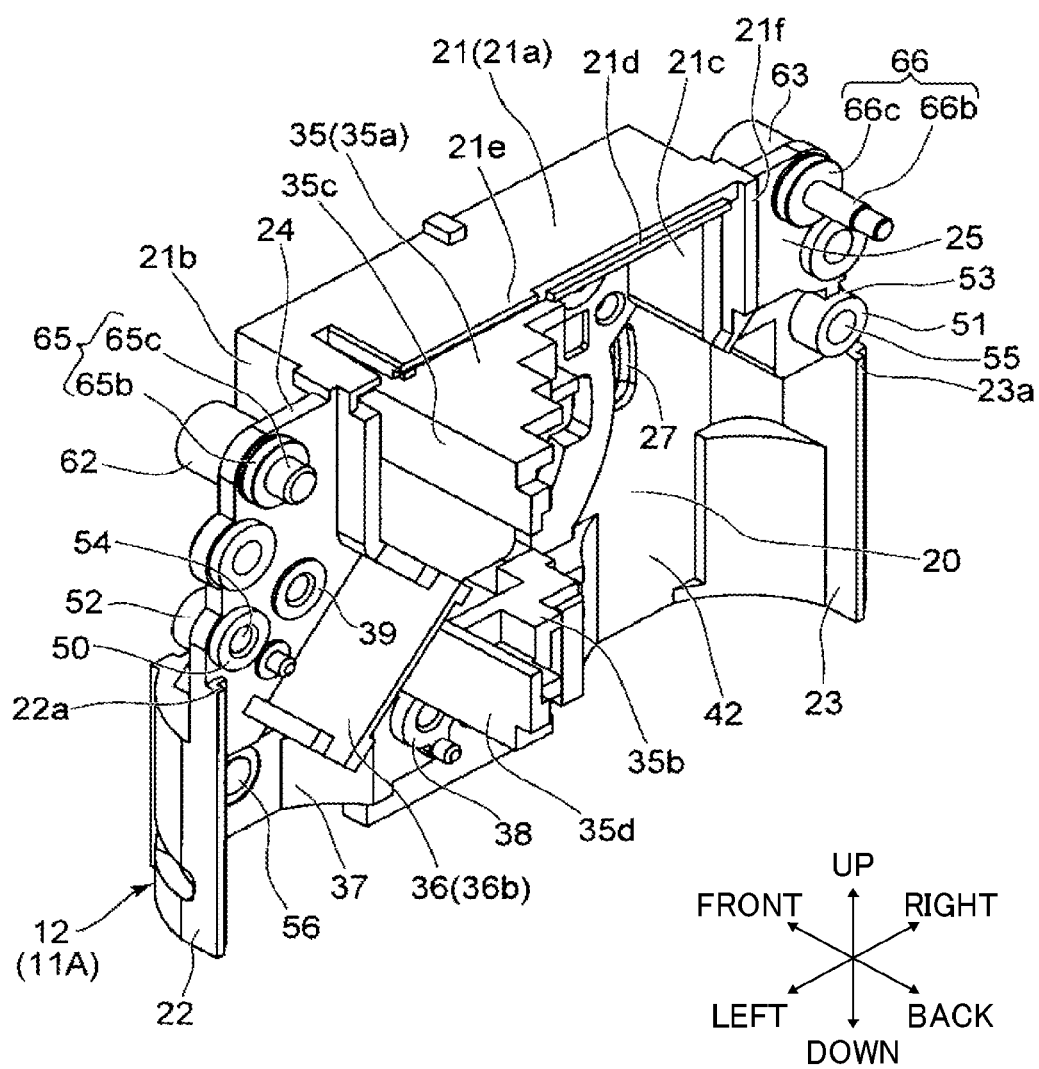
FIG. 19 is a perspective view of a base frame of the front-side lens barrel with two shaft members used for positioning attached.

FIG. 19 is an illustration of the shaft member 65 and the shaft member 66 attached to the base frame 12 on the lens barrel 11A side. As can be seen from FIG. 19, the shaft portion 65b of the shaft member 65 and the small diameter shaft 66b of the shaft member 66 project backward (to the back side of the lens barrel 11A).

The shaft member 65 and the shaft member 66 are attached to the lens barrel 11A at any desired timing. For example, as illustrated in FIG. 19, the shaft member 65 and the shaft member 66 are attached to a simplex base frame 12 in advance, and subsequently other components (for example, the rear group frame 14, the third prism frame 15, and the image sensor unit 16) are attached to the base frame 12. Alternatively, the components other than the shaft member 65 and the shaft member 66 are first attached to the base frame 12, and then the shaft member 65 and the shaft member 66 are attached to the base frame 12. In either case, since the shaft member 65 and the shaft member 66 are press-fit by the base frame 12, there is no possibility that the shaft member 65 and the shaft member 66 might fall accidentally after assembling. The first hole 60 and the second hole 61, into which the shaft member 65 and the shaft member 66 are inserted, are positioned on an upper end of the base frame 12, the upper end being away from the first prism holder 35, the second prism holder 36, the rear group frame holder 37, and the rear group frame accommodating section 42. With such an arrangement, after assembling the components other than the shaft members 65 and 66 to the base frame 12, it is still easy to access the first hole 60 and the second hole 61 to assemble the shaft members 65 and 66.

Figure 21:
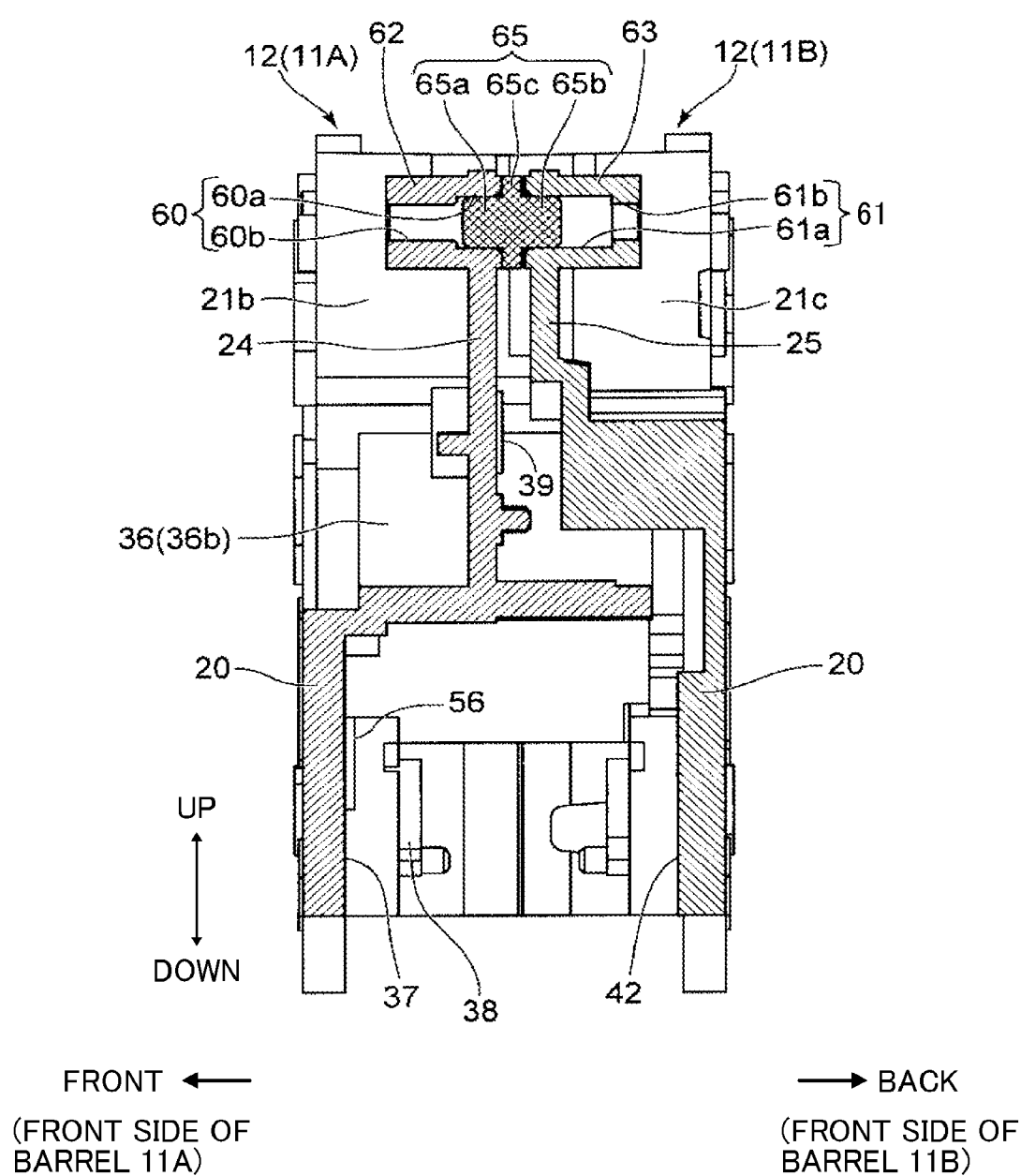
FIG. 21 is a cross-sectional view of a part of the lens barrels taken along line XXI-XXI in FIG. 5.
Figure 25:
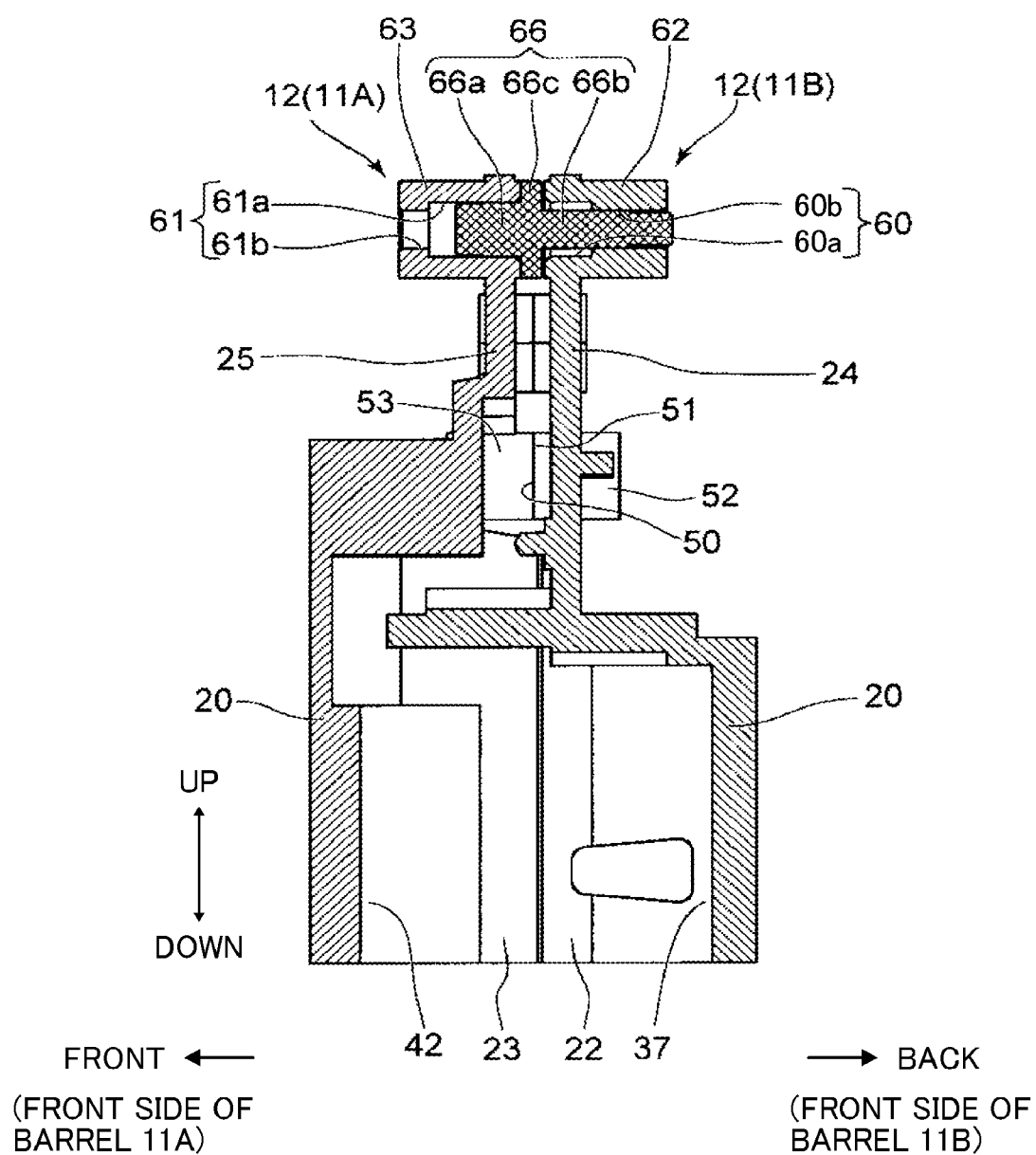
FIG. 25 is a cross-sectional view of a part of the lens barrels taken along line XXV-XXV in FIG. 5.

Subsequently, the lens barrel 11B is attached to the lens barrel 11A in which the shaft member 65 and the shaft member 66 are assembled. The second hole 61 (circular hole 61a) on the lens barrel 11B side is opposed to the shaft portion 65b of the shaft member 65, and the first hole 60 (circular hole 60a) on the lens barrel 11B side is opposed to the small diameter shaft 66b of the shaft member 66. That is, the circular hole 60a on the lens barrel 11A side and the circular hole 61a on the lens barrel 11B side are a pair of holes opposed to each other in the front-to-back direction, and the circular hole 61a on the lens barrel 11A side and the circular hole 60a on the lens barrel 11B is a pair of holes opposed to each other in the front-to-back direction. When the lens barrel 11A and the lens barrel 11B are brought together in the front-to-back direction, the shaft portion 65b is inserted into the second hole 61 of the lens barrel 11B (FIG. 21), and the small diameter shaft 66b is inserted into the first hole 60 of the lens barrel 11B (FIG. 25).

As described above, the contact surfaces 50 and 51 of the lens barrels 11A and 11B contact each other, which restricts further approach (the positions of the lens barrel 11A and the lens barrel 11B in the front-to-back direction is determined). As illustrated in FIGS. 22A, 22B, 26A, and 26B, when the contact surface 50 contacts the contact surface 51, there is a gap N in the front-to-back direction between the opposing end faces of the boss 62 and 63 on the base frames 12 of the lens barrels 11A and 11B. The thickness of each of the flange 65c of the shaft member 65 and the flange 66c of the shaft member 66 is slightly smaller than the gap N. Accordingly, the shaft member 65 and the shaft member 66 do not hamper positioning of the lens barrels 11A and 11B in the front-to-back direction using the contact surfaces 50 and 51.

Figure 22A:
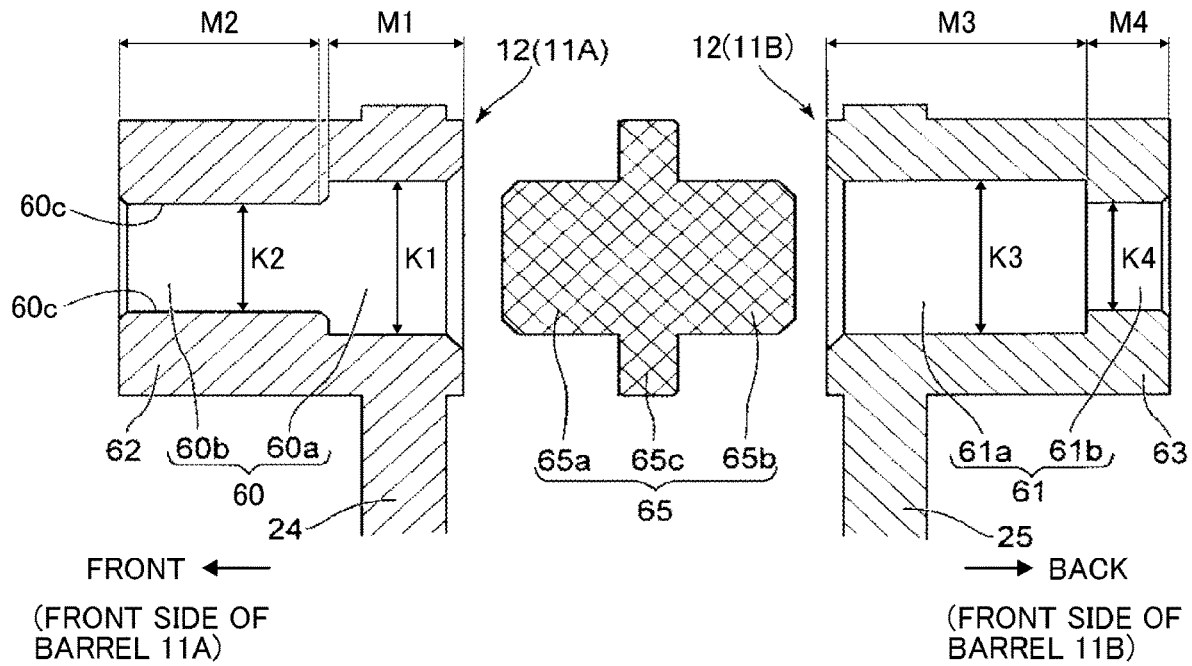
FIGS. 22A and 22B are cross-sectional views of a positioning mechanism on a main reference side.
Figure 22B:
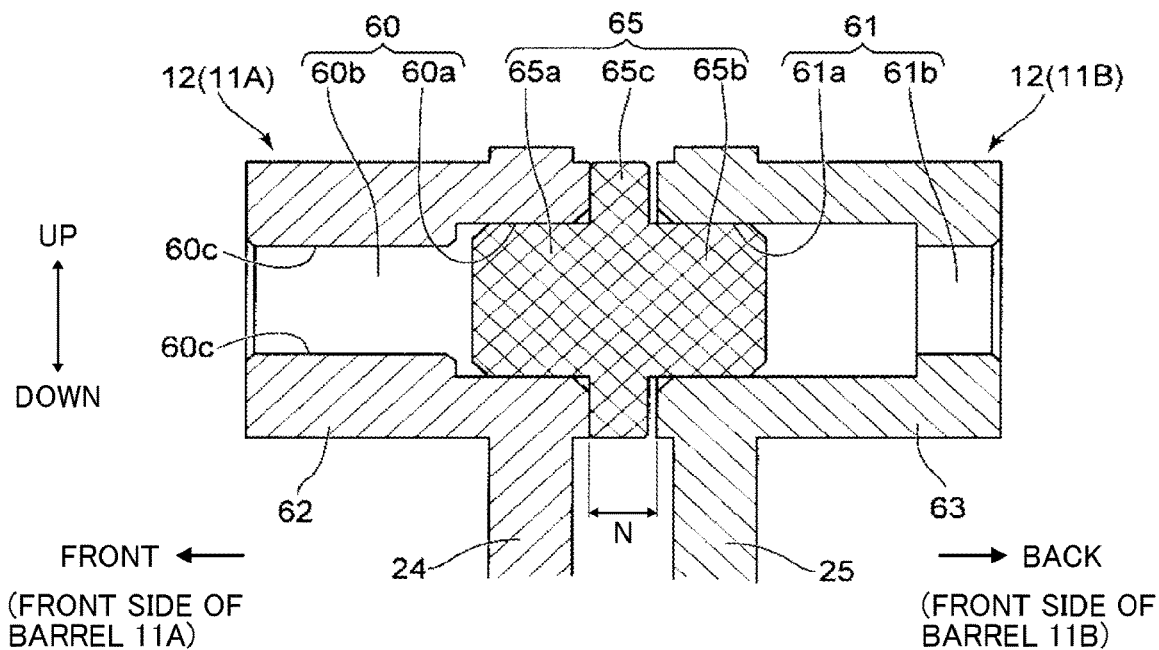

As illustrated in FIGS. 22A and 22B, since the length of the shaft portion 65b is shorter than the length M3 of the circular hole 61a, the shaft portion 65b is inserted to the circular hole 61a without reaching the position of the small diameter hole 61b in the second hole 61 on the lens barrel 11B side. Since the circular hole 61a of the cylindrical inner surface fits to the shaft portion 65b of the cylindrical outer surface, the movement of the base frame 12 on the lens barrel 11B side in the radial direction of the shaft portion 65b (all the direction perpendicular to the direction in which the first hole 60 and the second hole 61 are opposed to each other (the optical axis X1)) is restricted. With such a configuration, the relative positions of the lens barrel 11A and the lens barrel 11B are determined within a plane perpendicular to the optical axis X1.

Since the outer diameter of the shaft portion 65b is slightly larger than the inner diameter K3 of the circular hole 61a, the shaft portion 65b is lightly press-fit by the circular hole 61a. Accordingly, with the lens barrel 11A and the lens barrel 11B combined, the shaft member 65 might not rattle and generate abnormal noise.

Figure 26B:
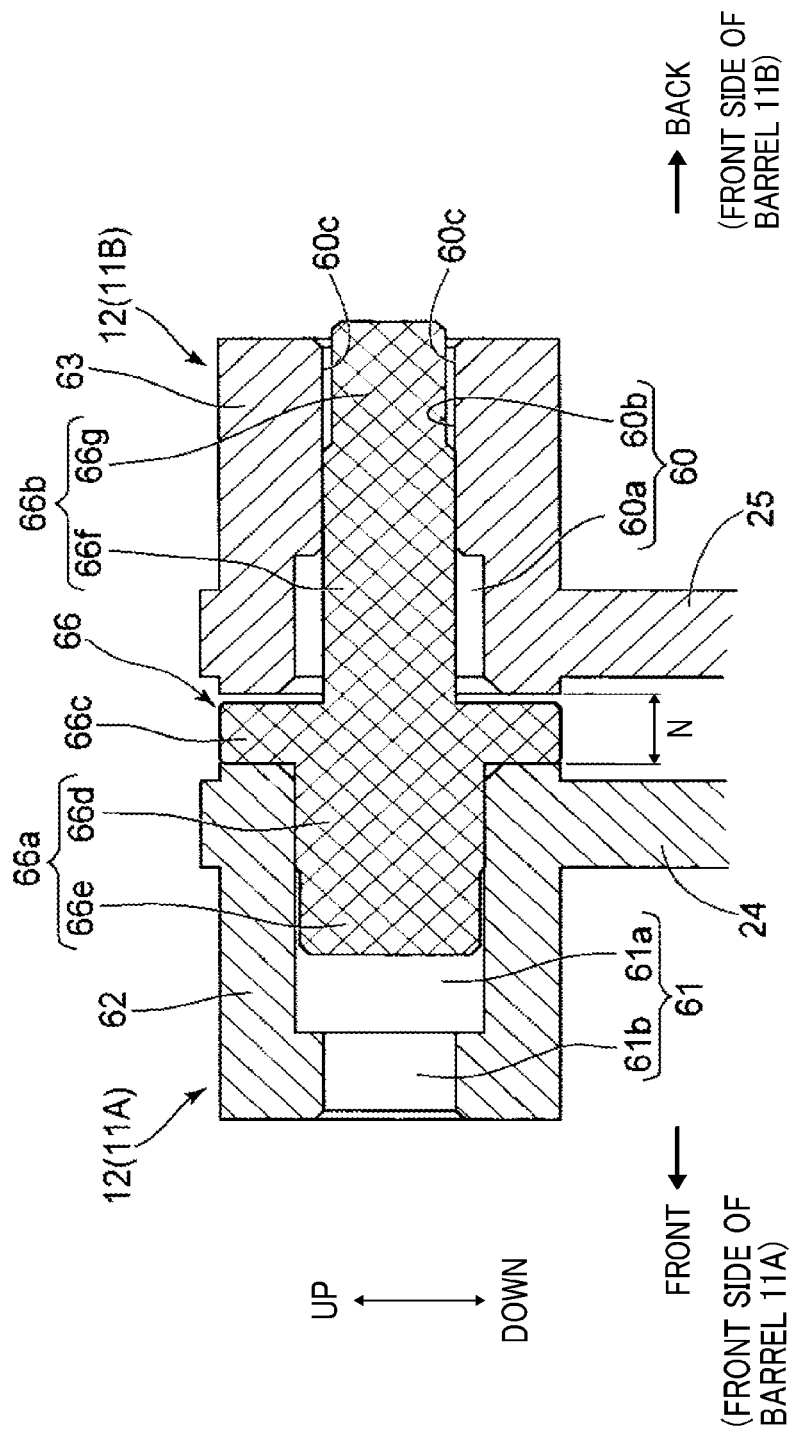

As illustrated in FIGS. 26A and 26B, the small diameter shaft 66b is inserted from the circular hole 60a side to the elongated hole 60b so as to be inserted into the first hole 60 on the lens barrel 11B side. Since the outer diameters of the base end section 66f and the tip section 66g are both smaller than the inner diameter K1 of the circular hole 60a, the small diameter shaft 66b does not contact the inner surface of the first hole 60 in the initial stage of insertion.

When the small diameter shaft 66b moves deeper inside of the first hole 60, the tip section 66g of the small diameter shaft 66b enters the elongated hole 60b. Since the outer diameter of the tip section 66g is smaller than the vertical width K2 of the elongated hole 60b, no load is generated between the shaft member 66 and the first hole 60 at this stage. When the small diameter shaft 66b moves still further inside of the first hole 60, the base end section 66f of the small diameter shaft 66b enters the elongated hole 60b. Then, the base end section 66f is sandwiched between a pair of up and down planes 60c in the elongated hole 60b, and accordingly a vertical movement of the base frame 12 on the lens barrel 11B side is restricted with respect to the small diameter shaft 66b. As a result, the rotation of the lens barrel 11A relative to the lens barrel 11B around the shaft member 65 is restricted.

Further, since the length of the elongated hole 60b in the right-to-left direction is larger than the outer diameter of the base end section 66f, the small diameter shaft 66b does not restrict the position of the lens barrel 11B in the right-to-left direction. That is, the elongated hole 60b of the lens barrel 11B is movable relative to the small diameter shaft 66b only in a certain direction (the right-to-left direction) within a plane perpendicular to the direction in which the first hole 60 and the second hole 61 are opposed to each other (the direction along the optical axis X1). With such a configuration, the small diameter shaft 66b and the first hole 60 work to cancel out the assembly tolerances between the lens barrel 11A and the lens barrel 11B.

Note that since the outer diameter of the base end section 66f is slightly larger than the vertical width K 2 of the elongated hole 60b, the small diameter shaft 66b is lightly press-fitted into the elongated hole 60b. Accordingly, with the lens barrel 11A and the lens barrel 11B combined, the shaft member 66 might not rattle and generate abnormal noise. As described above, since the tip section 66g is provided at the tip end of the small diameter shaft 66b, no press-fitting occurs until the small diameter shaft 66b is advanced to some extent inside the elongated hole 60b. With this configuration, the timing at which the small diameter shaft 66b (base end section 66f) of the shaft member 66 is press-fitted into the elongated hole 60b of the first hole 60 becomes substantially the same as the timing at which the shaft portion 65b of the shaft member 65 is press-fitted into the circular hole 61a of the second hole 61. Accordingly, the lens barrel 11B is combined with the lens barrel 11A without being tilted. Unlike the present embodiment, if the tip section 66g is not provided in the small diameter shaft 66b and the small diameter shaft 66b as a whole has the same diameter as that of the base end section 66f, the timing at which the small diameter shaft 66b is press-fit into the elongated hole 60b of the first hole become significantly earlier than the timing at which the shaft portion 65b is press-fit into the circular hole 61a of the second hole 61. Accordingly, the lens barrel 11B is likely to be tilted relative to the lens barrel 11A with the location of the shaft member 66 and the first hole 60 as a fulcrum.

As illustrated in FIGS. 26A and 26B, since the length of the small diameter shaft 66b is slightly longer than the entire length of the first hole 60, the small diameter shaft 66b passes through the first hole 60 on the lens barrel 11B side so that the tip section 66g projects to the back side of the lens barrel 11A beyond the boss 63. With such a configuration, although the lens barrel 11A and the lens barrel 11B have the same symmetrical shape along the front-to-back direction, it is easier to identify the front side of the lens barrel 11B at which the shaft member 66 projects beyond the boss 63, which improves the workability.

As described above, the shaft member 65 and the shaft member 66 are press-fit into the first hole 60 and the second hole 61, respectively. However, if the load of press-fitting is too large, workability deteriorates or distortion occurs on the base frame 12 side, which might affect positioning accuracy. In order to avoid such a situation, the relative diameters of the first hole 60, the second hole 61, and the shaft members 65 and 66 are set so as to be slightly press fit without impairing the positioning accuracy.

The positions at which the shaft member 65 and the shaft member 66 are positioned are close to the positions at which positioning is made by the contact surface 50 and the contact surface 51 along the front-to-back direction. The shaft member 65 and the shaft member 66 are disposed substantially symmetrically with respect to the virtual plane Q1 (FIG. 5) that includes the optical axis X1 and extends along the up-to-down direction. With such a configuration in which the distance between the shaft member 65 and the shaft member 66 along the right-to-left direction is increased, and in which the shaft member 65 and the shaft member 66 are disposed symmetrically in positions relative to the front group AF and BF and the first prisms AP1 and BP1, the accuracy of positioning is increased.

The first hole 60 and the second hole 61 into which the shaft member 65 and the shaft member 66 are inserted are arranged in the corner wall 24 and the corner wall 25, respectively of the base frame 12, which enables space to be efficiently utilized without interfering with the other components constituting the lens barrel 11A and lens barrel 11B. In addition to the rigidity of the corner walls 24 and 25, the thickness of the boss 62 having the first hole 60 and the boss 63 having the second hole 61 also provide reinforcement. Accordingly, the first hole 60 and the second hole 61 are not likely to be displaced by using the shaft member 65 and the shaft member 66.

Figure 23:
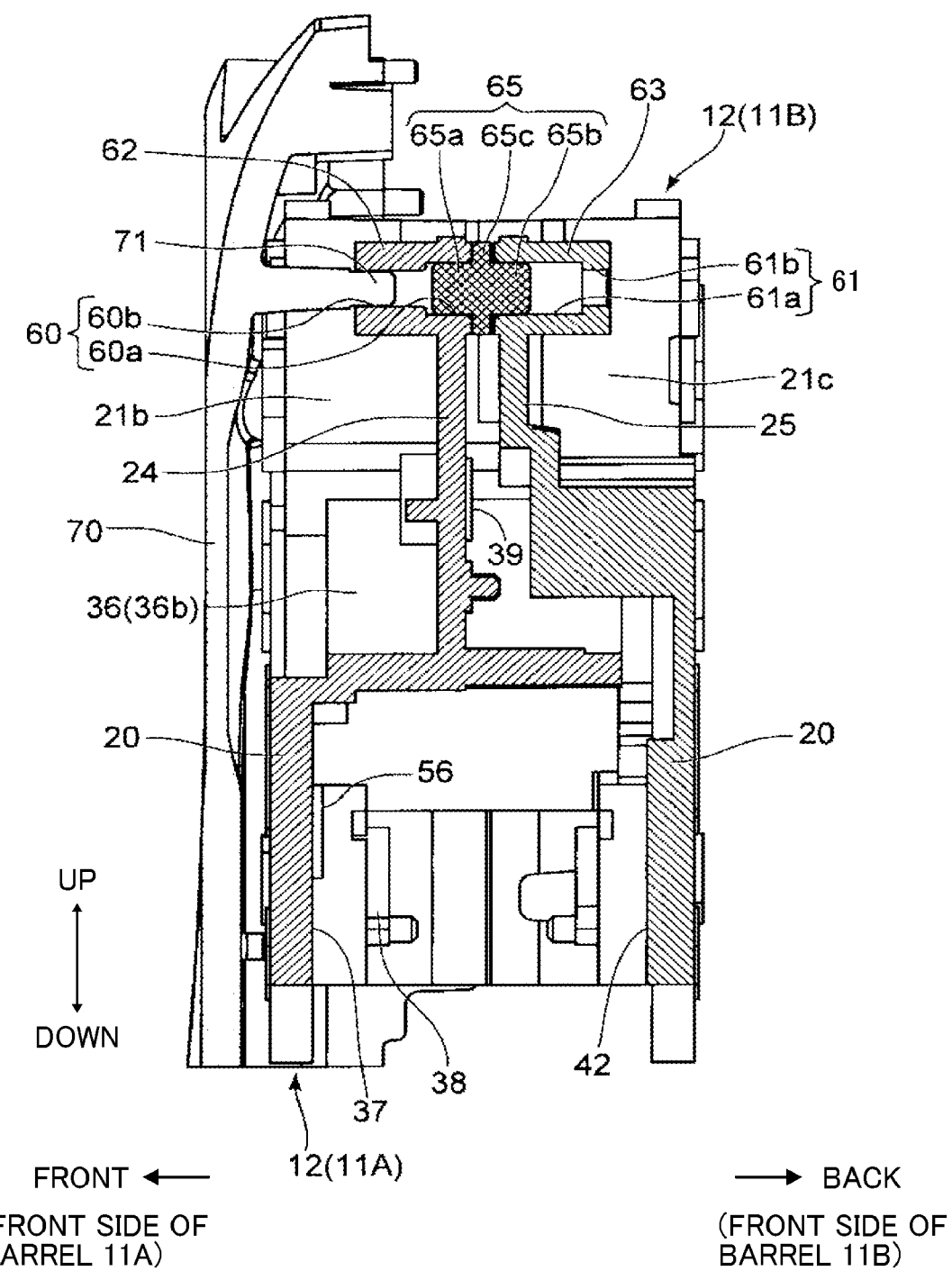
FIG. 23 is a cross-sectional view of the part of the lens barrels in FIG. 21 with a front cover of an imaging apparatus mounted.
Figure 27:
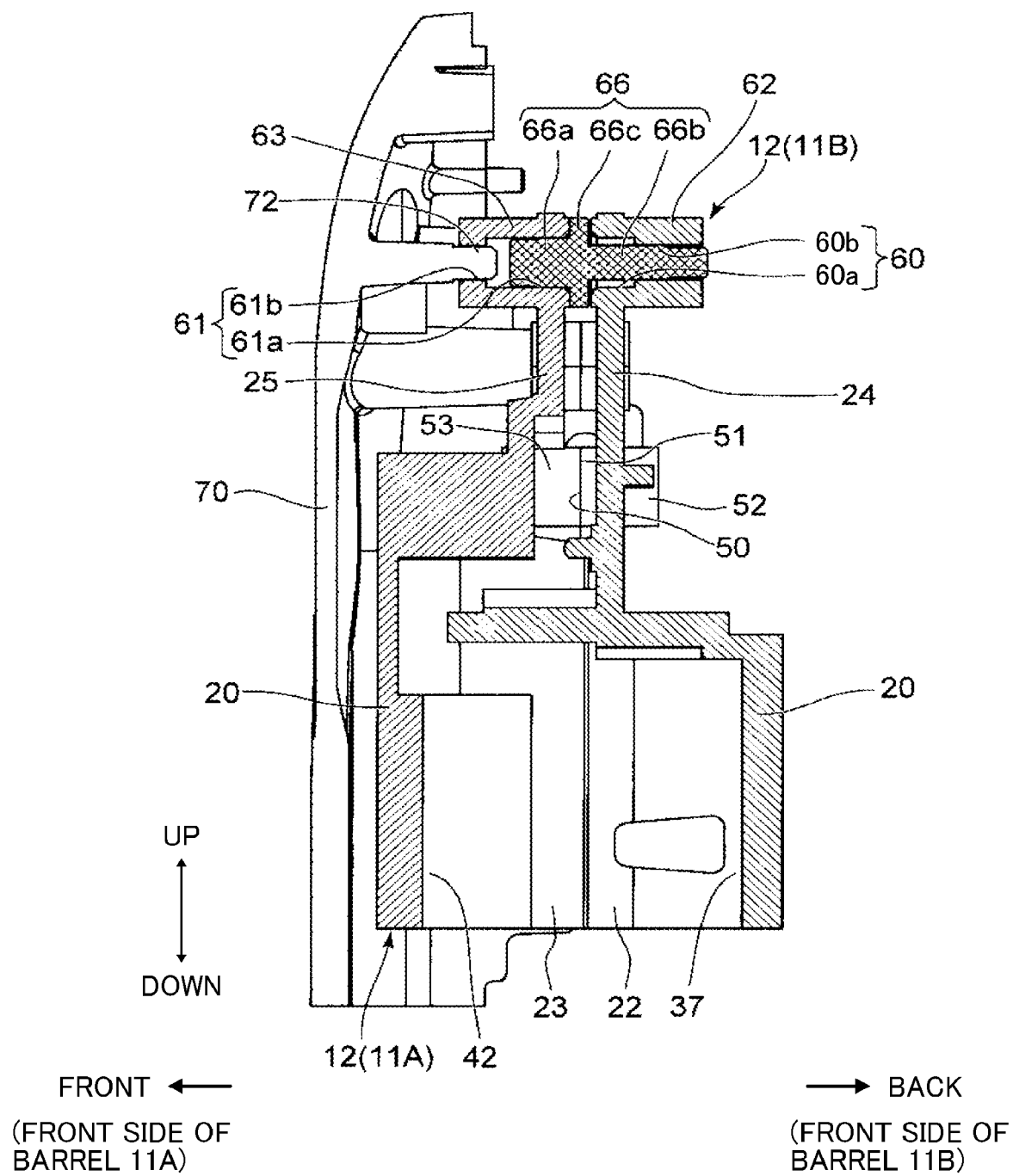
FIG. 27 is a cross-sectional view of the part of the lens barrels in FIG. 25 with the front cover of the imaging apparatus mounted.

The first hole 60 and the second hole 61 are also used to attach an exterior member attaching an exterior member constituting the outer surface of the imaging apparatus 80 thereto. The front cover 70 in FIGS. 23 and 27 is an exterior member that covers the front side of the imaging apparatus

80. The front cover 70 has a support protrusion 71 (FIG. 23) projecting backward and a support protrusion 72 (FIG. 27) on the inner surface side. The support protrusion 71 and the support protrusion 72 are provided to correspond to the first hole 60 and the second hole 61 in the base frame 12, respectively. The support protrusion 71 has a cylindrical outer surface portion having a constant outer diameter around the tip of the support protrusion 71. The outer diameter of the cylindrical outer surface is substantially the same as the vertical width K2 of the elongated hole 60b in the first hole 60. The support protrusion 72 has a cylindrical outer surface portion having a constant outer diameter around the tip portion of the support protrusion 72. The outer diameter of the cylindrical outer surface portion is substantially the same as the vertical width K4 of the small diameter hole 61b in the second hole 61.

In attaching the front cover 70 to the composite lens barrel 10, the tip portion (cylindrical outer surface portion) of the support protrusion 71 is inserted from the front side into the elongated hole 60b of the first hole 60 on the lens barrel 11A side. Further, the tip portion (cylindrical outer surface portion) of the support protrusion 72 is inserted from the front side into the small diameter hole 61b of the second hole 61 on the lens barrel 11A side. On the lens barrel 11A, the shaft portion 65a of the shaft member 65 has not entered the elongated hole 60b yet, and the large diameter shaft 66a of the shaft member 66 has not entered the small diameter hole 61b yet either. Accordingly, the support protrusion 71 and the support protrusion 72 are successfully inserted into the first hole 60 and the second hole 61, respectively without interfering with the shaft member 65 and the shaft member 66.

The support protrusion 72 of the cylindrical outer surface fits the small diameter hole 61b of the cylindrical inner surface, so that the front cover 70 is positioned within a plane perpendicular to the optical axis X1. Further, the support protrusion 71 is sandwiched between the pair of planes 60c of the elongated hole 60b, which restrict the rotation of the front cover 70 around the support protrusion 72. The length of the elongated hole 60b in the right-to-left direction is longer than the outer diameter of the support protrusion 71, and the position of the support protrusion 71 in the right-to-left direction is not restricted by the elongated hole 60b. With such a configuration, the support protrusion 71 and the first hole 60 work to cancel out assembly tolerances of assemble of the front cover 70 and the composite lens barrel 10. In that manner, the first hole 60 and the second hole 61 are used to position the shaft member 65 and the shaft member 66 and also used to assemble and position the front cover 70.

In the lens barrel 11B side, the small diameter shaft 66b of the shaft member 66 passes through the first hole 60 as a whole (see FIGS. 26A and 26B), whereas the shaft member 65 has not entered the small diameter hole 61b of the second hole 61 yet (FIGS. 22A and 22B). Accordingly, a protrusion of another member (for example, a back cover constituting an exterior component of the imaging apparatus 80 together with the front cover 70) is inserted from the back side into the small diameter hole 61b of the lens barrel 11B so as to position the another member.

As the shaft member 65 has a symmetrical shape in the axial direction, the orientations of the shaft portion 65a and the shaft portion 65b may be reversed. However, as the shaft member 66 has an asymmetrical shape along the axial direction, the large diameter shaft 66a and the small diameter shaft 66b, whose orientations are reversed, fail in assembly and malfunction. The imaging apparatus 80 according to the present embodiment has a structure that prevents the shaft member 66 from being assembled in an opposite direction.

Figure 28:
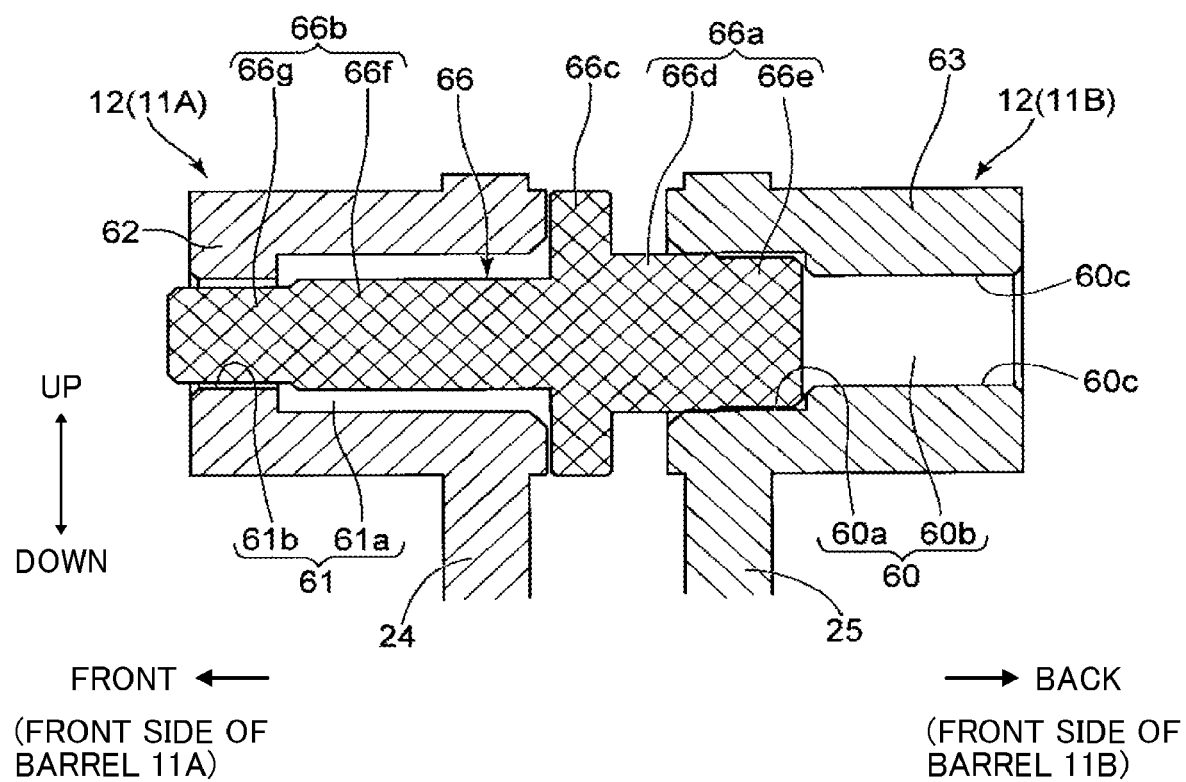
FIG. 28 is a cross-sectional view of the positioning mechanism on the sub-reference side in an error with the shaft member assembled in a reverse direction.

FIG. 28 is an illustration of a case in which the shaft member 66 is assembled in the opposite direction. The small diameter shaft 66b is inserted into the second hole 61 on the lens barrel 11A. The outer diameter of the base end section 66f of the small diameter shaft 66b is shorter than the inner diameter K3 of the circular hole 61a, and the outer diameter of the tip section 66g is shorter than the inner diameter K4 of the small diameter hole 61b. With such a configuration, the small diameter shaft 66b can be advanced inside the second hole 61 to reach the position at which the flange 66c contacts the back-side end face of the boss 63.

The length of the large diameter shaft 66a is longer than the length M1 of the circular hole 60a of the first hole 60. Accordingly, when the large diameter shaft 66a is inserted into the first hole 60 of the lens barrel 11B side, the tip of the large diameter shaft 66a abuts against the step in the boundary between the circular hole 60a and the elongated hole 60b earlier than the contact surfaces 50 and 51 contact each other. Thus, further insertion is restricted. In this state, there is a large gap in the front-to-back direction between the flange 66c and the boss 63, which allows for recognition that the lens barrel 11A and the lens barrel 11B are prevented from being close to each other due to the assembly failure of the shaft member 66.

In assembling the front cover 70 (FIG. 23 and FIG. 27) to the composite lens barrel in the state of FIG. 28, the support protrusion 72 abuts against the small diameter shaft 66b, so that the support protrusion 72 fails to be inserted into the second hole 61 (the small diameter hole 61b). Accordingly, the front cover 70 is not fit into the front-side composite lens barrel 10, which also allows for recognition that the shaft member 66 fails in assembly.

In the present embodiment, the case in which the lens barrel 11B is positioned with reference to the lens barrel 11A side is described. However, in some embodiments, the lens barrel 11A may be positioned with reference to the lens barrel 11B because the lens barrel 11A and the lens barrel 11B have the same shape. In other words, it is also possible to reverse the supporting lens barrel as the reference for positioning (the base frame 12 as the supporting holder (a holder)) and the supported lens barrel (the base frame 12 as the supported holder (another holder)) to be positioned by the support barrel. Specifically, the shaft member 65 (which may be either of the shaft portion 65a and the shaft portion 65b) is inserted into the first hole 60 (the circular hole 60a) on the lens barrel 11B, and the large diameter shaft 66a of the shaft member 66 is inserted into the second hole 61 (the circular hole 61a) on the lens barrel 11B side. Subsequently, the shaft member 65 (one of the shaft portion 65a and the shaft portion 65b that is not inserted into the first hole 60 of the lens barrel 11B) is inserted into the second hole 61 (the circular hole 61a) on the lens barrel 11A side, and the small diameter shaft 66b of the shaft member 66 is inserted into the first hole 60 (the elongated hole 60b) on the lens barrel 11A side.

In the present embodiment as described above, the lens barrel 11A including the wide-angle lens system A and the image sensor AI is combined with the lens barrel 11B including the wide-angle lens system B and the image sensor BI to constitute the composite lens barrel 10. Each imaging system is housed in a corresponding lens barrel 11A/11B, which facilitates assembling the optical components in each of the lens barrels 11A and 11B, and thus increases the productivity. Further, two lens barrels whose imaging performances are similar are selected as the lens barrel 11A and the lens barrel 11B to be combined. Accordingly, it is easy to control the performance of the imaging system 1 as a whole. In a mode that assembles a plurality of optical systems in one lens barrel, when any failure is found in one optical system after the assembly of the lens barrel is completed (in particular, after the parts are fixed by, for example, adhesion), the entire system including the other optical systems with no failure has to be discarded, resulting in waste. However, the configuration according to the embodiments of the present disclosure that combines the lens barrel 11A and the lens barrel 11B is advantageous to an increase in productivity and a reduction in cost without any waste.

In such a configuration according to the embodiments of the present disclosure, the two lens barrels 11A and 11B are positioned in the direction perpendicular to the optical axis X1 using the shaft member 65 and the shaft member 66 such that the lens barrel 11A and the lens barrel 11B are opposed to each other. The shaft member 65 serves as a main-reference positioning mechanism that restricts the movement of the first hole 60 and the second hole 61 of each of the lens barrels 11A and 11B along the all the direction perpendicular to the optical axis X1. The shaft member 66 serves as a sub-reference positioning mechanism that allows the first hole 60 to move along a certain direction perpendicular to the optical axis X1 and restricts movement in the other directions. With this configuration, an error between the lens barrels 11A and 11B is cancelled out and a high accuracy of positioning is achieved while the lens barrel members constituting the lens barrel 11A and the lens barrel 11B (in particular, the base frame 12 to be positioned) have the same shape.

Each of the first hole 60 and the second hole 61 has a simple shape in which the opening area inside consists of two phases, and is easily manufactured when the base frame 12 is formed. The first hole 60 and the second hole 61 in the lens barrel 11A and the second hole 61 and the first hole 60 in the lens barrel 11B are opposed to each other, respectively. The shaft members 65 and 66 are inserted into these holes so that the lens barrel 11A and the lens barrel 11B are positioned. That is, the lens barrel 11A and the lens barrel 11B are easily assembled without complicated work.

As described above, either one of the lens barrel 11A and the lens barrel 11B may be selected as the reference supporting lens barrel. Further, the imaging apparatus 81 has the structure that allows the worker to easily recognize a proper manner to assemble the shaft member 66 having an asymmetrical shape along the axial direction in the lens barrels 11A and 11B (see FIG. 28). Accordingly, wrong installation of the components in combining the lens barrels 11A and 11B can be avoided.

As the lens barrel 11A and the lens barrel 11B have the same shape as a whole including the first hole 60 and the second hole 61, it is possible to reduce the number of parts, manufacturing cost, and time as compared with a configuration in which a plurality of lens barrels having different structures are combined. Further, in this configuration, the shaft members 65 and 66 are directly inserted into the first holes 60 and the second holes 61 of the base frames 12 constituting the lens barrel 11A and the lens barrel 11B so as to position the lens barrel 11A and lens barrel 11B. This configuration provides a low-cost and simple structure of the lens barrel and facilitates accuracy control between the lens barrels, as compared to a configuration that includes another large member on which two lens barrels are mounted.

Figure 35:
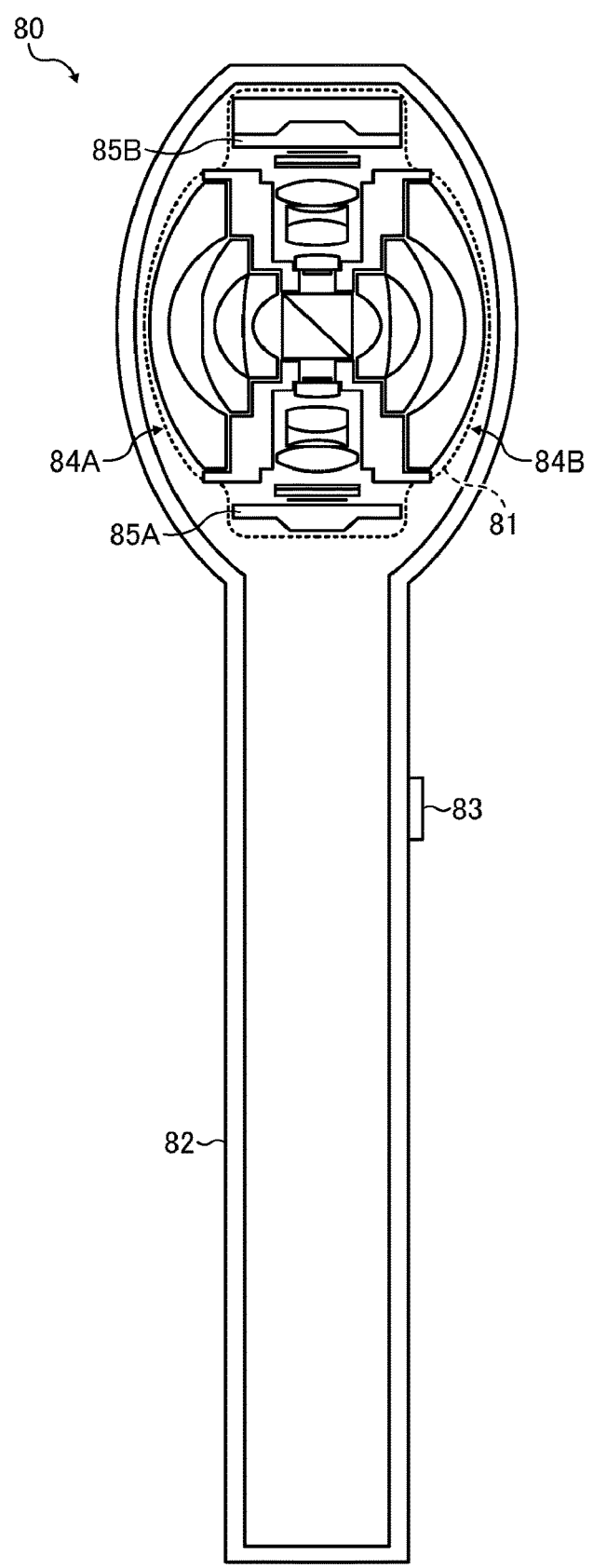
FIG. 35 is a cross-sectional view of the imaging apparatus according to an embodiment of the present disclosure.
Figure 36:
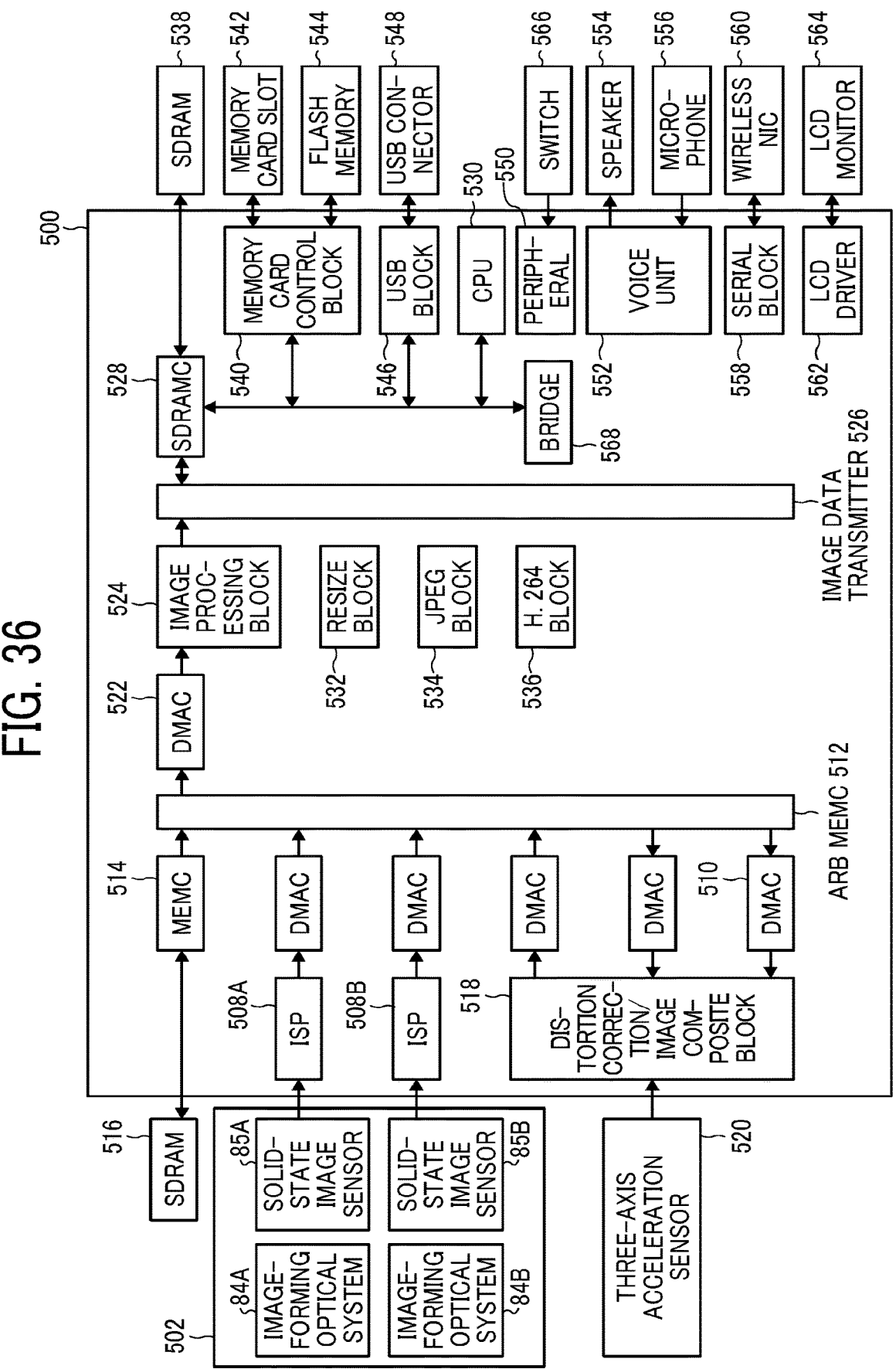
FIG. 36 is a block diagram of a hardware configuration of the imaging apparatus.

With reference to FIGS. 35 and 36, a description is given of the overall configuration of a full-view spherical imaging apparatus to which the imaging system 1 and the composite lens barrel 10 according to an embodiment of the present disclosure are applied. FIGS. 35 and 36 are illustrations of a typical configuration of a spherical imaging system although the wide-angle lens systems A and B and the image sensors AI and BI are differently arranged from the above-described composite lens barrel 10. The characteristic configurations of the imaging optical system (the optical system), the imaging system, and the imaging apparatus are as described above (FIGS. 1 to 34).

As illustrated in FIG. 35, the imaging apparatus 80 includes an imaging body 81, a casing 82 that holds components such as the imaging body 81, a controller, and a battery inside, and a shutter button 83 provided on the outer surface of the casing 82. The casing 82 includes an exterior component that corresponds the front cover 70 according to the above-described embodiment. In FIG. 35, although only the image-forming optical systems 84A and 84B and the solid-state image sensors 85A and 85B are illustrated within the casing 82 of the imaging apparatus 80, the structure that corresponds to the composite lens barrel 10 according to the above-described embodiments (FIGS. 1 to 34) is actually mounted within the casing 82.

The imaging body 81 in FIG. 35 corresponds to the imaging system 1 of the composite lens barrel 10. The imaging body 81 includes two image-forming optical systems 84A and 84B and two solid-state image sensors 85A and 85B. Examples of the two solid-state image sensors 85A and 85B include charge-coupled devices (CCDs) and complementary metal oxide semiconductors (CMOSs). A combination of one image-forming optical system 84A/84B and one solid-state image sensor 85A/85B constitutes the imaging system. Each of the image-forming optical systems 84A and 84B is configured as a fish-eye lens consisting of, for example, seven lenses in six groups. In the embodiment illustrated in FIG. 35, the fish-eye lens has an wide angle of view of 180 (360/n, n is 2) degrees or more, preferably 185 degrees or more, and more preferably 190 degrees or more.

The positions of the optical elements (the lens, the prism, the filter, and the aperture stop) of the two image-forming optical systems 84A and 84B are defined relative to the solid-state image sensor 85A and 85B. Such positions are defined such that the optical axes of the optical elements of the image-forming optical systems 84A and 84B are orthogonal to the central portion of the light-receiving areas of the corresponding solid-state image sensors 85A and 85B, and such that each light-receiving area serves as an image-forming plane of the corresponding fish-eye lens. Each of the solid-state image sensors 85A and 85B is a two-dimensional solid-state image sensor defines a light-receiving area. The solid-state image sensors 85A and 85B convert light focused by the image-forming optical systems 84A and 84B into electrical signals, respectively.

In the imaging apparatus 80 illustrated in FIG. 35, the image-forming optical systems 84A and 84B have the same specification, and are combined to face in opposite directions from each other with the optical axes matching with each other. Each of the solid-state image sensors 85A and 85B converts a received light distribution into an image signal and outputs the signal to an image processing unit on the controller. The image processing unit joins partial-view images transmitted from the solid-state image sensors 85A and 85B to obtain an image with a solid angle of $4\pi$ steradian (referred to as "spherical image" below). The omnidirectional image is an image of all the directions that can be seen from an image capturing point. In the embodiment illustrated in FIG. 35, the imaging optical system generates a spherical image. However, in some other embodiments, the imaging optical system may generate a panoramic image by capturing 360 degrees in a horizontal plane.

In the imaging optical system, the scan direction of the solid-state image sensor 85A is identical with the scan direction of the solid-state image sensor 85B, which enables images captured by the solid-state image sensors 85A and 85B to be joined easier. That is, the scan directions and scan sequences of the solid-state image sensors 85A and 85B are identical with each other at portions to be joined together. This configuration is advantageous to joining images of an object, particularly a moving object on the boundary between two capturing ranges of the camera. For example, when an upper-left portion of the image captured by the solid-state image sensor 85A matches a lower-left portion of the image captured by the solid-state image sensor 85B to join the images, the solid-state image sensor 85A scans the image from right to left while scanning from top to bottom of the solid-state image sensor 85A. The solid-state image sensor 85B scans from bottom to top while scanning from the right to the left of the solid-state image sensor 85B. That is, the scan directions of the respective solid-state image sensors 85A and 85B are caused to match each other based on the portions of the images to be joined, which facilitates the joining of the images.

As described above, since the fish-eye lens has a full angle of view exceeding 180 degrees, the images captured by the respective imaging optical systems A and B partly overlap with each other. Accordingly, the captured images are joined with each other based on the overlapping portions of the images as reference data representing the identical image, so as to generate a full-view spherical image. The generated spherical image is transmitted to a display device provided on or connected to the imaging body 81, a printing device, and an external memory such as an SD (registered trademark) card and a compact flash (registered trademark).

FIG. 10 is a block diagram of an example of a hardware configuration of the imaging apparatus 80. The imaging apparatus 80 includes a digital still camera processor (hereinafter, simply referred to as a processor) 500, a barrel unit 502, and various components connected to the processor 500. The barrel unit 502 includes the two image-forming optical systems 84A and 84B and the solid-state image sensors 85A and 85B. The solid-state image sensors 85A and 85B are controlled by commands from the CPU 530 in the processor 500, which will be described later.

The processor 500 includes image signal processors (ISPs) 508A and 508B, a direct memory access controller (DMAC) 510, an arbiter (ARBMEMC) 512 for arbitrating memory access, a memory controller (MEMC) 514 for controlling memory access, and a distortion correction/image composite block 518. The ISPs 508A and 508B apply white balance correction and gamma correction to the image signals processed by the solid-state image sensors 85A and 85B. The MEMC 514 is coupled to a synchronous dynamic random access memory (SDRAM) 516. The SDRAM 516 temporarily stores data when the ISPs 508A and 508B and the distortion correction/image composite block 518 perform processing. The distortion correction/image composite block 518 applies distortion correction and top-bottom correction to the partial images captured by the imaging optical systems, using data from a triaxial accelerometer 520, so as to composite the images.

The processor 500 further includes a DMAC 522, an image processing block 524, the CPU 530, an image data transferring unit 526, a synchronous dynamic random access memory (SDRAM) 528, a memory card controlling block 540, a universal serial bus (USB) block 546, a peripheral block 550, a sound unit 552, a serial block 558, a liquid crystal display (LCD) driver 562, and a bridge 568.

The CPU 530 controls operations of respective elements in the imaging apparatus 80. The image processing block 524 performs various types of image processes on image data using a resize block 532, a joint photographic experts group (JPEG) block 534, and H. 264 block 536. The resize block 532 enlarges or reduces the size of the image data by interpolation processing. The JPEG block 534 is a codec block that performs JPEG compression and decompression. The H.264 block 536 is a codec block that compresses and decompresses a moving image such as H.264. The image data transferring unit 526 transfers the image on which the image processing has been performed by the image processing block 524. The SDRAMC 528 controls an SDRAM 538 coupled to the processor 500, and the SDRAM 538 temporarily stores image data when various processing is performed on the image data in the processor 500.

The memory card controlling block 540 controls reading and writing from/to a memory card and a flash read only memory (ROM) 544 inserted into the memory card slot 542. The memory card slot 542 is a slot to detachably attach a memory card to the imaging apparatus 80. The USB block 546 controls USB communication to an external device such as a personal computer coupled via the USB connector 548. The peripheral block 550 is coupled to a power switch 566. The sound unit 552 is coupled to a microphone 556 that receives an audio signal from a user and a speaker 554 that outputs the recorded audio signal and controls sound input and output. The serial block 558 controls serial communication with an external device such as a personal computer and is coupled to a wireless Network Interface Card (NIC) 560. The Liquid Crystal Display (LCD) driver 562 is a driver circuit that drives an LCD monitor 564 and performs conversion to a signal used to display various states on the LCD monitor 564.

The flash ROM 544 stores a control program written in a code that can be decoded by the CPU 530 and various parameters. When the power is turned on by the operation of a power switch 566, the control program mentioned above is loaded into the main memory. The CPU 530 controls operation of each part in the imaging system 1 according to the program loaded into the main memory, while temporarily saving data necessary for control on the SDRAM 538 and a local static random access memory (SRAM).

In the above-described embodiment, the circular holes (the circular holes 60a and 61a) and the shafts (the shafts 65a and 65b) having the circular cross-sectional area constitute the main-reference positioning mechanism positioning mechanism. Unlike this configuration, other types of holes and shafts having other cross-sectional shape other than the circle may constitute the main-reference positioning mechanism. FIGS. 37 to 44 are illustrations of variations in which the internal shapes of the hole are different. In each of the following variations, the same elements as those of the above-described embodiments are indicated with the same reference numerals, and description thereof is omitted. The shaft member 65 and the shaft member 66 are the same as those of the above embodiments.

Figure 37:
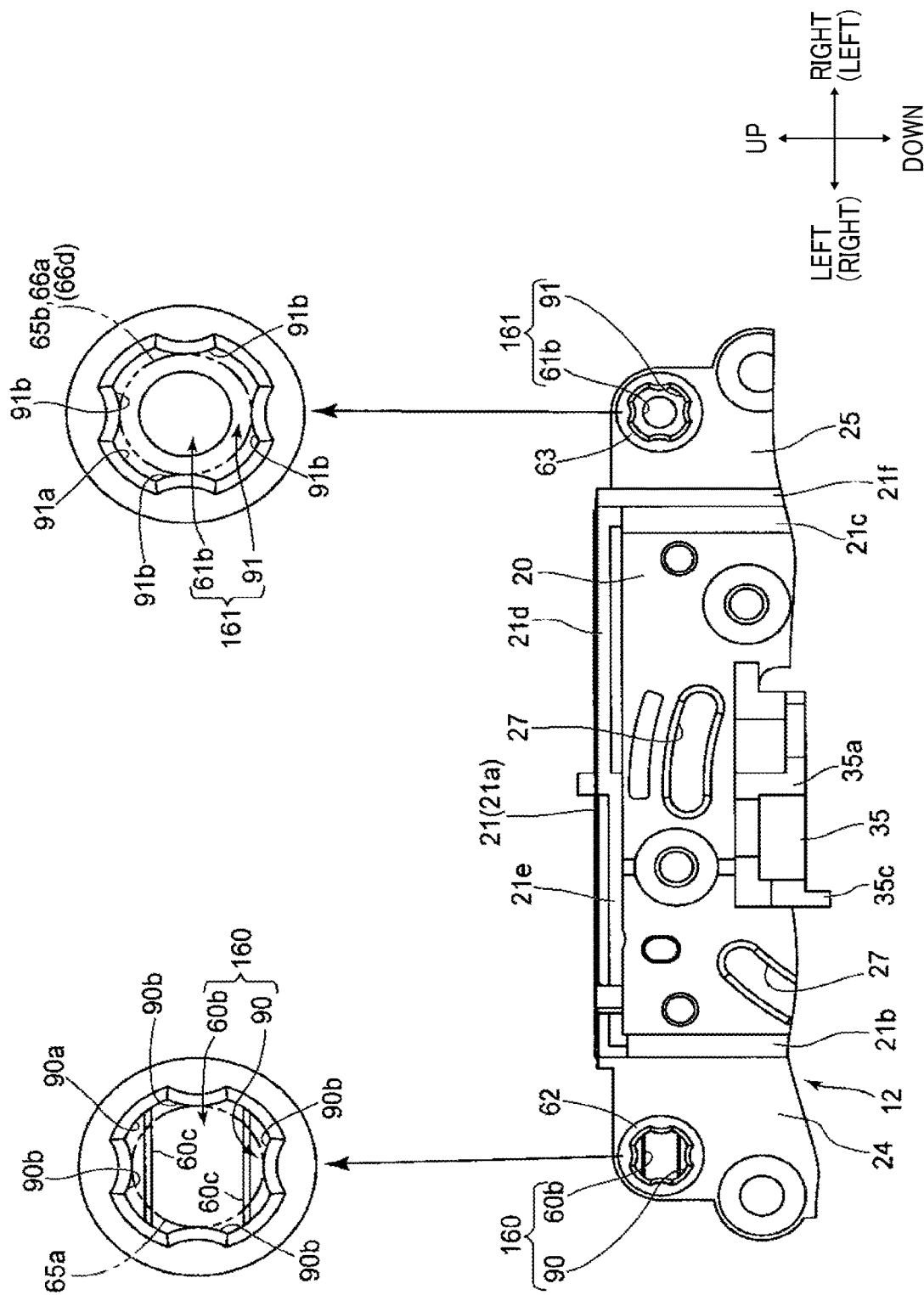
FIG. 37 is a rear view of a base frame for describing a first variation of the positioning mechanism according to an embodiment of the present disclosure.
Figure 38:
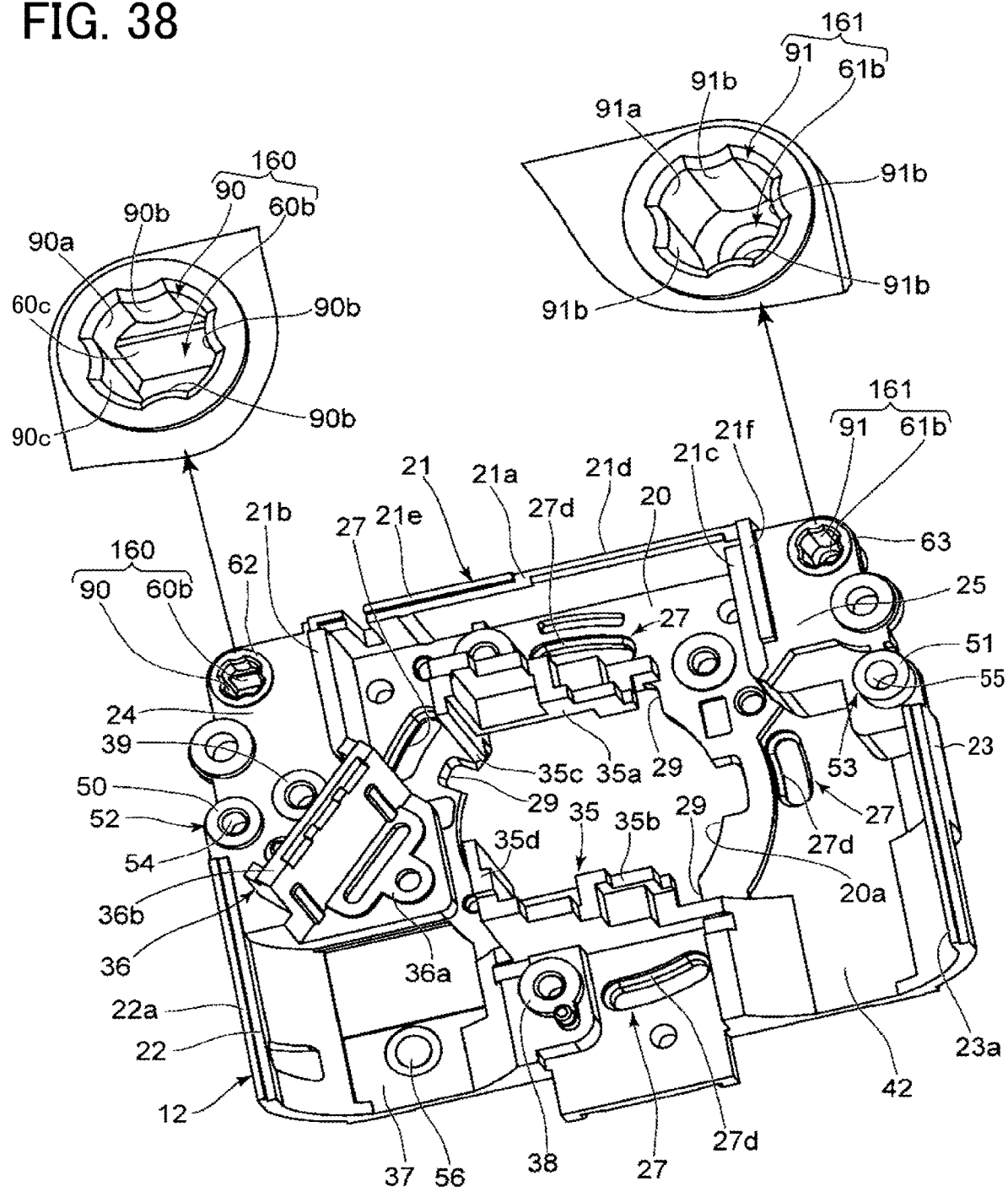
FIG. 38 is a perspective view of the base frame for describing the first variation of the positioning mechanism according to an embodiment of the present disclosure.

FIGS. 37 and 38 are illustrations of a positioning mechanism according to a first variation of an embodiment of the present disclosure. In the first variation, a first hole 160 has an opposing hole portion 90 as a substitute for the circular hole 60a of the above-described embodiment, and a second hole 161 has an opposing hole portion 91 as a substitute for the circular hole 61a of the above-described embodiment.

The opposing hole portion 90 of the first hole 160 includes a cylindrical portion 90a having a cylindrical inner surface and four protrusions 90b projecting inward from the inner surface of the cylindrical portion 90a. Each protrusion 90b has a curved surface that is convex toward the inner diameter direction, and this curved surface has a uniform cross-sectional shape continuing in the axial direction (the front-to-back direction) of the first hole 160. The four protrusions 90b are disposed at substantially equal angular intervals (90° intervals) in the circumferential direction around the axis of the first hole 160, and the respective protrusion amounts are equal. Two of the protrusions 90b are spaced apart and opposed to each other in a long direction (the right-to-left direction) of the elongated hole 60b. The remaining two protrusions 90b are spaced apart and opposed to each other in the width direction (the up-to-down direction) of the elongated hole 60b. The width between the opposed protrusions 90b in the up-to-down direction and the width between the opposed protrusions 90b in the right-to-left direction (the distance between peaks of the convex surfaces of the opposed protrusions 90b). The distance between the two protrusions 90b opposed to each other in the width direction (the up-to-down direction) of the elongated hole 60b is longer than the distance between the pair of planes 60c in the elongated hole 60b.

On the lens barrel 11A side, the shaft portion 65a of the shaft member 65 is inserted into the opposing hole portion 90 of the first hole 160. The virtual circle indicated by a two-dot chain in FIG. 37 is an incircle that internally contacts the four protrusions 90b of the opposing hole portion 90. That is, the shaft portion 65a of the shaft member 65 has a diameter of the circle. In this contact state, the shaft portion 65a is lightly press-fitted into the opposing hole portion 90. That is, the distance between the opposed protrusions 90b is slightly smaller than the diameter of the shaft portion 65a at the initial state. The shaft portion 65a contacts each of the protrusions 90b in a linear region along the axial direction of the first hole 160. The shaft portion 65a does not contact each of the cylindrical portion 90a. Accordingly, the contact area between the shaft portion 65a and the opposing hole portion 90 is reduced, and thus a load imposed by insertion of the shaft portion 65a is reduced as compared to the configuration in which substantially the entire outer surface of the shaft portion 65a contacts the inner surface of the hole. Further, such a configuration according to the present embodiment reduces or prevents tilting of the shaft portion 65a, and also advantageously advances the shaft portion 65a inside the first hole 160 in the axial direction.

On the lens barrel 11B side, the small diameter shaft 66b of the shaft member 66 is inserted into the first hole 160. In the opposing hole portion 90, each of the distance between the two protrusions 90b opposed to each other right-to-left direction and the distance between the two protrusions 90b opposed to each other in the up-to-down direction is shorter than the diameter of the small diameter shaft 66b (the base end section 66f and the tip section 66g). Accordingly, each protrusion 90b does not hamper the insertion of the small diameter shaft 66b into the first hole 160.

Similarly to the opposing hole portion 90 of the first hole 160, the opposing hole portion 91 of the second hole 161 has a cylindrical portion 91a having a cylindrical inner surface and four protrusions 91b projecting inward from the inner surface of the cylindrical portion 90a. The shape (inner diameter) of the cylindrical portion 91a and the arrangement and shape of each protrusion 91b are the same as those of the cylindrical portion 90a and each protrusion 90b of the opposing hole portion 90. The four protrusions 91b are disposed at substantially equal angular intervals (90° intervals) in the circumferential direction around the axis of the second hole 161. Two of the protrusions 91b are spaced apart and opposed to each other up-to-down direction, and the remaining two protrusions 91b are spaced apart and opposed to each other along the right-to-left direction. Each distance between the two opposed protrusions 91b is greater than the diameter of the small diameter hole 61b of the second hole 161.

On the lens barrel 11A side, the large diameter shaft 66a of the shaft member 66 is inserted into the opposing hole portion 91 of the second hole 161. On the lens barrel 11B side, the shaft portion 65b of the shaft member 65 is inserted into the opposing hole portion 91 of the second hole 161. The virtual circle indicated by a two-dot chain in FIG. 37 is an incircle that internally contacts the four protrusions 90b of the opposing hole portion 90. That is, each of the shaft portion 65b and the large diameter shaft 66a (the base end section 66d) of the shaft member 65 has a diameter of the circle. In this contact state, each of the shaft portion 65b and the large diameter shaft 66a (the base end section 66d) is lightly press-fitted into the opposing hole portion 90. In other words, the distance between the opposed protrusions 91b is slightly smaller than the diameter of each of the shaft portion 65b and the base end section 66d at the first stage of insertion. The shaft portion 65b and the large diameter shaft 66a (the base end section 66d) contact each of the protrusions 90b in a linear region along the axial direction of the second hole 161. Neither the shaft portion 65b nor the large diameter shaft 66a contacts the cylindrical portion 91a. Accordingly, the contact area of the opposing hole portion 91 contacting the shaft portion 65b and the large diameter shaft 66a (the base end section 66d) is reduced, and thus a load imposed by insertion of the shaft portion 65b and the large diameter shaft 66a (the base end section 66d) is reduced. Further, such a configuration that includes the plurality of protrusions 91b reduces or prevents tilting of the shaft portion 65a, and also advantageously advances the shaft portion 65b and the large diameter shaft 66a inside the first hole 160 in the axial direction.

With the reduction in the contact area between the opposing hole portions 90 and 91 and the shaft members 65 and 66, the assembly tolerances at the insertion location are more easily handled. In a configuration that provides a surface contact between the shaft members 65, 66 and the entire cylindrical inner surface of the circular holes 60a and 61a, the resistance generated by press fitting of the shaft members 65 and 66 tends to change significantly due to a variation in the tolerances between the shaft members 65 and 66 and the holes 60a and 61a. By contrast, in the configuration according to the first variation of an embodiment of the present disclosure in which the shaft members 65 and 66 contact a part of the inner surface of the hole, the change in the resistance of the shaft members 65 and 66 to the hole is reduced even with the variation in the same degree of tolerances between the hole and the shaft members 65 and 66. The same advantageous effects are obtained from the following configurations according to a second variation to a fourth variation.

Figure 39:
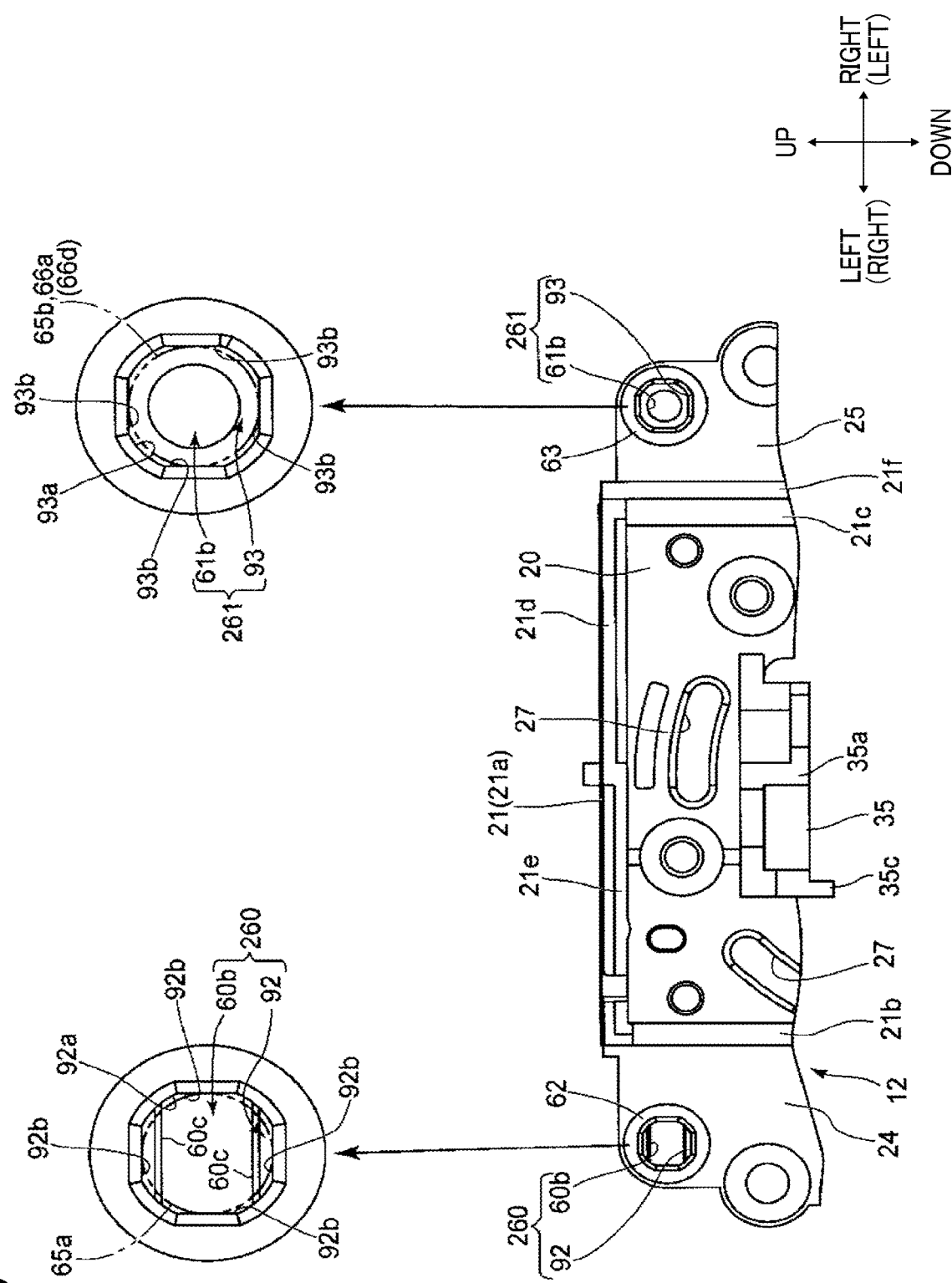
FIG. 39 is a rear view of a base frame for describing a second variation of the positioning mechanism according to an embodiment of the present disclosure.
Figure 40:
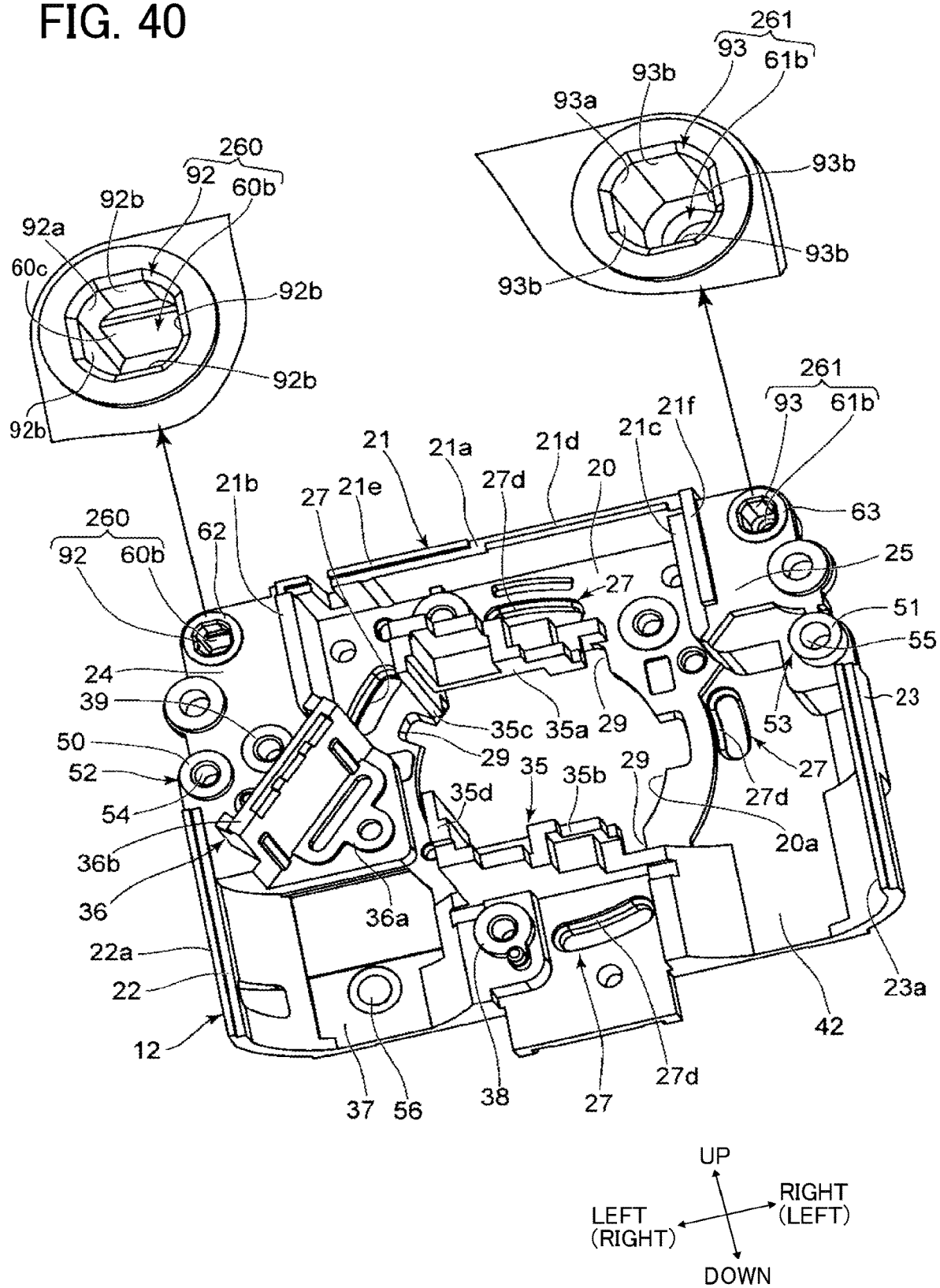
FIG. 40 is a perspective view of the base frame for describing the second variation of the positioning mechanism according to an embodiment of the present disclosure.

FIGS. 39 and 40 are illustrations of a positioning mechanism according to the second variation of an embodiment of the present disclosure. In the second variation of the embodiment, the first hole 260 has an opposing hole portion 92 as a substitute for the circular hole 60a according to the above-described embodiment, and the second hole 261 has an opposing hole portion 93 as a substitute for the circular hole 61a according to the above-described embodiment.

The opposing hole portion 92 of the first hole 260 includes a cylindrical portion 92a having a cylindrical inner surface, and four planes 92b each of which partially short-circuits the inner surface of the cylindrical portion 92a. Each plane 92b has a planar shape that extends along the axial direction of the first hole 260. The four planes 92b are disposed at substantially equal angular intervals (90° intervals) in the circumferential direction around the axis of the first hole 260. Two of the planes 92b are spaced apart and opposed to each other in the long direction (the right-to-left direction) of the elongated hole 60b. The remaining two planes 92b are spaced apart and opposed to each other in the width direction (the up-to-down direction) of the elongated hole 60b, being substantially parallel to the plane 60c of the elongated hole 60b. The width between the opposed planes 92b in the up-to-down direction is equal to the width between the opposed protrusions 90b in the right-to-left direction. The distance between the two planes 92b opposed to each other in the width direction (the up-to-down direction) of the elongated hole 60b is longer than the distance between the pair of planes 60c in the elongated hole 60b.

On the lens barrel 11A side, the shaft portion 65a of the shaft member 65 is inserted into the opposing hole portion 92 of the first hole 260. The virtual circle indicated by a two-dot chain in FIG. 39 is an incircle that internally contacts the four projections 92b of the opposing hole portion 92. That is, the shaft portion 65a of the shaft member 65 has a diameter of the circle. In this contact state, the shaft portion 65a is lightly press-fitted into the opposing hole portion 92. That is, the distance between the opposed planes 92b is slightly smaller than the diameter of the shaft portion 65a at the initial state. The shaft portion 65a contacts each of the planes 92b in a linear region along the axial direction of the first hole 260. The shaft portion 65a does not contact each of the cylindrical portion 92a. Accordingly, the contact area between the shaft portion 65a and the opposing hole portion 92 is reduced, and thus a load imposed by insertion of the shaft portion 65a is reduced as compared to the configuration in which substantially the entire outer surface of the shaft portion 65a contacts the inner surface of the hole. Further, such a configuration that includes the plurality of planes 92b reduces or prevents tilting of the shaft portion 65a, and also advantageously advances the shaft portion 65a inside the first hole 260 in the axial direction.

On the lens barrel 11B side, the small diameter shaft 66b of the shaft member 66 is inserted into the first hole 260. In the opposing hole portion 92, each of the distance between the two planes 92b opposed to each other in the right-to-left direction and the distance between the two planes 92b opposed to each other in the up-to-down direction is shorter than the diameter of the small diameter shaft 66b (the base end section 66f and the tip section 66g). Accordingly, each plane 92b does not hamper the insertion of the small diameter shaft 66b into the first hole 260.

Same as the opposing hole portion 92 of the first hole 260, the opposing hole portion 93 of the second hole 261 includes a cylindrical portion 93a having a cylindrical inner surface, and four planes 92b each of which partially short-circuits the inner surface of the cylindrical portion 92a. The shape (inner diameter) of the cylindrical portion 93a and the arrangement and shape of each plane 93b are the same as those of the cylindrical portion 92a and each plane 92b of the opposing hole portion 92. The four planes 93b are disposed at substantially equal angular intervals (90° intervals) in the circumferential direction around the axis of the second hole 261. Two of the planes 93b are spaced apart and opposed to each other up-to-down direction, and the remaining two planes 93b are spaced apart and opposed to each other along the right-to-left direction. Each distance between the two opposed planes 93b is greater than the diameter of the small diameter hole 61b of the second hole 261.

On the lens barrel 11A side, the large diameter shaft 66a of the shaft member 66 is inserted into the opposing hole portion 93 of the second hole 261. On the lens barrel 11B side, the shaft portion 65b of the shaft member 65 is inserted into the opposing hole portion 93 of the second hole 261. The virtual circle indicated by a two-dot chain in FIG. 39 is an incircle that internally contacts the four projections 93b of the opposing hole portion 93. That is, each of the shaft portion 65b and the large diameter shaft 66a (the base end section 66d) of the shaft member 65 has a diameter of the circle. In this contact state, each of the shaft portion 65b and the large diameter shaft 66a (the base end section 66d) is lightly press-fitted into the opposing hole portion 93. That is, the distance between the opposed planes 93b is slightly smaller than the diameter of the shaft portion 65b and the base end section 66d at the initial state. The shaft portion 65b and the large diameter shaft 66a (the base end section 66d) contact each of the planes 93b in a linear region along the axial direction of the second hole 261. Neither the shaft portion 65b nor the large diameter shaft 66a contacts the cylindrical portion 93a. Accordingly, the contact area of the opposing hole portion 93 contacting the shaft portion 65b and the large diameter shaft 66a (the base end section 66d) is reduced, and thus a load imposed by insertion of the shaft portion 65b and the large diameter shaft 66a (the base end section 66d) is reduced. Further, such a configuration that includes the plurality of planes 93b reduces or prevents tilting of the shaft portion 65a, and also advantageously advances the shaft portion 65b and the large diameter shaft 66a inside the second hole 261 in the axial direction.

Figure 41:
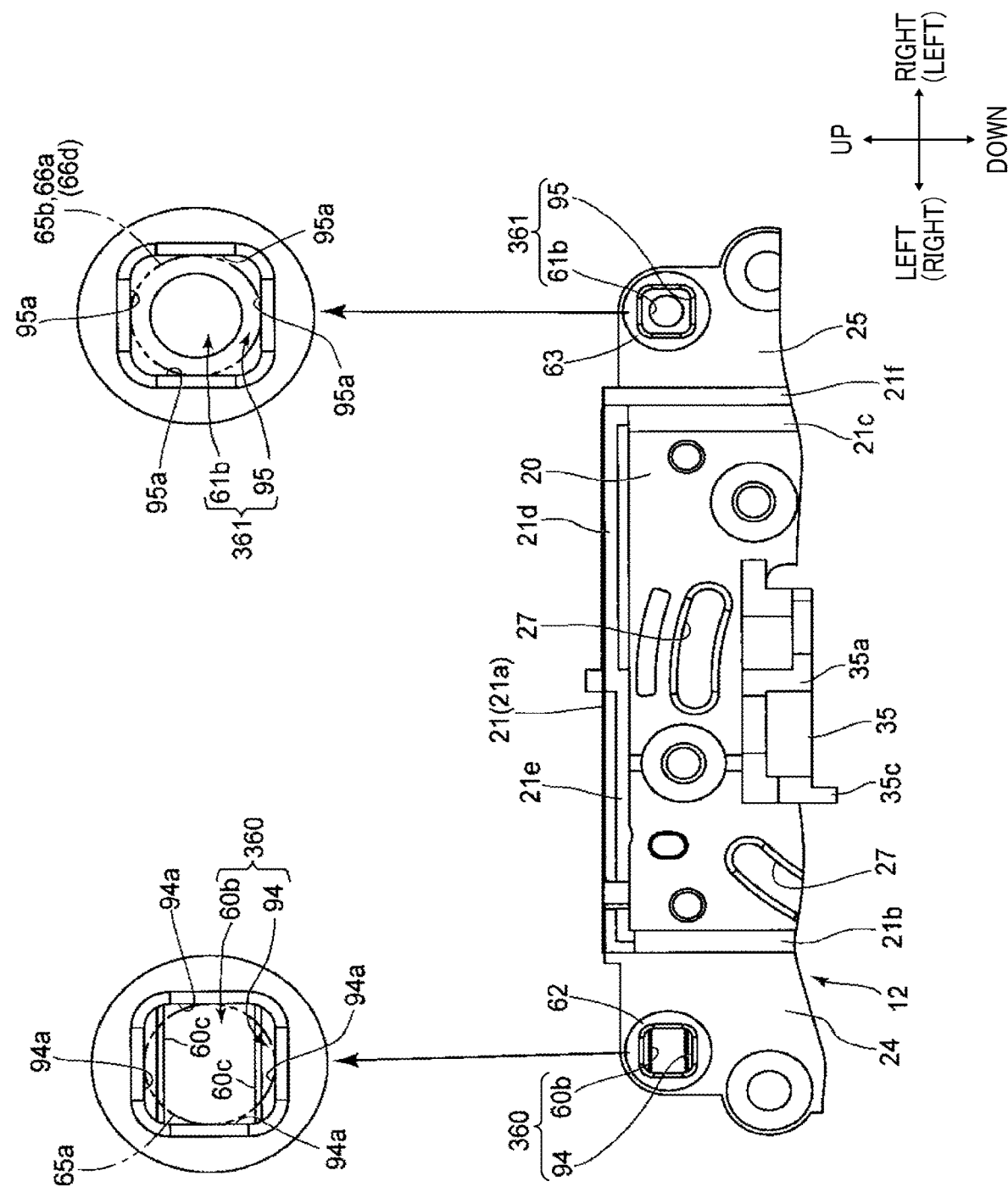
FIG. 41 is a rear view of a base frame for describing a third variation of the positioning mechanism according to an embodiment of the present disclosure.
Figure 42:
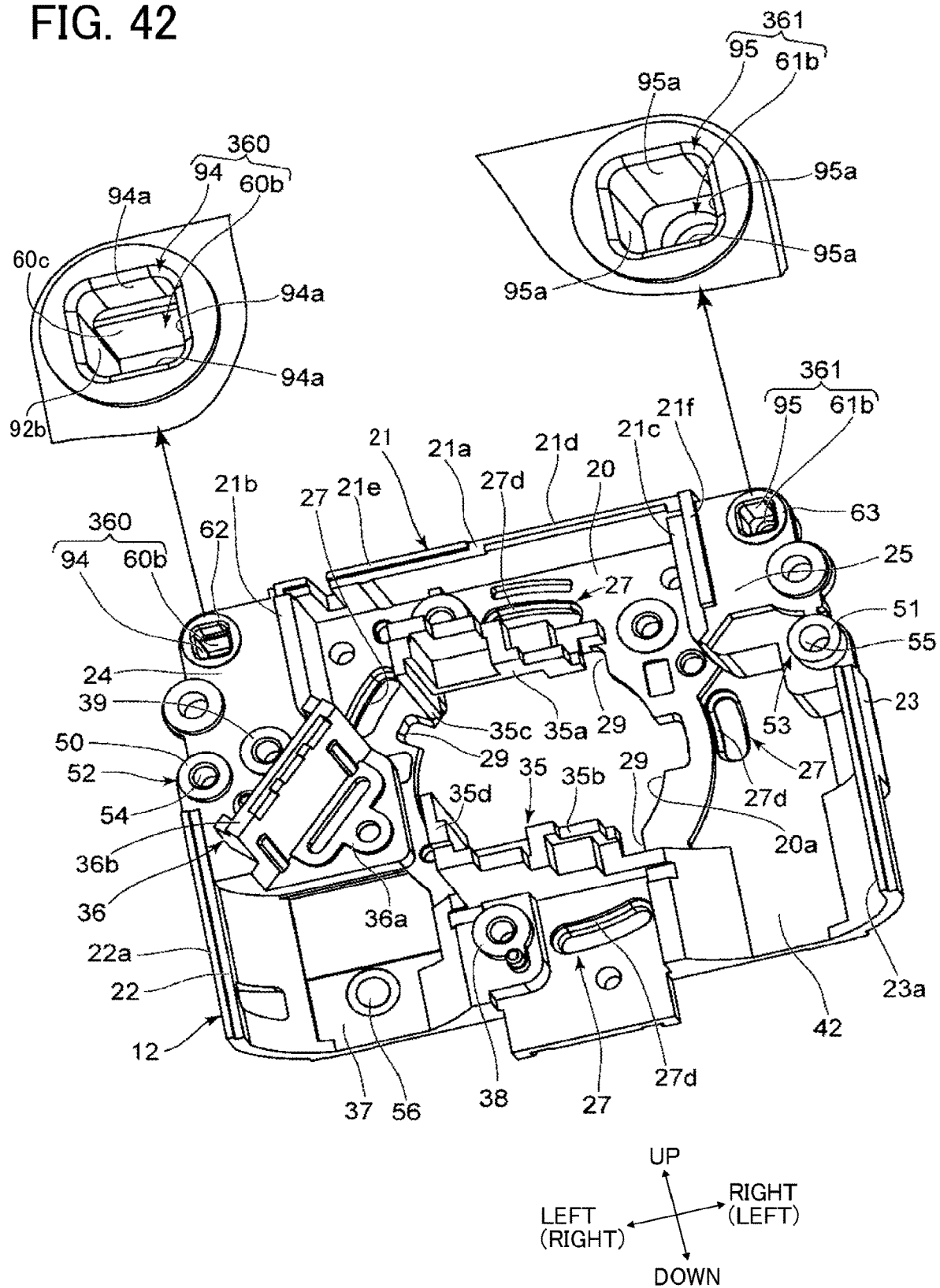
FIG. 42 is a perspective view of the base frame for describing the third variation of the positioning mechanism according to an embodiment of the present disclosure.

FIGS. 41 and 42 are illustrations of a positioning mechanism according to the third variation of an embodiment of the present disclosure. In the third variation of the embodiment, the first hole 360 has an opposing hole portion 94 as a substitute for the circular hole 60a according to the above-described embodiment, and the second hole 361 has an opposing hole portion 95 as a substitute for the circular hole 61a according to the above-described embodiment.

The opposing hole portion 94 of the second hole 360 has four planes 94a. The four planes 94a are provided at substantially the same positions as those of the four planes 92b of the opposing hole portion 92 according to the second variation, and also formed in the same directions as those of the planes 92b according to the second variation. The third variation differs from the second variation (the opposing hole portions 92) in that the corner portion (including a gentle chamfered shape) is formed between two adjacent planes 94a in the third variation. In other words, the opposing hole portion 92 according to the second variation and the opposing hole portion 94 according to the third variation are common in terms of a rectangular hole shape defined by four planes.

As illustrated in FIG. 41, on the lens barrel 11A side, the shaft portion 65a of the shaft member 65 is press-fitted into the opposing hole portion 94 of the first hole 360 and internally contacts the four planes 94b. Accordingly, a stable insertion of the shaft member is performed with a less load on the holes. Further, on the lens barrel 11B side, each plane 94b of the opposing hole portion 94 does not hamper the insertion of the small diameter shaft 66b into the first hole 360.

The opposing hole portion 95 of the second hole 361 has four planes 95a. The four planes 95a are provided at substantially the same positions as those of the four planes 93b of the opposing hole portion 93 according to the second variation, and also formed in the same directions as those of the planes 93b according to the second variation. The third variation differs from the second variation (the opposing hole portions 92) in that the corner portion (including a gentle chamfered shape) is formed between two adjacent planes 95a in the third variation. In other words, the opposing hole portion 93 according to the second variation and the opposing hole portion 95 according to the third variation are common in terms of a rectangular hole shape defined by four planes.

As illustrated in FIG. 41, on the lens barrel 11A side, the large diameter shaft 66a (the base end section 66d) of the shaft member 65 is press-fitted into the opposing hole portion 95 of the second hole 361 and internally contacts the four planes 95a. On the lens barrel 11B side, the shaft portion 65b of the shaft member 65 is is press-fitted into the opposing hole portion 95 of the second hole 361 and internally contacts the four planes 95a. Each of the shaft portion 65b and the large diameter shaft 66a can be stably inserted into the opposing hole portion 95 with a less load.

Figure 43:
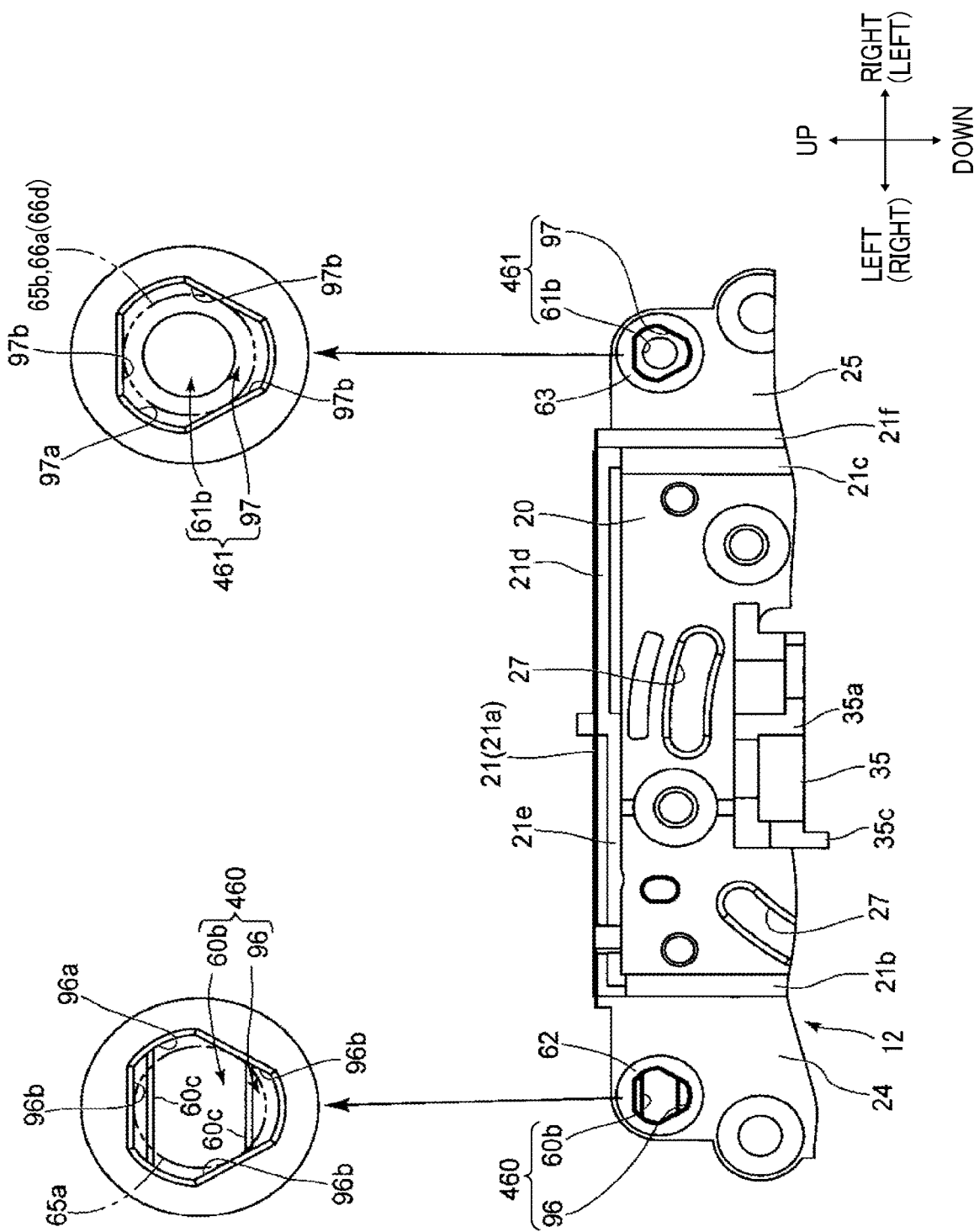
FIG. 43 is a rear view of a base frame for describing a fourth variation of the positioning mechanism according to an embodiment of the present disclosure.
Figure 44:
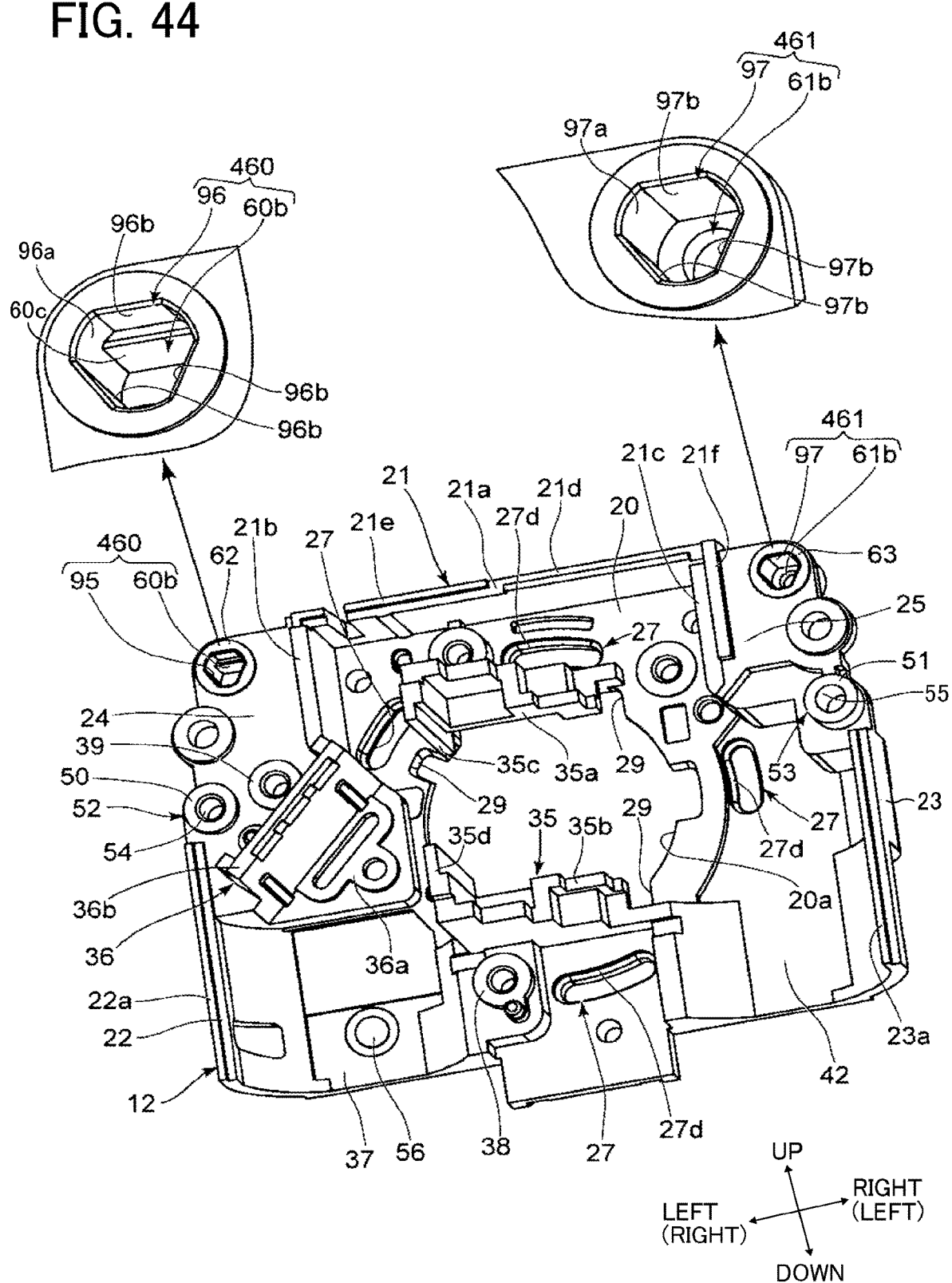
FIG. 44 is a perspective view of the base frame for describing the fourth variation of the positioning mechanism according to an embodiment of the present disclosure.

FIGS. 43 and 44 are illustrations of a positioning mechanism according to the fourth variation of an embodiment of the present disclosure. In the fourth variation of the embodiment, the first hole 460 has an opposing hole portion 96 as a substitute for the circular hole 60a according to the above-described embodiment, and the second hole 461 has an opposing hole portion 97 as a substitute for the circular hole 61a according to the above-described embodiment.

The opposing hole portion 96 of the first hole 460 includes a cylindrical portion 96a having a cylindrical inner surface, and three planes 96b each of which partially short-circuits the inner surface of the cylindrical portion 96a. Each plane 96b has a planar shape that extends along the axial direction of the first hole 460. The three planes 96b are disposed at substantially equal angular intervals (120° intervals) in the circumferential direction around the axis of the first hole 460. In other words, the opposing hole portion 96 has a substantially triangle shape inside defined by three surrounding planes 96b. One of the three planes 96b, which is disposed at the upper part along the up-to-down direction, is substantially parallel to the plane 60c of the elongated hole 60b, and is disposed farther (on the outer diameter side) from the center of the first hole 460 than the elongated hole 60b does. The remaining two planes 96b are slanted at the same angle in opposite directions relative to the plane 60c of the elongated hole 60b.

On the lens barrel 11A side, the shaft portion 65a of the shaft member 65 is inserted into the opposing hole portion 96 of the first hole 460. The virtual circle indicated by a two-dot chain in FIG. 43 is an incircle that internally contacts the three planes 96b of the opposing hole portion 96. That is, the shaft portion 65a of the shaft member 65 has a diameter of the circle. In this contact state, the shaft portion 65a is lightly press-fitted into the opposing hole portion 96. The shaft portion 65a contacts each of the planes 962b in a linear region along the axial direction of the first hole 460. The shaft portion 65a does not contact each of the cylindrical portion 96a. Accordingly, the contact area between the shaft portion 65a and the opposing hole portion 96 is reduced, and thus a load imposed by insertion of the shaft portion 65a is reduced as compared to the configuration in which substantially the entire outer surface of the shaft portion 65a contacts the inner surface of the hole. Further, such a configuration that includes the plurality of planes 96b reduces or prevents tilting of the shaft portion 65a, and also advantageously advances the shaft portion 65a inside the first hole 460 in the axial direction.

On the side of the lens barrel 11B side, the small diameter shaft 66b of the shaft member 66 is inserted into the first hole 460. In the opposing hole portion 96, the space surrounded by three planes 96b has a larger diameter than the small diameter shaft 66b (the base end section 66f and the tip section 66g) does, which prevents each plane 96b from hampering insertion of the small diameter shaft 66b into the first hole 460.

Same as the opposing hole portion 96 of the first hole 460, the opposing hole portion 97 of the second hole 461 includes a cylindrical portion 97a having a cylindrical inner surface, and three planes 97b each of which partially short-circuits the inner surface of the cylindrical portion 97a. The shape (inner diameter) of the cylindrical portion 97a and the arrangement and shape of each plane 97b are the same as those of the cylindrical portion 96a and each plane 96b of the opposing hole portion 96. The three planes 97b are disposed at substantially equal angular intervals (120° intervals) in the circumferential direction around the axis of the second hole 461. When viewed along the axis of the second hole 461, all of the cylindrical portion 97a and the three planes 97b are located outside the small diameter hole 61b of the second hole 461 (see FIG. 43).

On the lens barrel 11A side, the large diameter shaft 66a of the shaft member 66 is inserted into the opposing hole portion 97 of the second hole 461. On the lens barrel 11B side, the shaft portion 65b of the shaft member 65 is inserted into the opposing hole portion 97 of the second hole 461. The virtual circle indicated by a two-dot chain in FIG. 43 is an incircle that internally contacts the three planes 97b of the opposing hole portion 97. That is, each of the shaft portion 65b and the large diameter shaft 66a (the base end section 66d) of the shaft member 65 has a diameter of the circle. In this contact state, each of the shaft portion 65b and the large diameter shaft 66a (the base end section 66d) is lightly press-fitted into the opposing hole portion 97. The shaft portion 65b and the large diameter shaft 66a (the base end section 66d) contact each of the planes 97b in a linear region along the axial direction of the second hole 461. Neither the shaft portion 65b nor the large diameter shaft 66a contacts the cylindrical portion 97a. Accordingly, the contact area of the opposing hole portion 97 contacting the shaft portion 65b and the large diameter shaft 66a (the base end section 66d) is reduced, and thus a load imposed by insertion of the shaft portion 65b and the large diameter shaft 66a (the base end section 66d) is reduced. Further, such a configuration that includes the plurality of planes 93b reduces or prevents tilting of the shaft 67b, and also advantageously advances the shaft portion 65b and the large diameter shaft 66a inside the second hole 461 in the axial direction.

In the first to fourth variations (FIGS. 37 to 44), each of the opposing hole portions (90, 91, 92, 93, 94, 95, 96, 97) provided in the first holes (160, 260, 360, 460) and the second holes (161, 261, 361, 461) is a non-circular hole having inside a plurality of contacts (the protrusions 90b and 91b, and planes 92b, 93b, 94a, 95a, 96b, and 97b) on the same virtual circle (the outer periphery of the shafts 65a and 65b and the base end section 66d of the large diameter shaft 66a, indicated by two-dotted chain lines in FIG. 37). The shafts 65a and 65b of the shaft member 65 and the base end section 66d of the large diameter shaft 66a of the shaft member 66 are supported in contact with the plurality of contacts of each non-circular hole. As can be understood from these variations, the main-reference positioning mechanism according to the embodiments of the present disclosure may have a configuration in which each contact of the hole and the shaft has a non-cylindrical surface.

In the above-described embodiments and variations, the shapes of the opposing hole portions of the first hole and the second hole are the same, but the internal shapes of the opposing hole portion of the first hole and the opposing hole portion of the second hole may be different from each other. For example, the circular hole 60a of the above-described embodiment may be used as the opposing hole portion of the first hole, and one of the opposing hole portions 91, 93, 95, and 97 of the above-described variations may be used as the opposing hole portion of the second hole. In this case, the shaft member 65 and the shaft member 66 of the above-described embodiments may be used as is as long as the diameter of the virtual circle inscribed in the inner surface of the hole is set to be the same between the circular hole 60a and the opposing hole portions 91, 93, 95, and 97.

The present disclosure is not limited to the above-described embodiments and variations, and numerous additional and variations are possible in light of the above teachings. For example, in the above-described embodiments, the large diameter shaft 66a and the small diameter shaft 66b, which constitute the sub-reference positioning mechanism, are partially different in diameter from each other (the large diameter shaft 66a includes the base end section 66d and the tip section 66e, and the small diameter shaft 66b includes the base end section 66f and the tip section 66g). It is also possible to provide a similar structure to the shaft member 65 constituting the positioning mechanism on the main reference side. The configurations according to the above-described embodiments causes the shaft members 65 and 66 to be press-fitted into the first hole 60 (160, 260, 360, 460) and the second hole 61 (161, 261, 361, 461), which achieves a stable support for the lens barrels 11A and 11B and prevents rattling of the lens barrels 11A and 11B. Particularly, the flange 65c of the shaft member 65 and the flange 66c of the shaft member 66 are not disposed between the lens barrel 11A and the lens barrel 11B, so as not to hamper the positioning in the front-to-back direction using the contact surfaces 50 and 51. Accordingly, the shaft members 65 and 66 can be press-fitted into the first hole 60 (160, 260, 360, 460) and the second hole 61 (161, 261, 361, 461). Further, in addition to the press-fitting, the shaft members 65 and 66 may be fixed to the first hole 60 (160, 260, 360, 460) and the second hole 61 (161, 261, 361, 461) by a fixing member such as adhesive.

In the above-described embodiments and variations (FIGS. 37 to 44), a plurality of configurations of the first hole and the second hole into which the shaft member 65 and the shaft member 66 are inserted are described. In some other embodiments, the first hole and the second hole may have other different shapes. For example, the first hole and the second hole may have a polygonal shape (hexagonal or the like) whose internal shape is other than triangle or square.

The embodiments of the present disclosure are particularly effective in an imaging apparatus in which two imaging units to be combined have the identical shape. In the above-described embodiments, the lens barrel 11A and the lens barrel 11B have the identical shape, and the base frames 12 of the lens barrel 11A and the lens barrel 11B also has the identical shape. However, the embodiments of the present disclosure are applicable in optical systems in which two holders (the base frames 12) holding two optical systems have different shapes and configurations.

In the composite lens barrel 10 according to an embodiment of the present disclosure, the optical axis X1 of the lens barrel 11A and the optical axis X1 of the lens barrel 11B are arranged coaxially. The configuration according to an embodiment of the present disclosure may be applied to an optical system in which the optical axes of incident light from an object in the optical systems are not coaxially arranged as long as the two optical systems are disposed symmetrically.

In the above-described embodiments and variations, cases in which two lens barrels 11A and 11B including the wide-angle lens systems A and B and the image sensors AI and BI (two imaging units) are combined are described. The optical system according to the embodiments of the present disclosure may be applied to a configuration that positions two holders by using the contact surfaces without the image sensors AI and BI disposed in the lens barrels 11A and 11B (that is, the image sensors AI and BI are separate from the optical system).

In the above-described embodiments, the composite lens barrel 10 or the imaging apparatus 80 generate a spherical image. However, no limitation is intended thereby, and an image obtained by the optical systems may be an image other than a spherical image, such as a panoramic image obtained by photographing 360 degrees only in a horizontal plane.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An optical system comprising:
    two imaging optical systems disposed symmetrically with each other;
    two holders including one holder to hold one imaging optical system, and other holder to hold the other one imaging optical system, each holder having a first hole and a second hole; and
    two shaft members including a first shaft member and a second shaft member, the two shaft members disposed between the two holders,
    the two holders being disposed such that the first holes are opposed to the second holes,
    the first shaft member being held by the first hole of the one holder, and the second shaft member being held by the second hole of the one holder,
        the first shaft member being disposed in the second hole of the other holder with a movement of the first shaft member restricted in each direction perpendicular to a direction in which the first holes are opposed to the second holes,
        the second shaft member being disposed in the first hole of the other holder with the second shaft member movable in only a certain direction within a plane perpendicular to the direction in which the first holes are opposed to the second holes.

2. The optical system according to claim 1, wherein each of the first hole and the second hole has an opposing hole portion one opposing hole portion of the first hole is opposed to the other opposing hole portion of the second hole when the first hole is opposed to the second hole, the first hole further has an elongated hole communicable with the one opposing hole portion and having a long direction along a direction perpendicular to an axial direction of the first hole, and the second shaft is movable relative to the elongated hole in the long direction with a movement restricted along the axial direction of the first hole.

3. The optical system according to claim 2, wherein the first shaft member includes a pair of insertion sections having the same diameter and a shape symmetrical to each other along the axial direction, and the opposing hole portion of each of the first hole and the second hole has an internal shape that contacts and supports a corresponding one of the insertion sections of the first shaft member.

4. The optical system according to claim 3, wherein a width of the elongated hole in the axial direction of the first hole is smaller than a diameter of a virtual circle that inscribes the opposing hole portion of each of the first hole and the second hole, and the second shaft member includes a first shaft and a second shaft, the first shaft disposed in and supported by the opposing hole portion of the second hole, and the second shaft disposed in and supported by the elongated hole.

5. The optical system according to claim 4, wherein a length of the first shaft of the second shaft member in an axial direction of the first shaft is longer than a length of the opposing hole portion of the first hole.

6. The optical system according to claim 2, wherein at least one of the one opposing hole portion of the first hole and the other opposing hole portion of the second hole is a circular hole having a cylindrical inner surface.

7. The optical system according to claim 2, wherein at least one of the one opposing hole portion of the first hole and the other opposing hole portion of the second hole is a non-circular hole having a plurality of contacts on a virtual circle inside.

8. The optical system according to claim 1, wherein at least one of the first shaft member and the second shaft member is press-fitted into at least one of the first hole and the second hole.

9. The optical system according to claim 1, wherein at least one of the first shaft member and the second shaft member further includes a restriction part configured to restrict a maximum amount of insertion of a corresponding one of the first shaft member and the second shaft member into the first hole and the second hole.

10. The optical system according to claim 1, wherein another member other than the first shaft member and the second shaft member is positioned by at least one of the first hole and the second hole.

11. An imaging apparatus comprising:

the optical system according to claim 1; and two image sensors to form images captured by the two imaging optical systems, so as to combine the formed images to generate one image.

* * * * *